(12) United States Patent
Zhang et al.

(10) Patent No.: US 12,157,444 B2
(45) Date of Patent: Dec. 3, 2024

(54) HYDRAULIC ADJUSTMENT APPARATUS, HYDRAULIC ADJUSTMENT SYSTEM, BRAKE SYSTEM, AND CONTROL METHOD

(71) Applicant: HUAWEI TECHNOLOGIES CO., LTD., Guangdong (CN)

(72) Inventors: Yongsheng Zhang, Shanghai (CN); Weimiao Yang, Shanghai (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 17/985,486

(22) Filed: Nov. 11, 2022

(65) Prior Publication Data
US 2023/0071109 A1    Mar. 9, 2023

Related U.S. Application Data

(63) Continuation of application No. PCT/CN2020/090091, filed on May 13, 2020.

(51) Int. Cl.
*B60T 13/14* (2006.01)
*B60T 11/20* (2006.01)
*B60T 17/22* (2006.01)

(52) U.S. Cl.
CPC ............. *B60T 11/20* (2013.01); *B60T 13/145* (2013.01); *B60T 17/221* (2013.01)

(58) Field of Classification Search
CPC .... B60T 13/145; B60T 17/221; B60T 17/223; F15B 15/06; F15B 15/063
See application file for complete search history.

(56) References Cited

U.S. PATENT DOCUMENTS

| | | | |
|---|---|---|---|
| 4,483,144 A | 11/1984 | Steffes | |
| 6,230,492 B1 * | 5/2001 | Kingston | F15B 7/08 |
| | | | 92/136 |
| 2004/0227396 A1 | 11/2004 | Kusano | |

(Continued)

FOREIGN PATENT DOCUMENTS

| | | |
|---|---|---|
| CN | 2518742 Y | 10/2002 |
| CN | 203078511 U | 7/2013 |

(Continued)

OTHER PUBLICATIONS

Extended European Search Report in European Appln No. 20935956.1, dated May 16, 2023, 8 pages.

(Continued)

*Primary Examiner* — Michael Leslie
(74) *Attorney, Agent, or Firm* — Fish & Richardson P.C.

(57) ABSTRACT

This disclosure is applicable to intelligent automobiles, new energy automobiles, conventional automobiles, or the like. In an example embodiment, a fluid outlet pipe of a first hydraulic chamber is configured in segments on a push rod support portion and a push rod.
When a piston is located at an inner stop point of a piston stroke, a first hydraulic adjustment port located on the push rod support portion communicates with a second hydraulic adjustment port located on the push rod, and when the piston is located at a position other than the inner stop point in the piston stroke, the first hydraulic adjustment port does not communicate with the second hydraulic adjustment port.

14 Claims, 22 Drawing Sheets

(56) References Cited

U.S. PATENT DOCUMENTS

| | | |
|---|---|---|
| 2006/0158026 A1 | 7/2006 | Aoki et al. |
| 2015/0210256 A1 | 7/2015 | Yamashita et al. |
| 2016/0121866 A1 | 5/2016 | Ozeki et al. |
| 2023/0077277 A1* | 3/2023 | Yang ................ B60T 8/4081 |
| 2023/0092225 A1* | 3/2023 | Yang ................ B60T 13/168 |
| | | 303/6.01 |

FOREIGN PATENT DOCUMENTS

| | | |
|---|---|---|
| CN | 203161708 U | 8/2013 |
| CN | 103303286 A | 9/2013 |
| CN | 103465894 A | 12/2013 |
| CN | 105398433 A | 3/2016 |
| CN | 206615206 U | 11/2017 |
| CN | 108058615 A | 5/2018 |
| CN | 207860163 U | 9/2018 |
| CN | 108928334 A | 12/2018 |
| CN | 109562749 A | 4/2019 |
| CN | 208858757 U | 5/2019 |
| CN | 110562225 A | 12/2019 |
| CN | 110758365 A | 2/2020 |
| DE | 102012023341 A1 | 6/2013 |
| DE | 102012221146 A1 | 5/2014 |
| EP | 1538047 A2 | 6/2005 |
| FR | 2931769 A1 | 12/2009 |
| WO | 2011145673 A1 | 11/2011 |

OTHER PUBLICATIONS

Guo et al., "Research and Prospect on Electronic Control Technology of Diesel Engine for Heavy Transport Vehicle," Fluid Power Transmission and Control, Jul. 2010, 4 pages (with English abstract).
Office Action in Chinese Appln. No. 202080004182.3, dated Nov. 17, 2021, 6 pages (with English translation).
Search Report in Chinese Appln. No. 202080004182.3, dated Jun. 21, 2021, 3 pages.
Office Action in Chinese Appln. No. 202080004182.3, dated Jun. 28, 2021, 20 pages (with English translation).
Office Action in Chinese Appln. No. 202080004182.3, dated Sep. 6, 2021, 28 pages (with English translation).
Office Action in Chinese Appln. No. 202210101908.6, dated Sep. 30, 2022, 17 pages (with English translation).
Office Action in Indian Appln. No. 202227067340, dated Jan. 4, 2023, 7 pages (with English translation).
International Search Report and Written Opinion in International Appln. No. PCT/CN2020/090091, mailed on Feb. 2, 2021, 20 pages (with English translation).

\* cited by examiner

HYDRAULIC ADJUSTMENT APPARATUS, HYDRAULIC ADJUSTMENT SYSTEM, BRAKE SYSTEM, AND CONTROL METHOD

CROSS-REFERENCE TO RELATED APPLICATIONS

This application is a continuation of International Application No. PCT/CN2020/090091, filed on May 13, 2020, the disclosure of which is hereby incorporated by reference in its entirety.

TECHNICAL FIELD

This application relates to the field of automobiles, and more specifically, to a hydraulic adjustment apparatus of a brake system in an automobile, a hydraulic adjustment unit, a brake system in an automobile, and a control method.

BACKGROUND

A brake system of an automobile is a system that applies specific braking force to wheels of the automobile to perform forced braking on the automobile to some extent. The brake system functions to make a driving automobile forcibly decelerate or even stop as required by a driver or a controller, or to make a stopped automobile stably parked under various road conditions (for example, on a ramp), or to make an automobile driven downhill at a stable speed.

As a popular brake system, an electro-hydraulic brake (Electro-Hydraulic Brake, EHB) system usually includes a hydraulic adjustment apparatus. The hydraulic adjustment apparatus may increase or decrease pressure of brake fluid in the brake system based on a driving requirement of an automobile. For example, the brake system works in a wire control mode, and when a driver depresses a brake pedal, the hydraulic adjustment apparatus may squeeze brake fluid into a brake pipe based on a stroke of the brake pedal to provide braking force to an automobile. For another example, in an automated driving mode, when an automated driving system determines that deceleration and parking are required, the hydraulic adjustment apparatus may squeeze brake fluid into a brake pipe based on an instruction of a controller to provide braking force to an automobile. For another example, the brake system works in the wire control mode, and when the driver releases the brake pedal, the hydraulic adjustment apparatus may draw brake fluid from brake wheel cylinders of the automobile to a fluid storage apparatus based on a stroke of the brake pedal, to reduce the braking force to the automobile. For another example, in the automated driving mode, when the automated driving system determines that acceleration is required, the hydraulic adjustment apparatus may draw brake fluid from brake wheel cylinders of the automobile to a fluid storage apparatus based on an instruction of the controller, to reduce the braking force to the automobile.

At present, a hydraulic adjustment apparatus with a bidirectional pressurization/depressurization function is a relatively popular hydraulic adjustment apparatus. A hydraulic cylinder in the hydraulic adjustment apparatus is divided into two hydraulic chambers by a piston, and the two hydraulic chambers each include a flow channel of brake fluid for the brake fluid to flow in or out. However, to reuse the flow channel of brake fluid corresponding to each hydraulic chamber, to allow brake fluid to flow from a fluid storage apparatus into a corresponding hydraulic chamber in a pressurization mode and to allow brake fluid to flow from a corresponding hydraulic chamber into the fluid storage apparatus in a depressurization mode, each flow channel needs to be equipped with a corresponding control valve to control a flow direction of the brake fluid in the flow channel. Such a connection manner makes it impossible to reduce a quantity of control valves in a brake system, and fails to reduce costs of the brake system.

SUMMARY

This application provides a hydraulic adjustment apparatus, a hydraulic adjustment unit, a brake system, and a control method thereof, to reduce a quantity of control valves in the hydraulic adjustment unit and reduce costs of the hydraulic adjustment unit.

According to a first aspect, a hydraulic adjustment apparatus is provided, including: a hydraulic cylinder 11, a piston 12, and a push rod 13. The push rod 13 is configured to push the piston 12 to move along an inner wall of the hydraulic cylinder 11 to form a piston stroke. The piston 12 divides the hydraulic cylinder 11 into a first hydraulic chamber 16 and a second hydraulic chamber 17. An end portion of the first hydraulic chamber 16 is provided with a push rod support portion 14, the push rod support portion 14 is configured to support the push rod 13, and the push rod support portion 14 is provided with a first hydraulic adjustment port 14a. The push rod 13 is provided with a second hydraulic adjustment port 13a, and a first end of the second hydraulic adjustment port 13a communicates with the first hydraulic chamber 16. When the piston 12 is located at an inner stop point of the piston stroke, the first hydraulic adjustment port 14a communicates with a second end of the second hydraulic adjustment port 13a. When the piston 12 is located at a position other than the inner stop point in the piston stroke, the first hydraulic adjustment port 14a does not communicate with the second end of the second hydraulic adjustment port 13a.

In this embodiment of this application, a fluid outlet pipe of the first hydraulic chamber 16 is configured in segments on the push rod support portion 14 corresponding to the first hydraulic adjustment port 14a and the push rod 13 corresponding to the second hydraulic adjustment port 13a. In this way, when the piston 12 is located at the inner stop point of the piston stroke, the first hydraulic adjustment port 14a communicates with the second end of the second hydraulic adjustment port 13a, and when the piston 12 is located at a position other than the inner stop point in the piston stroke, the first hydraulic adjustment port 14a does not communicate with the second end of the second hydraulic adjustment port 13a. In other words, a status of communication between the first hydraulic adjustment port 14a and the second hydraulic adjustment port 13a is controlled by using a position of the piston 12 in the piston stroke. This avoids a need in a conventional hydraulic adjustment apparatus to specially configure a control valve for the first hydraulic chamber 16 to control the fluid outlet pipe of the first hydraulic chamber 16 to be open or closed, thereby reducing a quantity of control valves in a hydraulic adjustment unit and reducing costs of the hydraulic adjustment unit.

It should be noted that, that the first end of the second hydraulic adjustment port 13a communicates with the first hydraulic chamber 16 may include that when the piston 12 is located at the inner stop point of the piston stroke, the first end of the second hydraulic adjustment port 13a communicates with the first hydraulic chamber 16, or when the piston 12 is located at any position in the piston stroke, the first end of the second hydraulic adjustment port 13a communicates with the first hydraulic chamber 16.

In a possible implementation, when the piston 12 is located at the inner stop point of the piston stroke, brake fluid in the first hydraulic chamber 16 is discharged from the first hydraulic chamber 16 through the first hydraulic adjustment port 14*a* and the second hydraulic adjustment port 13*a* that communicate with each other.

In this embodiment of this application, a fluid outlet pipe of the first hydraulic chamber 16 is configured in segments on the push rod support portion 14 corresponding to the first hydraulic adjustment port 14*a* and the push rod 13 corresponding to the second hydraulic adjustment port 13*a*. In this way, when the piston 12 is located at the inner stop point of the piston stroke, the first hydraulic adjustment port 14*a* communicates with the second hydraulic adjustment port 13*a*, and the brake fluid in the first hydraulic chamber 16 may be discharged from the first hydraulic chamber 16 through the first hydraulic adjustment port 14*a* and the second hydraulic adjustment port 13*a* that communicate with each other, thereby reducing a quantity of control valves in a hydraulic adjustment unit and reducing costs of the hydraulic adjustment unit.

In a possible implementation, a circular ring-shaped or semi-circular ring-shaped first flow guide groove 13*b* is disposed along an outer periphery of the push rod 13, and the first flow guide groove 13*b* communicates with the second end of the second hydraulic adjustment port 13*a*. Correspondingly, when the piston is located at the inner stop point, the first flow guide groove 13*b* communicates with the first hydraulic adjustment port 14*a*.

In this embodiment of this application, the circular ring-shaped or semi-circular ring-shaped first flow guide groove 13*b* is disposed on the outer periphery of the push rod 13, so that if the push rod 13 rotates, when the piston 12 is located at the inner stop point, the first hydraulic adjustment port 14*a* and the second hydraulic adjustment port 13*a* may communicate with each other through the first flow guide groove 13*b*, thereby improving performance of the hydraulic adjustment apparatus.

In a possible implementation, a circular ring-shaped or semi-circular ring-shaped second flow guide groove 13*c* is disposed along an inner periphery of the push rod support portion 14, the second flow guide groove 13*c* communicates with the first hydraulic adjustment port 14*a*, and when the piston 12 is located at the inner stop point of the piston stroke, the second flow guide groove 13*c* communicates with the second end of the second hydraulic adjustment port 13*a*.

In this embodiment of this application, the circular ring-shaped or semi-circular ring-shaped second flow guide groove 13*c* is disposed on the inner periphery of the push rod support portion 14, so that if the push rod 13 rotates, when the piston 12 is located at the inner stop point, the first hydraulic adjustment port 14*a* and the second hydraulic adjustment port 13*a* may communicate with each other through the second flow guide groove 13*c*, thereby improving performance of the hydraulic adjustment apparatus.

In a possible implementation, the second hydraulic adjustment port 13*a* is disposed obliquely on the push rod 13 and runs through the push rod 13, and a distance between the first end of the second hydraulic adjustment port 13*a* and the piston 12 is shorter than a distance between the second end of the second hydraulic adjustment port 13*a* and the piston 12.

In this embodiment of this application, the distance between the first end of the second hydraulic adjustment port 13*a* and the piston 12 is set to be shorter than the distance between the second end of the second hydraulic adjustment port 13*a* and the piston 12, so that the second hydraulic adjustment port 13*a* and the first hydraulic adjustment port 14*a* that communicate with each other may communicate with the first hydraulic chamber 16.

In a possible implementation, when the piston 12 is located at the inner stop point, the push rod support portion 14 is spaced from the second hydraulic adjustment port 13*a*.

In this embodiment of this application, when the piston 12 is located at the inner stop point, the push rod support portion 14 is spaced from the second hydraulic adjustment port 13*a*, to prevent the push rod support portion 14 from blocking the second hydraulic adjustment port 13*a*, thereby making it easy for brake fluid to flow into the second hydraulic adjustment port 13*a*, and improving depressurization efficiency of the hydraulic adjustment apparatus.

According to a second aspect, a hydraulic adjustment unit is provided, including a hydraulic adjustment apparatus 10 and a driving apparatus 15. The hydraulic adjustment apparatus 10 includes a hydraulic cylinder 11, a piston 12, and a push rod 13. The piston 12 divides the hydraulic cylinder 11 into a first hydraulic chamber 16 and a second hydraulic chamber 17. The driving apparatus 15 is configured to drive the push rod 13 to push the piston 12 to move along an inner wall of the hydraulic cylinder 11 to form a piston stroke. An end portion of the first hydraulic chamber 16 is provided with a push rod support portion 14, the push rod support portion 14 is configured to support the push rod 13, the push rod support portion 14 is provided with a first hydraulic adjustment port 14*a*, and the first hydraulic adjustment port 14*a* is connected to a first fluid outlet pipe 180 of the hydraulic adjustment unit. The push rod 13 is provided with a second hydraulic adjustment port 13*a*, and a first end of the second hydraulic adjustment port 13*a* communicates with the first hydraulic chamber 16. When the piston 12 is located at an inner stop point of the piston stroke, the first hydraulic adjustment port 14*a* communicates with a second end of the second hydraulic adjustment port 13*a*, and brake fluid in the first hydraulic chamber 16 is discharged from the first hydraulic chamber 16 through the first fluid outlet pipe 180. When the piston 12 is located at a position other than the inner stop point in the piston stroke, the first hydraulic adjustment port 14*a* does not communicate with the second end of the second hydraulic adjustment port 13*a*.

In this embodiment of this application, a fluid outlet pipe of the first hydraulic chamber 16 is configured in segments on the push rod support portion 14 corresponding to the first hydraulic adjustment port 14*a* and the push rod 13 corresponding to the second hydraulic adjustment port 13*a*. In this way, when the piston 12 is located at the inner stop point of the piston stroke, the first hydraulic adjustment port 14*a* communicates with the second end of the second hydraulic adjustment port 13*a*, and when the piston 12 is located at a position other than the inner stop point in the piston stroke, the first hydraulic adjustment port 14*a* does not communicate with the second end of the second hydraulic adjustment port 13*a*. In other words, a status of communication between the first hydraulic adjustment port 14*a* and the second hydraulic adjustment port 13*a* is controlled by using a position of the piston 12 in the piston stroke. This avoids a need in a conventional hydraulic adjustment apparatus to specially configure a control valve for the first hydraulic chamber 16 to control the fluid outlet pipe of the first hydraulic chamber 16 to be open or closed, thereby reducing a quantity of control valves in the hydraulic adjustment unit and reducing costs of the hydraulic adjustment unit.

In a possible implementation, the first hydraulic chamber 16 is provided with a third hydraulic adjustment port 11*a*, and the first hydraulic chamber 16 adjusts pressure of brake fluid in a brake pipe in the hydraulic adjustment unit through the third hydraulic adjustment port 11*a*. When the piston 12 is located at the inner stop point of the piston stroke, the first hydraulic adjustment port 14*a* communicates with the second end of the second hydraulic adjustment port 13*a*, and the third hydraulic adjustment port 11*a* communicates with the first end of the second hydraulic adjustment port 13*a*.

In this embodiment of this application, when the piston 12 is located at the inner stop point of the piston stroke, the first hydraulic adjustment port 14*a*, the second hydraulic adjustment port 13*a*, and the third hydraulic adjustment port 11*a* communicate with each other, so that the brake fluid in the first hydraulic chamber 16 may be discharged from the first hydraulic chamber 16 through the first hydraulic adjustment port 14*a*, the third hydraulic adjustment port 11*a*, and the second hydraulic adjustment port 13*a* that communicate with each other, thereby reducing a quantity of control valves in the hydraulic adjustment unit and reducing costs of the hydraulic adjustment unit.

In a possible implementation, a circular ring-shaped or semi-circular ring-shaped first flow guide groove 13*b* is disposed along an outer periphery of the push rod 13, the first flow guide groove 13*b* communicates with the second end of the second hydraulic adjustment port 13*a*, and the first flow guide groove 13*b* communicates with the first hydraulic adjustment port 14*a*.

In this embodiment of this application, the circular ring-shaped or semi-circular ring-shaped first flow guide groove 13*b* is disposed on the outer periphery of the push rod 13, so that if the push rod 13 rotates, when the piston 12 is located at the inner stop point, the first hydraulic adjustment port 14*a* and the second hydraulic adjustment port 13*a* may communicate with each other through the first flow guide groove 13*b*, thereby improving performance of the hydraulic adjustment apparatus.

In a possible implementation, a circular ring-shaped or semi-circular ring-shaped second flow guide groove 13*c* is disposed along an inner periphery of the push rod support portion 14, the second flow guide groove 13*c* communicates with the first hydraulic adjustment port 14*a*, and the second flow guide groove 13*c* communicates with the second end of the second hydraulic adjustment port 13*a*.

In this embodiment of this application, the circular ring-shaped or semi-circular ring-shaped second flow guide groove 13*c* is disposed on the inner periphery of the push rod support portion 14, so that if the push rod 13 rotates, when the piston 12 is located at the inner stop point, the first hydraulic adjustment port 14*a* and the second hydraulic adjustment port 13*a* may communicate with each other through the second flow guide groove 13*c*, thereby improving performance of the hydraulic adjustment apparatus.

In a possible implementation, the second hydraulic adjustment port 13*a* is disposed obliquely on the push rod 13 and runs through the push rod 13, and a distance between the first end of the second hydraulic adjustment port 13*a* and the piston 12 is shorter than a distance between the second end of the second hydraulic adjustment port 13*a* and the piston 12.

In this embodiment of this application, the distance between the first end of the second hydraulic adjustment port 13*a* and the piston 12 is set to be shorter than the distance between the second end of the second hydraulic adjustment port 13*a* and the piston 12, so that the second hydraulic adjustment port 13*a* and the first hydraulic adjustment port 14*a* that communicate with each other may communicate with the first hydraulic chamber 16.

According to a third aspect, a brake system is provided, including a hydraulic adjustment apparatus 10 and a driving apparatus 15. The hydraulic adjustment apparatus 10 includes a hydraulic cylinder 11, a piston 12, and a push rod 13. The piston 12 divides the hydraulic cylinder 11 into a first hydraulic chamber 16 and a second hydraulic chamber 17. The driving apparatus 15 is configured to drive the push rod 13 to push the piston 12 to move along an inner wall of the hydraulic cylinder 11 to form a piston stroke. The piston 12 divides the hydraulic cylinder 11 into a first hydraulic chamber 16 and a second hydraulic chamber 17. An end portion of the first hydraulic chamber 16 is provided with a push rod support portion 14, the push rod support portion 14 is configured to support the push rod 13, the push rod support portion 14 is provided with a first hydraulic adjustment port 14*a*, and the first hydraulic adjustment port 14*a* is connected to a first fluid outlet pipe 180 of the brake system. The push rod 13 is provided with a second hydraulic adjustment port 13*a*, and a first end of the second hydraulic adjustment port 13*a* communicates with the first hydraulic chamber 16. When the piston 12 is located at an inner stop point of the piston stroke, the first hydraulic adjustment port 14*a* communicates with a second end of the second hydraulic adjustment port 13*a*, and brake fluid in the first hydraulic chamber 16 flows from the first hydraulic chamber 16 to a fluid storage apparatus 30 through the first fluid outlet pipe 180. When the piston 12 is located at a position other than the inner stop point in the piston stroke, the first hydraulic adjustment port 14*a* does not communicate with the second end of the second hydraulic adjustment port 13*a*.

In this embodiment of this application, a fluid outlet pipe of the first hydraulic chamber 16 is configured in segments on the push rod support portion 14 corresponding to the first hydraulic adjustment port 14*a* and the push rod 13 corresponding to the second hydraulic adjustment port 13*a*. In this way, when the piston 12 is located at the inner stop point of the piston stroke, the first hydraulic adjustment port 14*a* communicates with the second end of the second hydraulic adjustment port 13*a*, and when the piston 12 is located at a position other than the inner stop point in the piston stroke, the first hydraulic adjustment port 14*a* does not communicate with the second end of the second hydraulic adjustment port 13*a*. In other words, a status of communication between the first hydraulic adjustment port 14*a* and the second hydraulic adjustment port 13*a* is controlled by using a position of the piston 12 in the piston stroke. This avoids a need in a conventional hydraulic adjustment apparatus to specially configure a control valve for the first hydraulic chamber 16 to control the fluid outlet pipe of the first hydraulic chamber 16 to be open or closed, thereby reducing a quantity of control valves in a hydraulic adjustment unit and reducing costs of the hydraulic adjustment unit.

In a possible implementation, the brake system further includes a third brake pipe 130, and the first hydraulic chamber 16 is connected to brake wheel cylinders 311 and 312 in the brake system through the third brake pipe 130. When the piston 12 is located at the inner stop point of the piston stroke, brake fluid in the brake wheel cylinders 311 and 312 flows to the first hydraulic chamber 16 through the third brake pipe 130, and flows to the fluid storage apparatus 30 through the second end of the second hydraulic adjustment port 13*a* and the first hydraulic adjustment port 14*a*.

In this embodiment of this application, a fluid outlet pipe of the first hydraulic chamber 16 is configured in segments on the push rod support portion 14 corresponding to the first hydraulic adjustment port 14*a* and the push rod 13 corresponding to the second hydraulic adjustment port 13*a*. In this way, when the piston 12 is located at the inner stop point of the piston stroke, the brake fluid in the brake wheel cylinders 311 and 312 may flow to the first hydraulic chamber 16 through the third brake pipe 130, and flow to the fluid storage apparatus 30 through the second end of the second hydraulic adjustment port 13a and the first hydraulic adjustment port 14a, thereby reducing a quantity of control valves in a hydraulic adjustment unit and reducing costs of the hydraulic adjustment unit.

It should be noted that the third brake pipe 130 may be connected to a first pipe 60, that is, the first hydraulic chamber 16 is connected to the brake wheel cylinders 311 and 312 in the brake system through the third brake pipe 130 and the second pipe 60.

In a possible implementation, the brake system further includes a first pipe 60, and the first hydraulic chamber 16 communicates with the second hydraulic chamber 17 through the first pipe 60. When the piston 12 compresses a volume of the second hydraulic chamber 17 to pressurize the brake wheel cylinders 311 and 312 in the brake system, the first hydraulic adjustment port 14a does not communicate with the second end of the second hydraulic adjustment port 13a, and a part of brake fluid in the second hydraulic chamber 17 flows to the first hydraulic chamber 16 through the first pipe 60 and is stored in the second hydraulic chamber 16.

In this embodiment of this application, in a pressurization process based on the second hydraulic chamber 17, a part of brake fluid in the second hydraulic chamber 17 flows to the second hydraulic chamber 17 through the first pipe 60 and is stored in the second hydraulic chamber 17, so that a pressure difference between the second hydraulic chamber 17 and the first hydraulic chamber 16 may be reduced, thereby reducing power required by the driving apparatus to push the piston.

In a possible implementation, a circular ring-shaped or semi-circular ring-shaped first flow guide groove 13b is disposed along an outer periphery of the push rod 13, the first flow guide groove 13b communicates with the second end of the second hydraulic adjustment port 13a, and the first flow guide groove 13b communicates with the first hydraulic adjustment port 14a.

In this embodiment of this application, the circular ring-shaped or semi-circular ring-shaped first flow guide groove 13b is disposed on the outer periphery of the push rod 13, so that if the push rod 13 rotates, when the piston 12 is located at the inner stop point, the first hydraulic adjustment port 14a and the second hydraulic adjustment port 13a may communicate with each other through the first flow guide groove 13b, thereby improving performance of the hydraulic adjustment apparatus.

In a possible implementation, a circular ring-shaped or semi-circular ring-shaped second flow guide groove 13c is disposed along an inner periphery of the push rod support portion 14, the second flow guide groove 13c communicates with the first hydraulic adjustment port 14a, and the second flow guide groove 13c communicates with the second end of the second hydraulic adjustment port 13a.

In this embodiment of this application, the circular ring-shaped or semi-circular ring-shaped second flow guide groove 13c is disposed on the inner periphery of the push rod support portion 14, so that if the push rod 13 rotates, when the piston 12 is located at the inner stop point, the first hydraulic adjustment port 14a and the second hydraulic adjustment port 13a may communicate with each other through the second flow guide groove 13c, thereby improving performance of the hydraulic adjustment apparatus.

In a possible implementation, the second hydraulic adjustment port 13a is disposed obliquely on the push rod 13 and runs through the push rod 13, and a distance between the first end of the second hydraulic adjustment port 13a and the piston 12 is shorter than a distance between the second end of the second hydraulic adjustment port 13a and the piston 12.

In this embodiment of this application, the distance between the first end of the second hydraulic adjustment port 13a and the piston 12 is set to be shorter than the distance between the second end of the second hydraulic adjustment port 13a and the piston 12, so that the second hydraulic adjustment port 13a and the first hydraulic adjustment port 14a that communicate with each other may communicate with the first hydraulic chamber 16.

According to a fourth aspect, a control method of a brake system is provided. The brake system includes a hydraulic adjustment apparatus 10 and a driving apparatus 15. The hydraulic adjustment apparatus 10 includes a hydraulic cylinder 11, a piston 12, and a push rod 13. The piston 12 divides the hydraulic cylinder 11 into a first hydraulic chamber 16 and a second hydraulic chamber 17. The driving apparatus 15 is configured to drive the push rod 13 to push the piston 12 to move along an inner wall of the hydraulic cylinder 11 in the hydraulic adjustment apparatus 10 to form a piston stroke. An end portion of the first hydraulic chamber 16 is provided with a push rod support portion 14, the push rod support portion 14 is configured to support the push rod 13, the push rod support portion 14 is provided with a first hydraulic adjustment port 14a, and the first hydraulic adjustment port 14a is connected to a first fluid outlet pipe 180 of the brake system. The push rod 13 is provided with a second hydraulic adjustment port 13a, and a first end of the second hydraulic adjustment port 13a communicates with the first hydraulic chamber 16. When the piston 12 is located at an inner stop point of the piston stroke, the first hydraulic adjustment port 14a communicates with a second end of the second hydraulic adjustment port 13a, and brake fluid in the first hydraulic chamber 16 flows from the first hydraulic chamber 16 to a fluid storage apparatus 30 through the first fluid outlet pipe 180. When the piston 12 is located at a position other than the inner stop point in the piston stroke, the first hydraulic adjustment port 14a does not communicate with the second end of the second hydraulic adjustment port 13a. The method includes: generating, by a controller, a control instruction, where the control instruction is used to control the driving apparatus 15; and sending, by the controller, the control instruction to the driving apparatus 15, to control the driving apparatus 15 to drive the push rod 13 to push the piston 12 to move along the inner wall of the hydraulic cylinder 11.

In this embodiment of this application, a fluid outlet pipe of the first hydraulic chamber 16 is configured in segments on the push rod support portion 14 corresponding to the first hydraulic adjustment port 14a and the push rod 13 corresponding to the second hydraulic adjustment port 13a. In this way, when the piston 12 is located at the inner stop point of the piston stroke, the first hydraulic adjustment port 14a communicates with the second end of the second hydraulic adjustment port 13a, and when the piston 12 is located at a position other than the inner stop point in the piston stroke, the first hydraulic adjustment port 14a does not communicate with the second end of the second hydraulic adjustment port 13a. In other words, a status of communication between the first hydraulic adjustment port 14a and the second hydraulic adjustment port 13a is controlled by using a position of the piston 12 in the piston stroke. This avoids a need in a conventional hydraulic adjustment apparatus to specially configure a control valve for the first hydraulic chamber 16 to control the fluid outlet pipe of the first hydraulic chamber 16 to be open or closed, thereby reducing a quantity of control valves in the hydraulic adjustment unit and reducing costs of the hydraulic adjustment unit.

In a possible implementation, the sending, by the controller, the control instruction to the driving apparatus 15, to control the driving apparatus 15 to drive the push rod 13 to push the piston 12 to move along the inner wall of the hydraulic cylinder 11 includes: sending, by the controller, the control instruction to the driving apparatus 15 when the brake system is depressurized, to control the driving apparatus 15 to drive the piston 12 to move to the inner stop point.

In this embodiment of this application, when the brake system is depressurized, the piston 12 is controlled to move to the inner stop point of the piston stroke, so that the first hydraulic adjustment port 14a communicates with the second hydraulic adjustment port 13a, and the brake fluid can still be discharged from the first hydraulic chamber 16 through the first hydraulic adjustment port 14a and the second hydraulic adjustment port 13a that communicate with each other, thereby improving depressurization performance of the brake system.

In a possible implementation, the sending, by the controller, the control instruction to the driving apparatus 15, to control the driving apparatus 15 to drive the push rod 13 to push the piston 12 to move along the inner wall of the hydraulic cylinder 11 includes: sending, by the controller, the control instruction to the driving apparatus 15 when the brake system is pressurized, to control the driving apparatus 15 to drive the piston 12 to compress a volume of the second hydraulic chamber 17, to squeeze a first part of brake fluid in the second hydraulic chamber 17 into brake wheel cylinders in the brake system through a first pipe 60 in the brake system, where the first pipe 60 communicates with the second hydraulic chamber 17 and the brake wheel cylinders, and the first part of brake fluid is a part or all of the brake fluid in the second hydraulic chamber 17.

In this embodiment of this application, the piston 12 is controlled to compress the volume of the second hydraulic chamber 17 to squeeze the first part of brake fluid in the second hydraulic chamber 17 into the brake wheel cylinders in the brake system through the first pipe 60 in the brake system. That is, a forward pressurization process is implemented.

In a possible implementation, when the brake system is pressurized, the piston 12 is located at a position other than the inner stop point in the piston stroke, and the first hydraulic adjustment port 14a does not communicate with the second end of the second hydraulic adjustment port 13a.

In this embodiment of this application, when the brake system is pressurized, the first hydraulic adjustment port 14a does not communicate with the second end of the second hydraulic adjustment port 13a. In this case, the first hydraulic chamber 16 may be configured to store brake fluid.

In a possible implementation, if the first part of brake fluid is a part of the brake fluid in the second hydraulic chamber 17, the second hydraulic chamber 17 further includes a second part of brake fluid, and the sending, by the controller, the control instruction to the driving apparatus 15, to control the driving apparatus 15 to drive the push rod 13 to push the piston 12 to move along the inner wall of the hydraulic cylinder 11 includes: sending, by the controller, the control instruction to the driving apparatus 15 when the brake system is pressurized, to control the driving apparatus 15 to drive the push rod 13 to push the piston 12 to compress the volume of the second hydraulic chamber 17, to squeeze the second part of brake fluid into the first hydraulic chamber 16 through a third brake pipe 130 and store the second part of brake fluid in the first hydraulic chamber 16, where the third brake pipe 130 connects the first hydraulic chamber 16 and the second hydraulic chamber 17.

In this embodiment of this application, the second part of brake fluid in the second hydraulic chamber 17 may flow into the first hydraulic chamber 16 through the third brake pipe 130, to reduce a pressure difference between the first hydraulic chamber 16 and the second hydraulic chamber 17, thereby reducing power required by the driving apparatus to drive the piston to move.

In a possible implementation, the sending, by the controller, the control instruction to the driving apparatus 15, to control the driving apparatus 15 to drive the push rod 13 to push the piston 12 to move along the inner wall of the hydraulic cylinder 11 includes: sending, by the controller, the control instruction to the driving apparatus 15 when the brake system is pressurized, to control the driving apparatus 15 to drive the push rod 13 to push the piston 12 to compress a volume of the first hydraulic chamber 16, to squeeze the second part of brake fluid into the brake wheel cylinders in the brake system through the third brake pipe 130, where the third brake pipe is configured to connect the first hydraulic chamber 16 and the brake wheel cylinders.

According to a fifth aspect, an automobile is provided, including the brake system according to any one of the possible implementations of the third aspect. A hydraulic adjustment unit adjusts pressure of brake fluid in a brake pipe in the brake system, to control magnitude of braking force applied to brake wheel cylinders in the brake system.

According to a sixth aspect, a control apparatus is provided. The control apparatus includes a processing unit and a storage unit. The storage unit is configured to store instructions. The processing unit executes the instructions stored in the storage unit, to enable the control apparatus to perform the method according to any one of the possible implementations of in the fourth aspect.

Optionally, the control apparatus may be an independent controller in an automobile, or may be a chip having a control function in an automobile. The processing unit may be a processor. The storage unit may be a memory. The memory may be a storage unit (for example, a register or a cache) in the chip, or may be a storage unit (for example, a read-only memory or a random access memory) in the automobile but located outside the chip.

It should be noted that in the controller, the memory is coupled to the processor. That the memory is coupled to the processor may be understood as that the memory is located inside the processor, or the memory is located outside the processor and independent of the processor.

According to a seventh aspect, a computer program product is provided. The computer program product includes computer program code. When the computer program code runs on a computer, the computer is enabled to perform the methods in the fourth aspects.

It should be noted that all or a part of the computer program code may be stored in a first storage medium. The first storage medium may be encapsulated together with a processor, or may be encapsulated separately from a processor. This is not specifically limited in embodiments of this application.

According to an eighth aspect, a computer-readable medium is provided. The computer-readable medium stores program code. When the computer program code runs on a computer, the computer is enabled to perform the methods in the foregoing aspects.

DESCRIPTION OF EMBODIMENTS

The following describes technical solutions of this application with reference to accompanying drawings.

Figure 1:
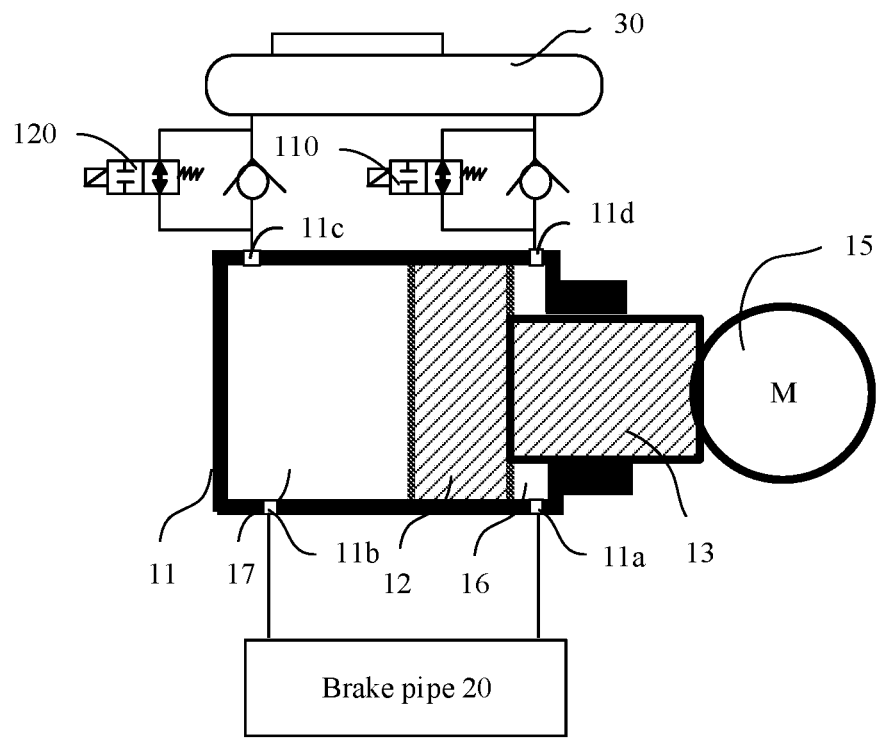
FIG. 1 is a schematic structural diagram of a conventional hydraulic adjustment apparatus with a bidirectional pressurization/depressurization function.

FIG. 1 is a schematic structural diagram of a conventional hydraulic adjustment apparatus with a bidirectional pressurization/depressurization function. The hydraulic adjustment apparatus shown in FIG. 1 includes: a driving apparatus 15, a brake pipe 20, a fluid storage apparatus 30, a hydraulic cylinder 11, a piston 12, a push rod 13, a first hydraulic chamber 16, a second hydraulic chamber 17, a first control valve 110, a second control valve 120, and interfaces 11a and 11d constituting a first flow channel, and interfaces 11c and 11b constituting a second flow channel.

As shown in FIG. 1, the driving apparatus 15 is configured to drive the push rod 13 to push the piston 12 along an inner wall of the hydraulic cylinder 11. The hydraulic cylinder 11 is divided by the piston 12 into two hydraulic chambers: the first hydraulic chamber 16 and the second hydraulic chamber 17. The first flow channel connected to the first hydraulic chamber 16 includes the port 11a and the port 11d. The second flow channel connected to the second hydraulic chamber 17 includes the port 11c and the port 11b.

When the hydraulic adjustment apparatus is in a bidirectional pressurization mode, the first control valve 110 and the second control valve 120 are in a closed state, and brake fluid in the fluid storage apparatus 30 flows to the first hydraulic chamber 16 and the second hydraulic chamber 17 through pipes in which two one-way valves are located. Under the drive of the driving apparatus 15, the piston 12 moves from right to left along the inner wall of the hydraulic cylinder 11, to squeeze brake fluid in the second hydraulic chamber 17 into the brake pipe 20 through the port 11b of the second flow channel. Under the drive of the driving apparatus 15, the piston 12 moves from left to right along the inner wall of the hydraulic cylinder 11, to squeeze brake fluid in the first hydraulic chamber 16 into the brake pipe 20 through the port 11a of the first flow channel.

When the hydraulic adjustment apparatus is in a bidirectional depressurization mode, the first control valve 110 and the second control valve 120 are in an open state, and the pipes in which the two one-way valves are located block brake fluid from flowing from the hydraulic cylinder 11 to the fluid storage apparatus 30 due to the presence of the one-way valves. Under the drive of the driving apparatus 15, the piston 12 moves from right to left along the inner wall of the hydraulic cylinder 11, to draw brake fluid in the brake pipe 20 into the second hydraulic chamber 17 through the port 11b of the second flow channel, and then draw the brake fluid from the second hydraulic chamber 17 to the fluid storage apparatus 30 through a pipe in which the second control valve 120 is located. Under the drive of the driving apparatus 15, the piston 12 moves from left to right along the inner wall of the hydraulic cylinder 11, to draw brake fluid in the brake pipe 20 into the first hydraulic chamber 16 through the port 11a of the first flow channel, and then draw the brake fluid from the first hydraulic chamber 16 to the fluid storage apparatus 30 through a pipe in which the first control valve 110 is located.

It can be learned from the above that for the conventional hydraulic adjustment apparatus, to reuse the first flow channel and the second flow channel in the pressurization mode and the depressurization mode, each flow channel needs to be equipped with a control valve to control each flow channel to be in an open/closed state. Such a connection manner makes it impossible to reduce a quantity of control valves in a brake system, and fails to reduce costs of the brake system.

To avoid the foregoing problem, an embodiment of this application provides a new hydraulic adjustment apparatus. To be specific, the first flow channel is configured in segments on a push rod 13 and a push rod support portion 14. When the push rod 13 moves relative to the push rod support portion 14, two segments of the first flow channel are disconnected so that the first flow channel is in a closed state. When the push rod 13 is located at an inner stop point relative to the push rod support portion 14, the two segments of the first flow channel are connected so that the first flow channel is in an open state. That is, the first flow channel is open or closed by using a position of the push rod 13 relative to the push rod support portion 14. Therefore, the first control valve 110 does not need to be configured for the first flow channel in the hydraulic adjustment apparatus provided in this application, thereby reducing a quantity of control valves in a brake system, and reducing costs of the brake system.

It should be noted that for ease of description below, frontward movement of the piston 12 may be referred to as forward movement and backward movement of the piston 12 may be referred to as reverse movement. When a pressurization operation is performed on a brake system by using a hydraulic adjustment apparatus 10, pressurization based on the forward movement may be referred to as forward pressurization and pressurization based on the reverse movement may be referred to as reverse pressurization. The forward pressurization and the reverse pressurization are further described below when a hydraulic adjustment unit or a brake system including the hydraulic adjustment apparatus 10 is described.

Figure 2:
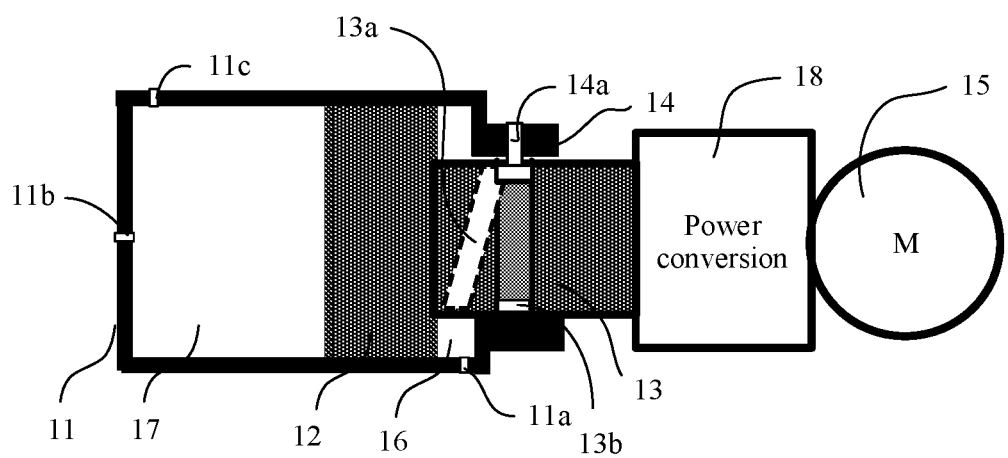
FIG. 2 is a schematic structural diagram of a hydraulic adjustment apparatus according to an embodiment of this application.

The following describes a structure of a hydraulic adjustment apparatus according to an embodiment of this application with reference to FIG. 2. The hydraulic adjustment apparatus 10 shown in FIG. 2 includes a hydraulic cylinder 11, a piston 12, a push rod 13, and a push rod support portion 14. The push rod 13 is configured to push the piston 12 to move along an inner wall of the hydraulic cylinder 11 to form a piston stroke. The piston 12 divides the hydraulic cylinder 11 into a first hydraulic chamber 16 and a second hydraulic chamber 17. An end portion of the first hydraulic chamber 16 is provided with the push rod support portion 14, the push rod support portion 14 is configured to support the push rod 13, and the push rod support portion 14 is provided with a first hydraulic adjustment port 14a. The push rod 13 is provided with a second hydraulic adjustment port 13a, and a first end of the second hydraulic adjustment port 13a communicates with the first hydraulic chamber 16. When the piston 12 is located at an inner stop point of the piston stroke, the first hydraulic adjustment port 14a communicates with a second end of the second hydraulic adjustment port 13a. When the piston 12 is located at a position other than the inner stop point in the piston stroke, the first hydraulic adjustment port 14a does not communicate with the second end of the second hydraulic adjustment port 13a.

The piston 12 is movably disposed in the hydraulic cylinder 11. One end of the push rod 13 extends into the hydraulic cylinder 11 and is connected to the piston 12, and the other end of the push rod 13 extends out of the hydraulic cylinder 11 and is connected to a driving apparatus 15. Under the drive of the driving apparatus 15, the piston 12 can reciprocate in the hydraulic cylinder 11 to perform a pressurization or depressurization (decompression) operation on a brake system.

When the piston 12 moves along the inner wall of the hydraulic cylinder 11, a position at which the piston 12 is furthest from a driving shaft (for example, a crankshaft center) of the driving apparatus 15 is referred to as an "outer stop point", a position at which the piston 12 is closest to the driving shaft (for example, the crankshaft center) of the driving apparatus 15 is referred to as an "inner stop point", and a distance between the "outer stop point" and the "inner stop point" is referred to as a piston stroke.

The first hydraulic chamber 16 and the second hydraulic chamber 17 are separated by the piston 12 and are configured to have a volume changing with the movement of the piston 12. Specifically, when the piston 12 moves frontward (in a leftward direction in FIG. 1), the volume of the first hydraulic chamber 16 is increased and the volume of the second hydraulic chamber 17 is decreased. When the piston 12 moves backward (a rightward direction in FIG. 1), the volume of the first hydraulic chamber 16 is decreased and the volume of the second hydraulic chamber 17 is increased.

The end portion of the first hydraulic chamber 16 is provided with the push rod support portion 14, the push rod support portion 14 is configured to support the push rod 13, and the push rod support portion 14 is provided with the first hydraulic adjustment port 14a.

It should be noted that, the push rod support portion 14 and the hydraulic cylinder 11 may be integrally formed, or the push rod support portion 14 and the hydraulic cylinder 11 may be assembled in a later stage. This is not limited in this embodiment of this application.

Optionally, the push rod support portion 14 is further provided with a sealing member (not shown in the figure) to prevent brake fluid from flowing out of the first hydraulic chamber 16 through a gap between the push rod 13 and the push rod support portion.

The push rod 13 is provided with the second hydraulic adjustment port 13a, and the first end of the second hydraulic adjustment port 13a communicates with the first hydraulic chamber 16. When the piston 12 is located at the inner stop point of the piston stroke, the first hydraulic chamber 16 communicates with the second hydraulic adjustment port 13a through the first hydraulic adjustment port 14a. Conversely, when the piston 12 is located at a position other than the inner stop point in the piston stroke, the first hydraulic adjustment port 14a does not communicate with the second hydraulic adjustment port 13a.

That the first hydraulic chamber 16 communicates with the second hydraulic adjustment port 13a through the first hydraulic adjustment port 14a may be understood as that brake fluid in the first hydraulic chamber 16 may be discharged from the first hydraulic chamber 16 through the first hydraulic adjustment port 14a and the second hydraulic adjustment port 13a that communicate with each other, or brake fluid may enter the first hydraulic chamber 16 through the first hydraulic adjustment port 14a and the second hydraulic adjustment port 13a that communicate with each other.

The first hydraulic adjustment port 14a and the second hydraulic adjustment port 13a may be considered as ports of the first flow channel above communicating with the first hydraulic chamber 16.

In this embodiment of this application, a fluid outlet pipe of the first hydraulic chamber 16 is configured in segments on the push rod support portion 14 (corresponding to the first hydraulic adjustment port 14a) and the push rod 13 (corresponding to the second hydraulic adjustment port 13a). In this way, when the piston 12 is located at the inner stop point of the piston stroke, the first hydraulic adjustment port 14a communicates with the second hydraulic adjustment port 13a, and the brake fluid in the first hydraulic chamber 16 may be discharged from the first hydraulic chamber 16 through the first hydraulic adjustment port 14a and the second hydraulic adjustment port 13a that communicate with each other, thereby reducing a quantity of control valves in a hydraulic adjustment unit and reducing costs of the hydraulic adjustment unit.

Optionally, the brake fluid in the first hydraulic chamber 16 may flow into the first hydraulic chamber through a third hydraulic adjustment port 11a disposed on the first hydraulic chamber. The third hydraulic adjustment port 11a connects the first hydraulic chamber 16 and a brake pipe of the brake system. The brake pipe may be connected to brake wheel cylinders of automobile wheels, and a controller of the brake system can adjust, by adjusting hydraulic pressure in the brake pipe, braking force applied to the wheels.

To be specific, in a pressurization process, the first hydraulic chamber 16 may supply brake fluid into the brake pipe through the third hydraulic adjustment port 11a, to increase the braking force applied to the wheels. In a depressurization process, brake fluid in the brake pipe may flow into the first hydraulic chamber 16 through the third hydraulic adjustment port 11a based on a pressure difference in the brake system, to reduce or cancel the braking force applied to the wheels.

Optionally, the hydraulic cylinder 11 may be further provided with a fourth hydraulic adjustment port 11b, and the fourth hydraulic adjustment port 11b is configured to connect the second hydraulic chamber 17 and the brake pipe of the brake system through a pipe.

Similarly, the second hydraulic chamber 17 can supply brake fluid into the brake pipe through the fourth hydraulic adjustment port 11b to perform a pressurization operation on the brake pipe, to increase the braking force applied to the wheels. The brake fluid in the brake pipe can also be discharged into the second hydraulic chamber 17 through the fourth hydraulic adjustment port 11b to perform a depressurization operation on the brake pipe, to reduce or cancel the braking force applied to the wheels.

The fourth hydraulic adjustment port 11b may further connect the second hydraulic chamber 17 and the first hydraulic chamber 16 through the brake pipe. With the above disposition, when the hydraulic adjustment apparatus 10 performs forward pressurization, a part of the brake fluid in the second hydraulic chamber 17 can be discharged into the brake pipe to brake the wheels, and another part of the brake fluid can be discharged into the first hydraulic chamber 16, so that a pressure difference between the second hydraulic chamber 17 and the first hydraulic chamber 16 can be reduced, thereby reducing workload of the driving apparatus 15, and prolonging the life of a motor driving apparatus.

The hydraulic cylinder 11 may be further provided with a fifth hydraulic adjustment port 11c, and the fifth hydraulic adjustment port 11c is configured to discharge brake fluid from a fluid storage apparatus 30 for replenishment.

Specifically, the fifth hydraulic adjustment port 11c communicates with the fluid storage apparatus 30 through a pipe. When reverse pressurization is performed, to reduce the pressure difference between the second hydraulic chamber 17 and the first hydraulic chamber 16, in a process of moving the piston 12 to the right, brake fluid in the fluid storage apparatus 30 may be replenished into the second hydraulic chamber 17 in a timely manner through the fifth hydraulic adjustment port 11c.

Therefore, the hydraulic adjustment apparatus 10 provided in this embodiment of this application can implement bidirectional pressurization through forward movement or reverse movement, thereby ensuring continuity of a pressurization process, and improving comfort during braking. In addition, the hydraulic adjustment apparatus 10 in this embodiment of this application can quickly produce pressure, to implement fast pressure building on the brake system, reduce a control response time of the system, and meet control and safety requirements of a vehicle.

Optionally, to facilitate communication between the first hydraulic chamber 16 and the first hydraulic adjustment port 14a, the second hydraulic adjustment port 13a may be disposed obliquely on the push rod 13 and run through the push rod 13, and a distance between a fluid inlet port (also referred to as the first end) of the second hydraulic adjustment port 13a and the piston 12 is shorter than a distance between a fluid outlet port (also referred to as the second end) of the second hydraulic adjustment port 13a and the piston 12.

That the distance between the fluid inlet port of the second hydraulic adjustment port 13a and the piston 12 is shorter than the distance between the fluid outlet port of the second hydraulic adjustment port 13a and the piston 12 may be understood as that a side where the second hydraulic adjustment port 13a communicates with the first hydraulic adjustment port 14a is closer to the piston 12 than a side where the second hydraulic adjustment port 13a communicates with the first hydraulic chamber 16. Certainly, the second hydraulic adjustment port 13a may alternatively be a U-shaped hole or the like. This is not limited in this application.

Generally, to prevent the push rod support portion 14 from blocking the second hydraulic adjustment port 13a when the piston 12 is located at the inner stop point, the push rod support portion 14 may be spaced from the second hydraulic adjustment port 13a, or in other words, when the piston 12 is located at the inner stop point, there may be a specific spacing between the push rod support portion 14 and the second hydraulic adjustment port 13a, so that the brake fluid in the first hydraulic chamber 16 may enter and exit the second hydraulic adjustment port 13a without being blocked. Certainly, the push rod support portion 14 may alternatively block a part of the second hydraulic adjustment port 13a. This is not limited in this embodiment of this application.

Generally, the push rod 13 may rotate after working a long time, and correspondingly, the second hydraulic adjustment port 13a disposed on the push rod 13 is rotated. In this case, the rotated second hydraulic adjustment port 13a cannot communicate with the first hydraulic adjustment port 14a even though the piston 12 is located at the inner stop point. For example, the outlet of the rotated second hydraulic adjustment port 13a may be blocked by an inner wall of the push rod support portion 14, and correspondingly, the first hydraulic adjustment port 14*a* is blocked by an outer wall of the push rod 13.

To avoid the foregoing problem, a first flow guide groove 13*b* may be disposed along an outer periphery of the push rod 13, and the first flow guide groove 13*b* communicates with the second hydraulic adjustment port 13*a*. The first flow guide groove 13*b* can ensure that communication between the second hydraulic adjustment port 13*a* and the first hydraulic adjustment port 14*a* is maintained after the push rod 13 rotates.

Optionally, the first flow guide groove 13*b* may be in a circular ring shape or a semi-circular ring shape along the outer periphery of the push rod 13. Certainly, when the first flow guide groove 13*b* is a semi-circular ring-shaped groove disposed along the outer periphery of the push rod 13, mechanical strength of the push rod 13 is less affected by the first flow guide groove 13*b*. It should be understood that an arc length of the semi-circular ring may be determined based on a maximum amount of rotation that can occur on the push rod 13.

Figures 3A, 3B:
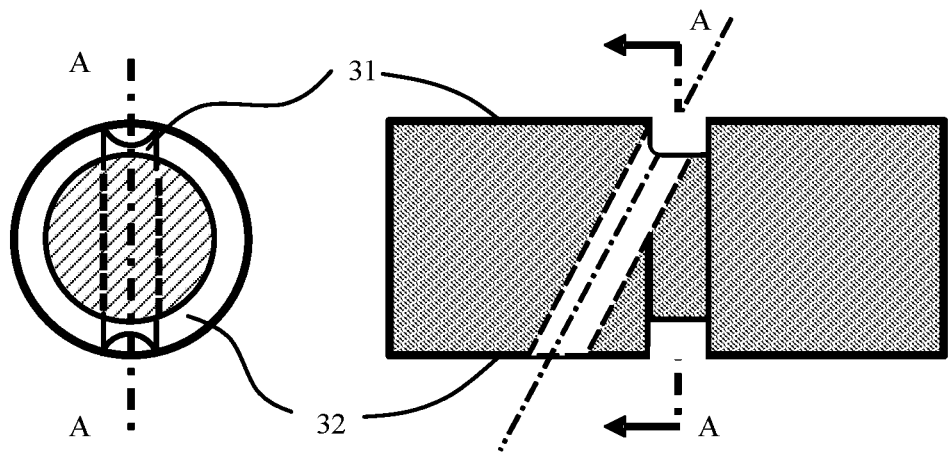
FIG. 3(a) and FIG. 3(b) are a schematic structural diagram of a first flow guide groove according to an embodiment of this application.

The following uses a first flow guide groove shown in FIG. 3(*a*) and FIG. 3(*b*) as an example for description. FIG. 3(*a*) and FIG. 3(*b*) are a schematic structural diagram of a first flow guide groove according to an embodiment of this application. FIG. 3(*b*) is a main view of the push rod 13. FIG. 3(*a*) is a cross-sectional view of an AA perspective in FIG. 3(*b*).

The outer periphery of the push rod 13 may be provided with the first flow guide groove 13*b*. The flow guide groove 13*b* is disposed along the periphery of the push rod 13, and the second hydraulic adjustment port 13*a* communicates with the first flow guide groove 13*b*. In this way, when the piston 12 is moved to the inner stop point, the second hydraulic adjustment port 13*a* communicates with the first hydraulic adjustment port 14*a* through the first flow guide groove 13*b*, to implement fast depressurization.

Because the first flow guide groove 13*b* is disposed along the outer periphery of the push rod 13 and has a specific length, the first flow guide groove 13*b* keeps communicating with the first hydraulic adjustment port 14*a* when the push rod 13 rotates. Moreover, the second hydraulic adjustment port 13*a* also communicates with the first flow guide groove 13*b*. Therefore, it can be ensured that the second hydraulic adjustment port 13*a* and the first hydraulic adjustment port 14*a* still communicate with each other in this case.

As shown in FIG. 3(*a*), the first flow guide groove 13*b* is a ring-shaped groove in which the head and tail are connected. In this way, regardless of how much the push rod 13 rotates, it is ensured that the first flow guide groove 13*b* and the first hydraulic adjustment port 14*a* keep communicating with each other, and the first flow guide groove 13*b* and the second hydraulic adjustment port 13*a* also keep communicating with each other, so that the second hydraulic adjustment port 13*a* and the first hydraulic adjustment port 14*a* keep communicating with each other.

Optionally, a circular ring-shaped or semi-circular ring-shaped second flow guide groove 13*c* is disposed along an inner periphery of the push rod support portion 14, and the second flow guide groove 13*c* communicates with the first hydraulic adjustment port 14*a*. The following describes a structure of the second flow guide groove 13*c* in this embodiment of this application with reference to FIG. 4.

Figure 4:
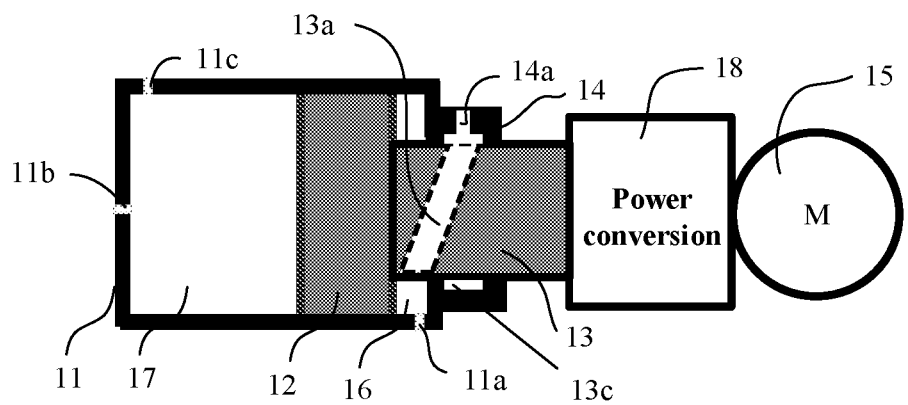
FIG. 4 is a schematic structural diagram of a second flow guide groove according to an embodiment of this application.

FIG. 4 is a schematic structural diagram of a second flow guide groove according to an embodiment of this application. As shown in FIG. 4, the second flow guide groove 13*c* may be disposed on the inner wall of the push rod support portion 14, and the second flow guide groove 13*b* communicates with the first hydraulic adjustment port 14*a*.

The second flow guide groove 13*c* may be disposed along the inner periphery of the push rod support portion 14. Because the inner periphery of the push rod support portion 14 keeps surrounding the outer periphery of the push rod 13, even though the push rod 13 rotates, the second flow guide groove 13*c* located on the inner periphery of the push rod support portion 14 can still communicate with the second hydraulic adjustment port 13*a*, that is, the second hydraulic adjustment port 13*a* communicates with the first hydraulic adjustment port 14*a*.

In this embodiment of this application, the second flow guide groove 13*c* is disposed on the push rod support portion 14 to reduce impact on the mechanical strength of the push rod 13, and prevent the push rod 13 from breaking after working a long time.

Figure 5:
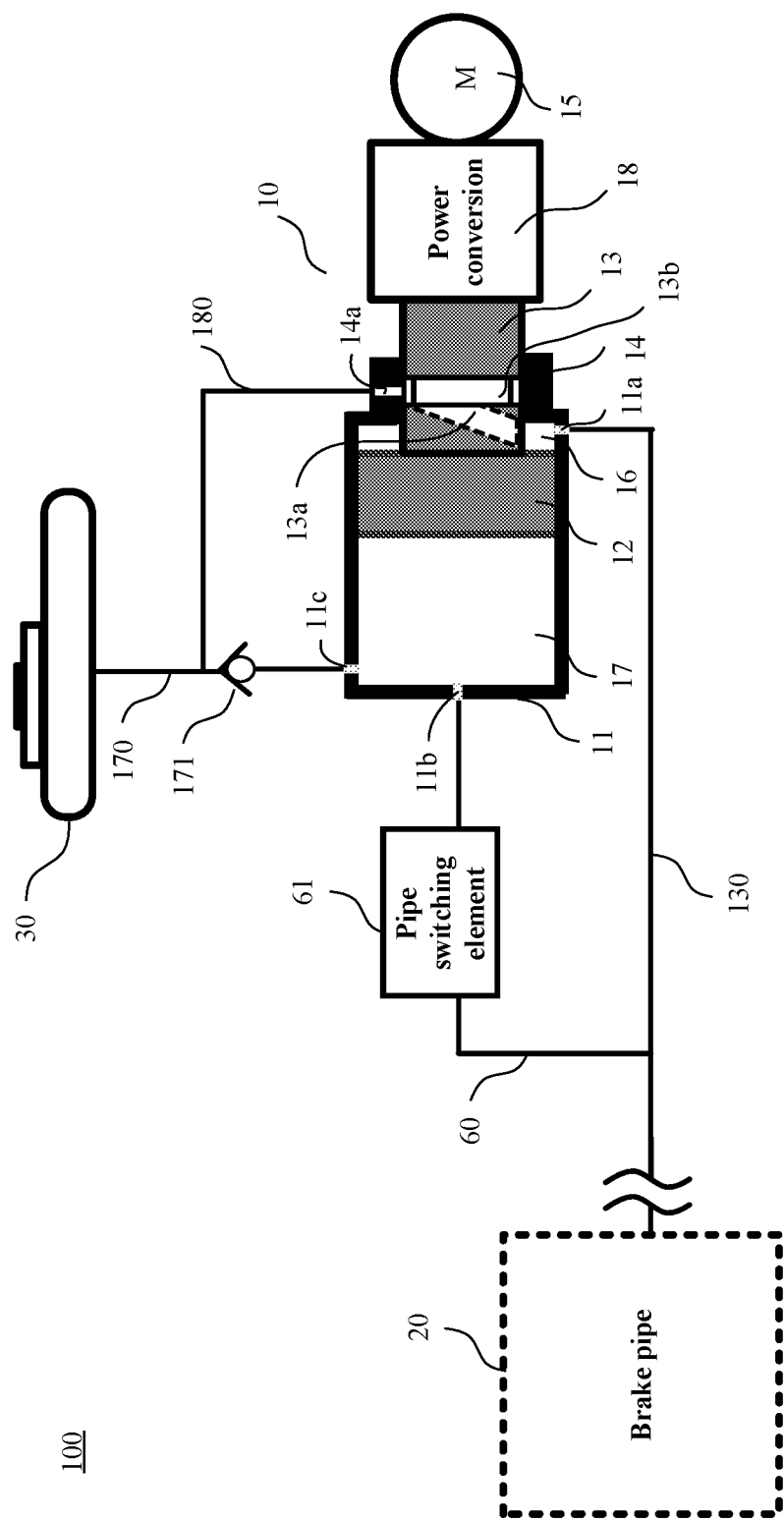
FIG. 5 is a schematic structural diagram of a hydraulic adjustment unit according to an embodiment of this application.

The foregoing describes the hydraulic adjustment apparatus in the embodiments of this application with reference to FIG. 2 to FIG. 4, and the following describes a hydraulic adjustment unit including the hydraulic adjustment apparatus in the embodiments of this application with reference to FIG. 5. It should be noted that parts with same functions in FIG. 5 and FIG. 2 to FIG. 4 use same numbers. For brevity, details are not described below again.

FIG. 5 illustrates the hydraulic adjustment apparatus 10 as an example. When the hydraulic adjustment apparatus shown in FIG. 4 is disposed in a hydraulic adjustment unit, a pipe arrangement manner of the hydraulic adjustment apparatus is the same as a pipe arrangement manner shown in FIG. 5. For brevity, details are not separately described below.

FIG. 5 is a schematic structural diagram of a hydraulic adjustment unit according to an embodiment of this application. The hydraulic adjustment unit 100 includes the hydraulic adjustment apparatus 10, a brake pipe 20, a fluid storage apparatus 30, a first fluid outlet pipe 180, and a driving apparatus 15.

The hydraulic adjustment apparatus 10 includes a hydraulic cylinder 11, a piston 12, and a push rod 13. The piston 12 divides the hydraulic cylinder 11 into a first hydraulic chamber 16 and a second hydraulic chamber 17.

The driving apparatus 15 is configured to drive the push rod 13 to push the piston 12 to move along an inner wall of the hydraulic cylinder 11 in the hydraulic adjustment apparatus 10 to form a piston stroke.

The driving apparatus 15 may be a motor or another apparatus having a driving capability. It should be understood that, when the driving apparatus 15 is a motor, because some motors output torque, to convert the torque output by the motor into linear motion for driving the push rod 13, the driving apparatus 15 may be further connected to the push rod 13 by using a deceleration mechanism or another power conversion mechanism 18. The power conversion mechanism may include, for example, a turbine worm component or a ball screw nut component.

An end portion of the first hydraulic chamber 16 is provided with a push rod support portion 14, the push rod support portion 14 is configured to support the push rod 13, the push rod support portion 14 is provided with a first hydraulic adjustment port 14*a*, and the first hydraulic adjustment port 14*a* is connected to the first fluid outlet pipe 180 of a brake system.

The push rod 13 is provided with a second hydraulic adjustment port 13*a*. When the piston 12 is located at an inner stop point of the piston stroke, the first hydraulic adjustment port 14*a* communicates with the second hydraulic adjustment port 13a, and brake fluid in a brake system may flow between the first hydraulic chamber 16 and the first fluid outlet pipe 180 through the first hydraulic adjustment port 14a and the second hydraulic adjustment port 13a that communicate with each other.

Optionally, the first hydraulic adjustment port 14a communicates with the fluid storage apparatus 30 through the first fluid outlet pipe 180. In this way, the brake fluid may flow from the fluid storage apparatus 30 to the first hydraulic chamber 16 through the first hydraulic adjustment port 14a and the second hydraulic adjustment port 13a that communicate with each other, or the brake fluid may flow from the first hydraulic chamber 16 to the fluid storage apparatus 30 through the first hydraulic adjustment port 14a and the second hydraulic adjustment port 13a that communicate with each other.

Optionally, the hydraulic adjustment unit 100 further includes a first pipe 60, a fluid inlet pipe 1 170, a pipe switching element 61, a one-way valve 171, and a third brake pipe 130. A fourth hydraulic adjustment port 11b on the hydraulic cylinder 11 communicates with the third brake pipe 130 through the first pipe 60. One end of the third brake pipe 130 is connected to a third hydraulic adjustment port 11a on the first hydraulic chamber 16, and the other end of the third brake pipe 130 communicates with the brake circuit 20.

Specifically, the fourth hydraulic adjustment port 11b on the hydraulic cylinder 11 may connect the second hydraulic chamber 17 and the brake pipe 20 through the first pipe 60 and the third brake pipe 130. In other words, the second hydraulic chamber 17 communicates with the brake pipe 20 through the first pipe 60 and the third brake pipe 130.

In addition, the fourth hydraulic adjustment port 11b on the hydraulic cylinder 11 further connects the second hydraulic chamber 17 and the first hydraulic chamber 16 through the first pipe 60 and the other part of the third brake pipe 130. In other words, the second hydraulic chamber 17 communicates with the first hydraulic chamber 16 through the first pipe 60 and the third brake pipe 130. In this way, when forward pressurization is performed, a part of brake fluid can flow to the brake pipe 20 to provide braking force to wheels, and another part of brake fluid can be replenished into the first hydraulic chamber 16, so that a pressure difference between the second hydraulic chamber 17 and the first hydraulic chamber 16 can be reduced, thereby reducing workload of the driving apparatus 15, and prolonging the life of the driving apparatus 15.

Optionally, the brake system may further include the pipe switching element 61, the pipe switching element 61 may be disposed on the first pipe 60, and the pipe switching element 61 can control the first pipe 60 to be open or closed. When the pipe switching element 61 is in an open state, the first pipe 60 is open. When the pipe switching element 61 is in a closed state, the first pipe 60 is closed.

It should be noted that the pipe switching element 61 may be various types of valves, such as a solenoid valve or a one-way valve. The solenoid valve may be a two-way valve, a three-way valve, or the like. This is not limited in this application. For example, the pipe switching element 61 may be disposed as a normally open solenoid valve, and the normally open solenoid valve is configured to be open in a normal state, and to be operated to close when a closing signal from a controller is received. In other words, a default initial state of the pipe switching element 61 is an open state.

A fifth hydraulic adjustment port 11c on the hydraulic cylinder 11 connects the second hydraulic chamber 17 and the fluid storage apparatus 30 through the fluid inlet pipe 1 170, so that brake fluid in the fluid storage apparatus 30 can be discharged into the second hydraulic chamber 17 through the fifth hydraulic adjustment port 11c. Therefore, the fluid storage apparatus 30 can replenish the second hydraulic chamber 17 with brake fluid through the fluid inlet pipe 1 170.

Optionally, the one-way valve 171 is disposed on the fluid inlet pipe 1 170, and the one-way valve 171 is configured to allow brake fluid to flow in a direction from the fluid storage apparatus 30 to the second hydraulic chamber 17, and prevent the brake fluid from flowing in an opposite direction.

The hydraulic adjustment unit 100 in this embodiment of this application has a plurality of working modes, such as forward pressurization, reverse pressurization, conventional depressurization, and fast depressurization.

When a forward pressurization operation needs to be performed on the brake pipe 20 (that is, the braking force to the wheels needs to be increased in this case), the controller may control the pipe switching element 61 to open and control the piston 12 to move forward to squeeze brake fluid in the second hydraulic chamber 17, so that a part of brake fluid in the second hydraulic chamber 17 is discharged into the brake pipe 20 through the fourth hydraulic adjustment port 11b, the first pipe 60 (the pipe switching element 61), and the third brake pipe 130, to increase pressure of brake fluid in the brake pipe 20, thereby increasing the braking force applied to the wheels.

In this case, another part of brake fluid in the second hydraulic chamber 17 is replenished into the first hydraulic chamber 16 through the fourth hydraulic adjustment port 11b, the first pipe 60 (the pipe switching element 61), the third brake pipe 130, and the third hydraulic adjustment port 11a.

When a reverse pressurization operation needs to be performed on the brake pipe 20, the controller may control the pipe switching element 61 to close and control the piston 12 to move reversely to squeeze brake fluid in the first hydraulic chamber 16, so that the brake fluid in the first hydraulic chamber 16 is discharged into the brake pipe 20 through the third hydraulic adjustment port 11a and the third brake pipe 130, to increase pressure of brake fluid in the brake pipe 20, thereby increasing the braking force applied to the wheels.

In this case, the brake fluid in the fluid storage apparatus 30 is replenished into the second hydraulic chamber 17 through the fluid inlet pipe 1 170 (the one-way valve 171) and the fifth hydraulic adjustment port 11c.

When a conventional depressurization operation needs to be performed on the brake pipe 20 (that is, the braking force to the wheels needs to be reduced or canceled in this case), the controller may control the pipe switching element 61 to open and control the piston 12 to move reversely, so that the brake fluid in the brake pipe 20 enters the second hydraulic chamber 17 through the third brake pipe 130, the first pipe 60 (the pipe switching element 61), and the fourth hydraulic adjustment port 11b in sequence.

In this case, the brake fluid in the first hydraulic chamber 16 also enters the second hydraulic chamber 17 through the third hydraulic adjustment port 11a, the third brake pipe 130, the first pipe 60 (the pipe switching element 61), and the fourth hydraulic adjustment port 11b in sequence.

When fast depressurization needs to be performed on the brake pipe 20, the controller may control the piston 12 to move to the inner stop point, to connect the second depressurization hole 13a and the first depressurization hole 14a. In this case, the brake fluid in the brake pipe 20 is discharged into the fluid storage apparatus 30 through the third brake pipe 130, the third hydraulic adjustment port 11a, the first hydraulic chamber 16, the second depressurization hole 13a, the flow guide groove 13b, the first depressurization hole 14a, and a depressurization pipe 50 in sequence, to reduce the pressure of the brake fluid in the brake pipe 20, thereby reducing or canceling the braking force applied to the wheels.

In this case, the pipe switching element 61 may be open or closed. This is not limited in this application.

Figure 6:
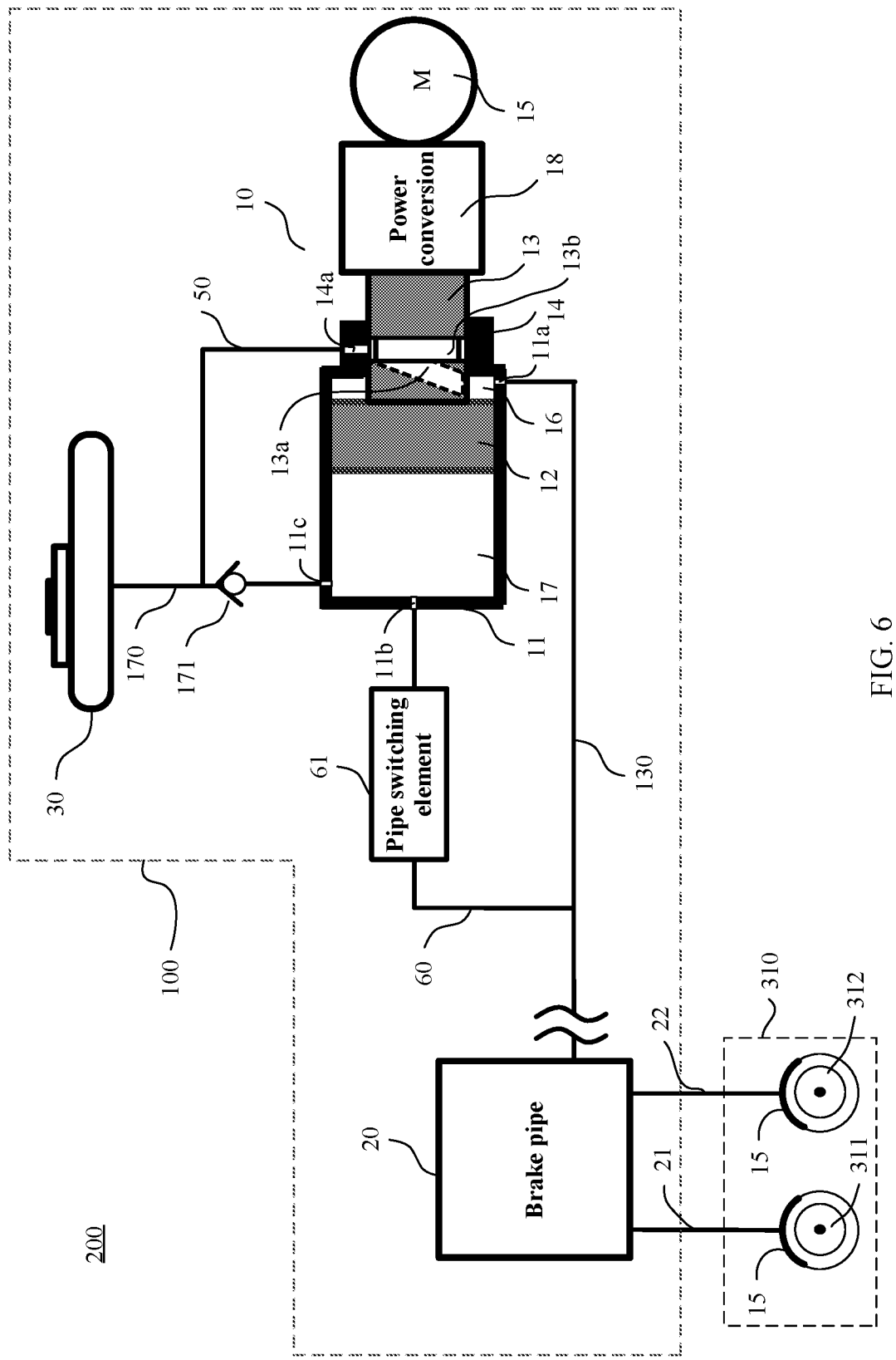
FIG. 6 is a schematic diagram of a brake system according to an embodiment of this application.

The foregoing describes, with reference to FIG. 5, the hydraulic adjustment unit 100 provided in the embodiments of this application, and the following describes a brake system in the embodiments of this application with reference to FIG. 6. The brake system includes the hydraulic adjustment unit 100 provided in the foregoing embodiment. It should be noted that elements with same functions in FIG. 5 and FIG. 6 use same numbers. For brevity, details are not described below again.

FIG. 6 is a schematic diagram of a brake system according to an embodiment of this application. As shown in FIG. 6, the brake system 200 includes brake wheel cylinders 15 of automobile wheels, and the hydraulic adjustment unit 100. A brake pipe 20 of the hydraulic adjustment unit 100 is connected to the brake wheel cylinders 15 to provide braking force to wheels 311 and 312 of an automobile through the brake wheel cylinders 15.

It should be noted that the brake pipe may be a brake pipe in a dual-circuit brake system, or may be a brake pipe in a distributed brake system. This is not specifically limited in this embodiment of this application.

The brake pipe 20 may be connected to brake wheel cylinders 15 of a first set of wheels 310 of the automobile to provide braking force to the first set of wheels 310. The first set of wheels includes a first wheel 311 and a second wheel 312. The brake pipe 20 includes a first branch 21 and a second branch 22, the first branch 21 is connected to a brake wheel cylinder 15 of the first wheel 311, and the second branch 2 is connected to a brake wheel cylinder 15 of the second wheel 312.

Optionally, an inlet valve (not shown in the figure) for controlling a pipe to be open or closed is further disposed on each of the first branch 21 and the second branch 22, to perform braking control on a single wheel by controlling the inlet valve to be open or closed.

Optionally, the first wheel 311 and the second wheel 312 may be a right front wheel and a left front wheel, respectively. Alternatively, the first wheel 311 and the second wheel 312 may be a right rear wheel and a left rear wheel, respectively. Alternatively, the first wheel 311 and the second wheel 312 may be a right front wheel and a left rear wheel, respectively. Alternatively, the first wheel 311 and the second wheel 312 may be a right rear wheel and a left front wheel, respectively.

Optionally, the brake pipe 20 may be further connected to brake wheel cylinders of a second set of wheels (not shown in the figure) of the automobile to provide braking force to the second set of wheels.

The brake system 200 may further include a controller (not shown in the figure). The controller is configured to receive measurement information of each sensor in the brake system 200, and control an electrically controlled element such as a driving apparatus 15 and a pipe switching element 61 in the system based on the measurement information.

The brake system 200 in this embodiment of this application has a plurality of working modes, such as forward pressurization, reverse pressurization, conventional depressurization, and fast depressurization. The following separately describes the plurality of working modes with reference to accompanying drawings.

Working Mode 1: Forward Pressurization

Figure 7:
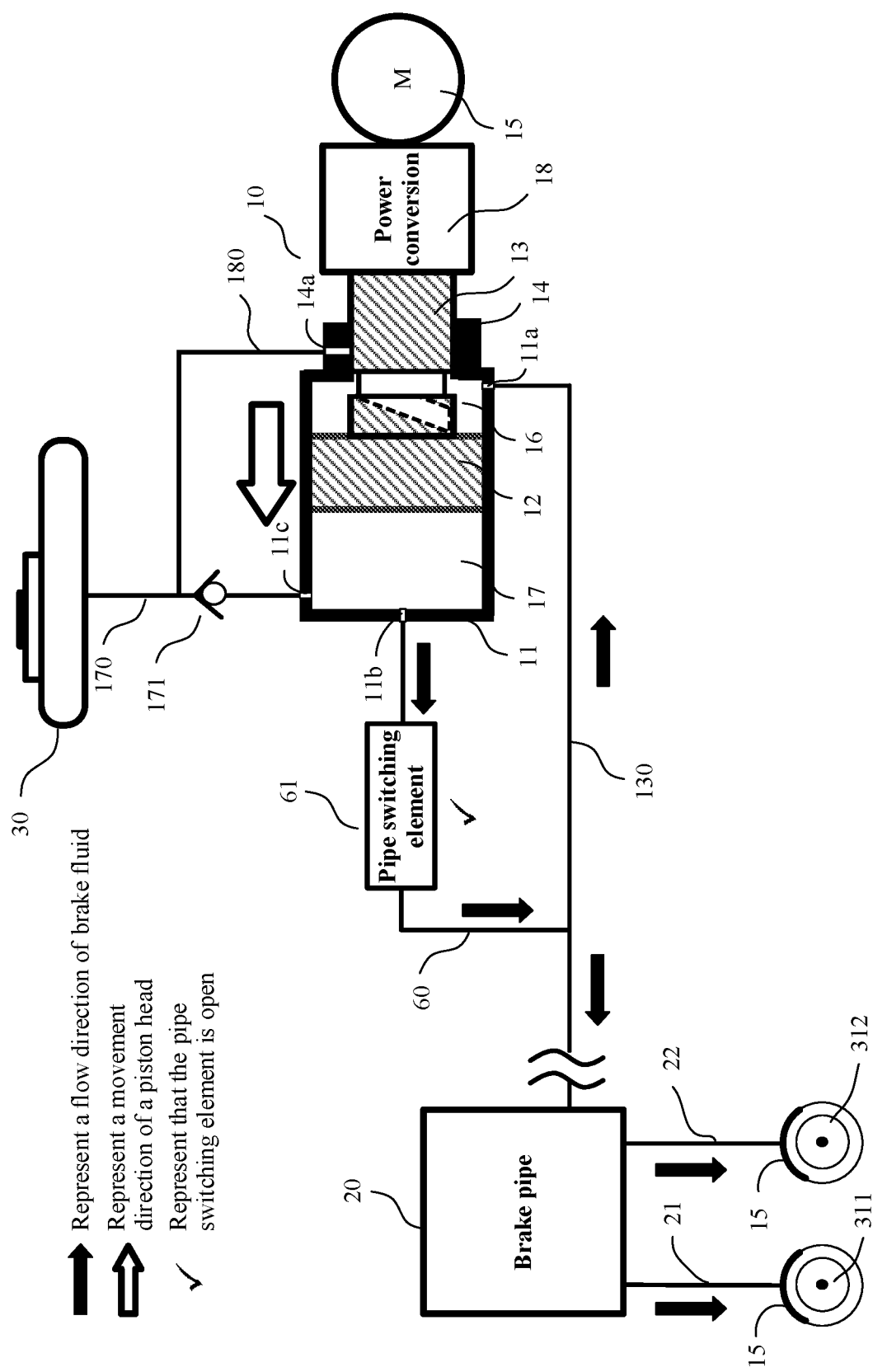
FIG. 7 is a schematic diagram of a working state of a brake system 200 in a forward pressurization mode according to an embodiment of this application.

FIG. 7 is a schematic diagram of a working state of the brake system 200 in the forward pressurization mode according to an embodiment of this application. As shown in FIG. 7, when the controller of the brake system 200 determines that a forward pressurization operation needs to be performed on the wheel cylinders 15 of the first set of wheels 310 (that is, the braking force to the first set of wheels 310 needs to be increased in this case), the controller controls the driving apparatus 15 to be powered on and work, and converts rotational motion of the driving apparatus 15 into linear motion by using a power conversion mechanism 18, to push a push rod 13 to move to the left. A second depressurization hole 13a is disconnected from a first depressurization hole 14a. The controller controls the pipe switching element 61 to open, so that a first pipe 60 is open, and a piston 12 moves leftward under the leftward thrust of the push rod 13 to push brake fluid in a second hydraulic chamber 17 into the first pipe 60.

After the push rod 13 moves to the left by a specific distance, a volume change amount $\Delta V1$ of the second hydraulic chamber 17 is greater than a volume change amount $\Delta V2$ of a first hydraulic chamber 16, and a difference between the two is a product of a surface area of the push rod 13 and a stroke of the push rod. This ensures that a part of brake fluid may enter the first hydraulic chamber 16 from the first pipe 60 during the leftward movement of the piston 12, to reduce a pressure difference between two sides and reduce working power of the driving apparatus 15, and another part of brake fluid enters the brake pipe 20 through a third brake pipe 130, to implement a pressurization function.

Specifically, a part of the brake fluid in the second hydraulic chamber 17 is replenished into the first hydraulic chamber 16 through a fourth hydraulic adjustment port 11b, the first pipe 60 (the pipe switching element 61), the third brake pipe 130, and a third hydraulic adjustment port 11a.

Another part of brake fluid is discharged into the brake pipe 20 through the fourth hydraulic adjustment port 11b, the first pipe 60 (the pipe switching element 61), and the third brake pipe 130, and then enters the brake wheel cylinders 15 through the first branch 21 and the second branch 22, to increase pressure of brake fluid in the brake wheel cylinders 15, and increase the braking force applied to the first set of wheels 310.

Figure 8A:
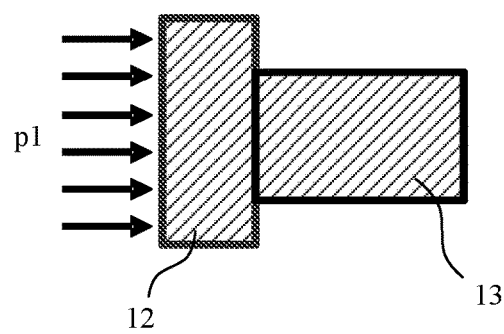
FIG. 8(a) is a schematic diagram of stress analysis of a piston of a conventional hydraulic adjustment apparatus in the forward pressurization mode.
Figure 8B:
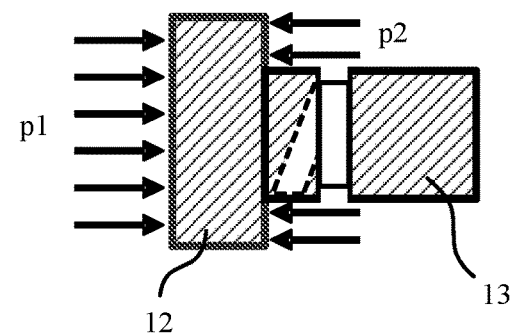
FIG. 8(b) is a schematic diagram of stress analysis of a piston of a hydraulic adjustment apparatus according to an embodiment of the application in the forward pressurization mode.

FIG. 8(a) and FIG. 8(b) are a comparison diagram of stress analysis of pistons between a hydraulic adjustment apparatus according to an embodiment of this application and a conventional hydraulic adjustment apparatus in the forward pressurization mode. FIG. 8(a) is a schematic diagram of stress analysis of a piston of a conventional hydraulic adjustment apparatus in the forward pressurization mode. FIG. 8(b) is a schematic diagram of stress analysis of a piston of a hydraulic adjustment apparatus according to an embodiment of the application in the forward pressurization mode.

As shown in FIG. 8(a), in the conventional hydraulic adjustment apparatus, only unidirectional pressurization can be implemented, so that a side surface of the piston 12 on a side of the push rod 13 is not subject to pressure of brake fluid. Therefore, thrust required by the push rod 13 from the driving apparatus is $F1=p1s1$. $p1$ is pressure in the hydraulic chamber, and $s1$ is a stress area on a left side of the piston 12.

In the same case, the hydraulic adjustment apparatus 10 provided in this application performs forward pressurization. Because the first hydraulic chamber 16 communicates with the second hydraulic chamber 17, pressure in the first hydraulic chamber 16 and the second hydraulic chamber 17 is the same. That is, pressure p1 in the first hydraulic chamber 16 is equal to pressure p2 in the second hydraulic chamber 17.

Due to different hydraulic stress areas on two sides of the piston 12 (the push rod 13 on a right side takes up a specific surface area), pressure drop occurs on the two sides as the piston 12 moves forward. Specifically, in this case, a stress area on the left side of the piston 12 is s1, a stress area on the right side is s2 (s1>s2), and the pressure in the first hydraulic chamber 16 and the second hydraulic chamber 17 is both p1. Therefore, thrust required by the push rod 13 from the driving apparatus is F2=p1(s1−s2). It is clear that, F2 is less than F1.

Compared with the unidirectional hydraulic adjustment apparatus in the conventional technology, in this embodiment of this application, the first hydraulic chamber 16 communicates with the second hydraulic chamber 17, so that the pressure in the first hydraulic chamber 16 and the second hydraulic chamber 17 is the same. This can reduce the thrust required for the forward movement of the piston 12, thereby reducing workload of the driving apparatus 15 and prolonging the life of the motor. If a driving apparatus having the same power as that in the conventional technology is used, the hydraulic adjustment apparatus 10 provided in this application has a faster running speed, that is, a shorter pressure building time, in the forward pressurization mode.

Working Mode 2: Reverse Pressurization

Figure 9:
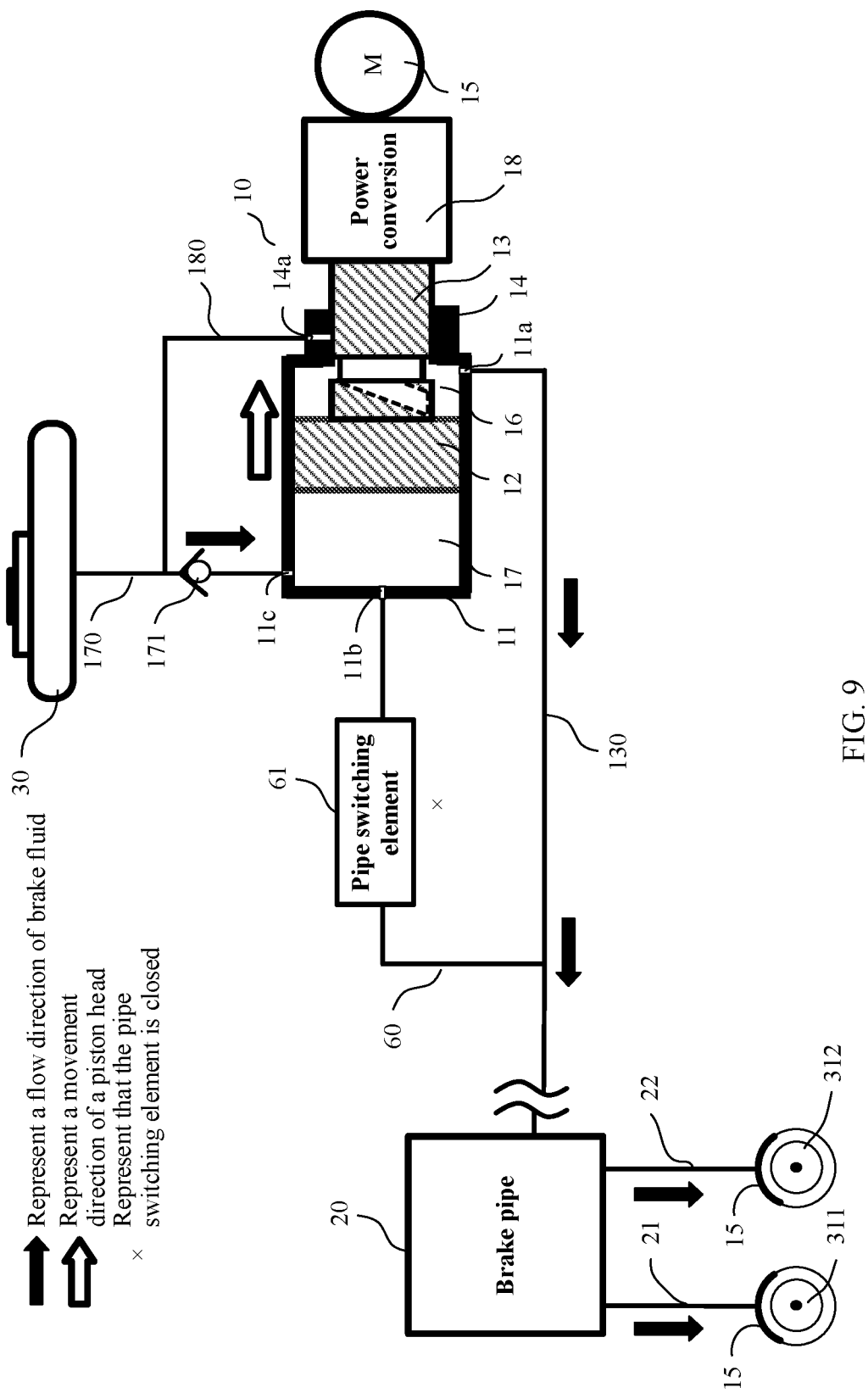
FIG. 9 is a schematic diagram of a working state of the brake system 200 in a reverse pressurization mode according to an embodiment of this application.

FIG. 9 is a schematic diagram of a working state of the brake system 200 in the reverse pressurization mode according to an embodiment of this application. As shown in FIG. 9, when the controller of the brake system 200 determines that a reverse pressurization operation needs to be performed on the wheel cylinders 15 of the first set of wheels 310, the controller controls the driving apparatus 15 to be powered on and work, and converts rotational motion of the driving apparatus 15 into linear motion by using the power conversion mechanism 18, to drive the push rod 13 to move to the right. The second depressurization hole 13a is still disconnected from the first depressurization hole 14a. The controller controls the pipe switching element 61 to close so that the first pipe 60 is closed, and the piston 12 moves rightward under the drive of the push rod 13 to push the brake fluid in the first hydraulic chamber 16 into the third brake pipe 130.

In this case, the brake fluid in the first hydraulic chamber 16 is discharged into the brake pipe 20 through the third hydraulic adjustment port 11a and the third brake pipe 130, and then enters the brake wheel cylinders 15 through the first branch 21 and the second branch 22, to increase pressure of the brake fluid in the brake wheel cylinders 15, and increase the braking force applied to the first set of wheels 310.

The piston 12 moves rightward under the drive of the push rod 13, and the brake fluid in the fluid storage apparatus 30 enters the second hydraulic chamber 17 through an oil return pipe 70 (a one-way valve 171) and a fifth hydraulic adjustment port 11c, to replenish space formed by the rightward movement of the piston 12.

The hydraulic adjustment apparatus 10 provided in this embodiment of this application can implement continuous pressurization. After forward pressurization is completed, reverse pressurization may be performed immediately. After reverse pressurization is completed, forward pressurization may be performed immediately.

For example, the controller may first control the hydraulic adjustment apparatus 10 to perform forward pressurization. In this case, the controller controls the pipe switching element 61 to open, and controls the piston 12 to move leftward. When the piston 12 moves to an outer stop point, the forward pressurization ends, and the controller may continue to control the hydraulic adjustment apparatus 10 to perform reverse pressurization. In this case, the controller may control the pipe switching element 61 to close and control the piston to move rightward until an inner stop point, and then the reverse pressurization ends. Similarly, based on a specific braking need, the controller may continue to control the hydraulic adjustment apparatus 10 to perform forward pressurization, to implement continuous cyclic pressurization.

Figure 10:
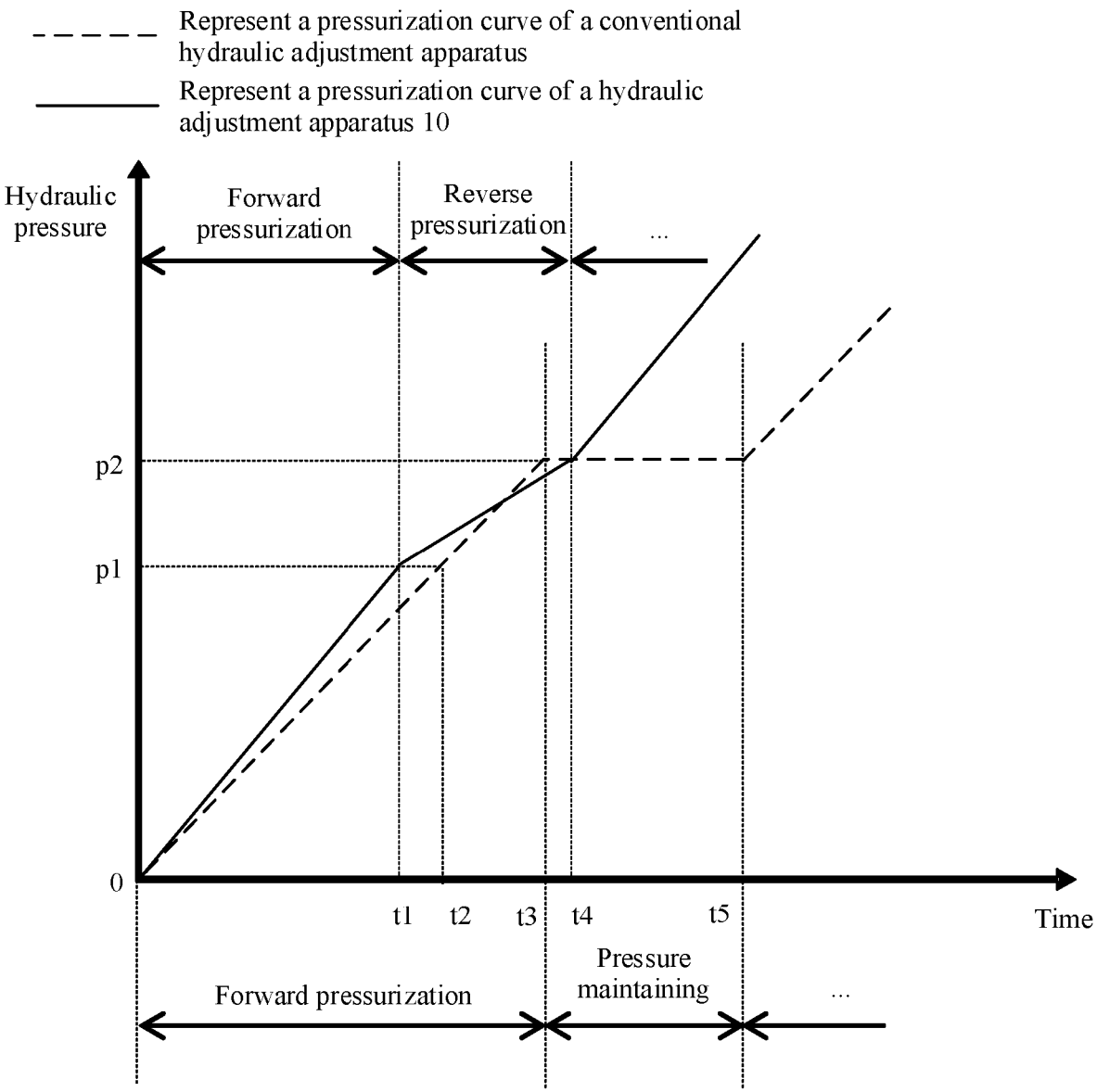
FIG. 10 is a comparison diagram of pressure changes between a hydraulic adjustment apparatus according to an embodiment of this application and a conventional hydraulic adjustment apparatus in a pressurization process.

FIG. 10 is a comparison diagram of pressure changes between a hydraulic adjustment apparatus according to an embodiment of this application and a conventional hydraulic adjustment apparatus in a pressurization process. In FIG. 10, a vertical coordinate represents hydraulic pressure of the brake fluid in the brake pipe 20, and a horizontal coordinate represents a pressurization time.

As shown in FIG. 10, the hydraulic adjustment apparatus 10 performs forward pressurization on the brake pipe 20 in a time period of 0 to t1, and the hydraulic pressure of the brake fluid in the brake pipe 20 changes from 0 to p1. Then the hydraulic adjustment apparatus 10 continues to perform reverse pressurization in a time period of t1 to t4, and pressurization pressure in the brake pipe 20 increases from p1 to p2. After the moment t4, based on a specific braking need, the controller may control the hydraulic adjustment apparatus in this application to continue to perform forward pressurization and reverse pressurization, to implement continuous cyclic pressurization.

For the conventional hydraulic adjustment apparatus, the piston 12 moves slower because greater thrust is required to move the piston 12. Forward pressurization is performed in a period of 0 to t3, and the pressurization pressure in the brake pipe 20 changes from 0 to p2. p2 is greater than p1. Because the piston 12 of the conventional hydraulic adjustment apparatus moves slower, a longer time is required by the conventional hydraulic adjustment apparatus to change the pressurization pressure of the brake pipe 20 from 0 to p1. As shown in FIG. 10, the pressurization pressure is not changed to p1 until a moment t2. The moment t2 is later than the moment t1.

When the conventional hydraulic adjustment apparatus needs to continue to pressurize the brake pipe 20, a pressure maintaining operation needs to be performed on the brake pipe 20 first, to ensure that the piston 12 can be resumed to the inner stop point for a next pressurization operation. As shown in FIG. 10, the pressure maintaining operation is performed on the brake pipe 20 in a time period of t3 to t5, and the next pressurization operation can be performed only when the piston 12 is resumed to the inner stop point at the moment t5.

It can be learned from the content of FIG. 10 that, compared with the conventional hydraulic adjustment apparatus, the hydraulic adjustment apparatus 10 provided in this embodiment of this application is more stable and continuous and has less fluctuation during pressurization, thereby improving comfort during braking. In addition, a pressurization rate is faster during forward pressurization, and an overall pressurization rate is also faster. Further, the pressure in the pipe 20 drops from p2 to p1. In this case, the piston 12 has moved to the position of the inner stop point, and a depressurization operation cannot continue to be performed on the brake pipe 20.

The hydraulic adjustment apparatus 10 provided in the embodiments of this application can perform conventional depressurization and fast depressurization. The conventional depressurization is performed on the brake pipe 20 in a period of 0 to t2, and the pressure in the brake pipe 20 drops from p2 to p1. In this case, the piston 12 has moved to the position of the inner stop point, and the fast depressurization may be performed on the brake pipe 20 immediately. That is, the fast depressurization is performed on the brake pipe 20 in a period of t2 to t3, and the pressure in the brake pipe 20 drops from p1 to 0.

Although the conventional hydraulic adjustment apparatus has higher initial depressurization pressure, a fast depressurization function cannot continue to be implemented when the piston 12 is located at the inner stop point. In other words, the pressure of the brake system is maintained at p1. At the same time, the hydraulic adjustment apparatus 10 provided in this application can still continue to perform depressurization based on a pressure difference of brake fluid in the brake system when the piston 12 is located at the inner stop point.

Working Mode 3: Conventional Depressurization Mode

Figure 11:
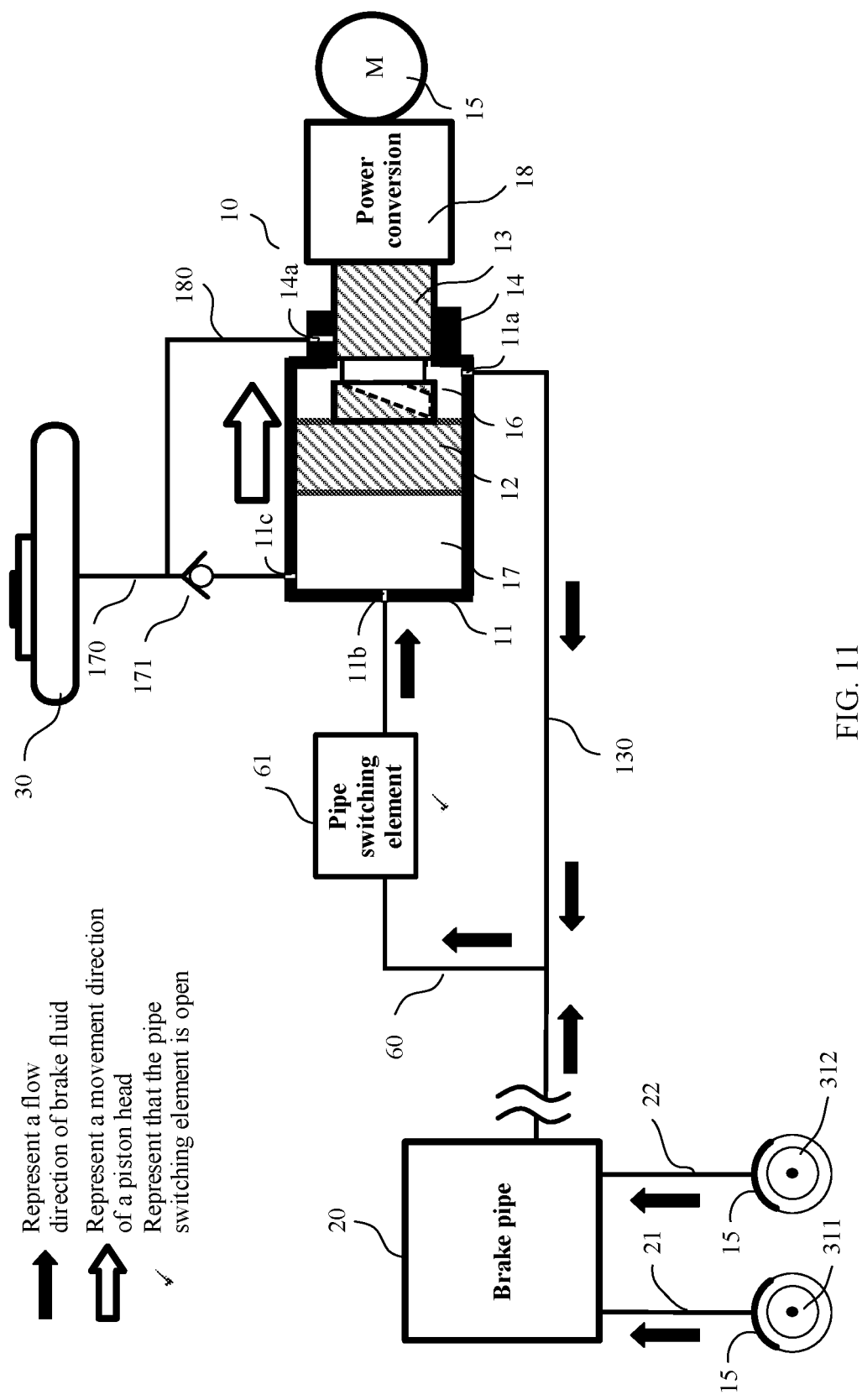
FIG. 11 is a schematic diagram of a working state of the brake system 200 in a conventional depressurization mode according to an embodiment of this application.

FIG. 11 is a schematic diagram of a working state of the brake system 200 in the conventional depressurization mode according to an embodiment of this application. As shown in FIG. 11, when the controller of the brake system 200 determines that a conventional depressurization operation needs to be performed on the brake wheel cylinders 15 of the first set of wheels 310, the controller controls the driving apparatus 15 to be powered on and work, and converts rotational motion of the driving apparatus 15 into linear motion by using the power conversion mechanism 18, to drive the push rod 13 to move to the right. The second depressurization hole 13a is still disconnected from the first depressurization hole 14a. The controller controls the pipe switching element 61 to open, so that the first pipe 60 is open, the piston 12 moves rightward under the drive of the push rod 13, and the brake fluid in the brake pipe 20 and the first hydraulic chamber 16 flows into the second hydraulic chamber 17 through the first pipe 60.

In this case, the brake fluid in the brake wheel cylinders 15 flows into the second hydraulic chamber 17 through the brake pipe 20, the first pipe 60, and the fourth hydraulic adjustment port 11b in sequence, to implement the conventional depressurization operation on the brake wheel cylinders 15.

The brake fluid in the first hydraulic chamber 16 also flows into the second hydraulic chamber 17 through the third hydraulic adjustment port 11a, the third brake pipe 130, the first pipe 60, and the fourth hydraulic adjustment port 11b in sequence.

Working Mode 4: Fast Depressurization Mode

The hydraulic adjustment apparatus 10 provided in this embodiment of this application has two depressurization modes: conventional depressurization and fast depressurization. After the conventional depressurization ends, the fast depressurization may be performed on the brake pipe 20 immediately. Alternatively, based on a specific braking need, the conventional depressurization may be skipped, and the fast depressurization may be directly performed. This is not limited in this application.

Figure 12:
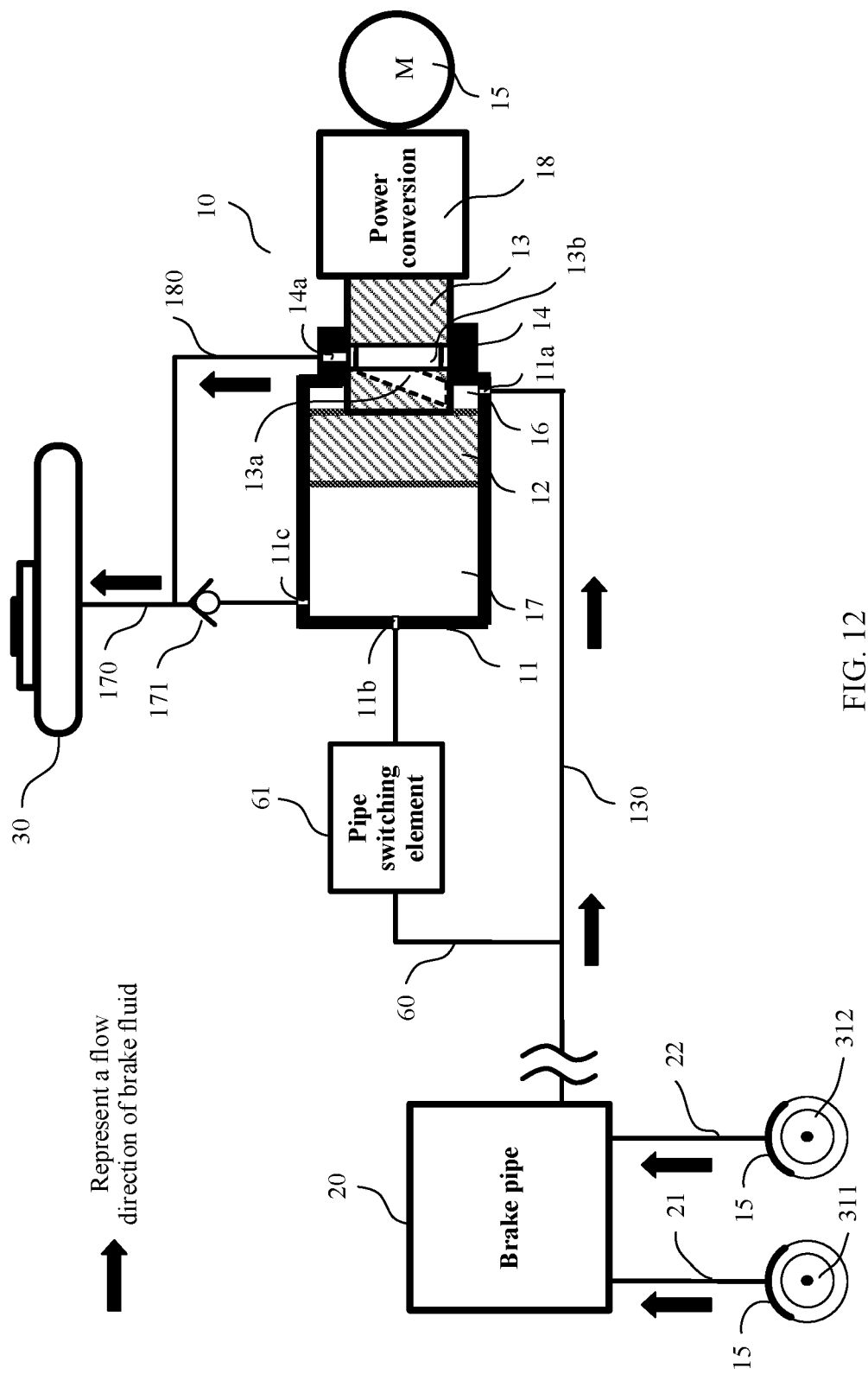
FIG. 12 is a schematic diagram of a working state of the brake system 200 in a fast depressurization mode according to an embodiment of this application.

FIG. 12 is a schematic diagram of a working state of the brake system 200 in the fast depressurization mode according to an embodiment of this application. As shown in FIG. 12, after conventional depressurization ends, fast depressurization may be performed on the brake pipe 20 immediately. In this case, the piston 12 may continue to move to the position of the inner stop point, so that the second depressurization hole 13a and the first depressurization hole 14a are connected. Therefore, the first hydraulic chamber 16 and the fluid storage apparatus 30 are also connected. The controller may control the pipe switching element 61 to be in an initial state of being powered off (open or closed).

In this case, the brake fluid in the brake wheel cylinders 15 is discharged into the fluid storage apparatus 30 through the brake pipe 20, the third brake pipe 130, the third hydraulic adjustment port 11a, the first hydraulic chamber 16, the second depressurization hole 13a, the flow guide groove 13b, the first depressurization hole 14a, and a depressurization pipe 50 in sequence, to implement the fast depressurization operation on the brake wheel cylinders 15.

Figure 13:
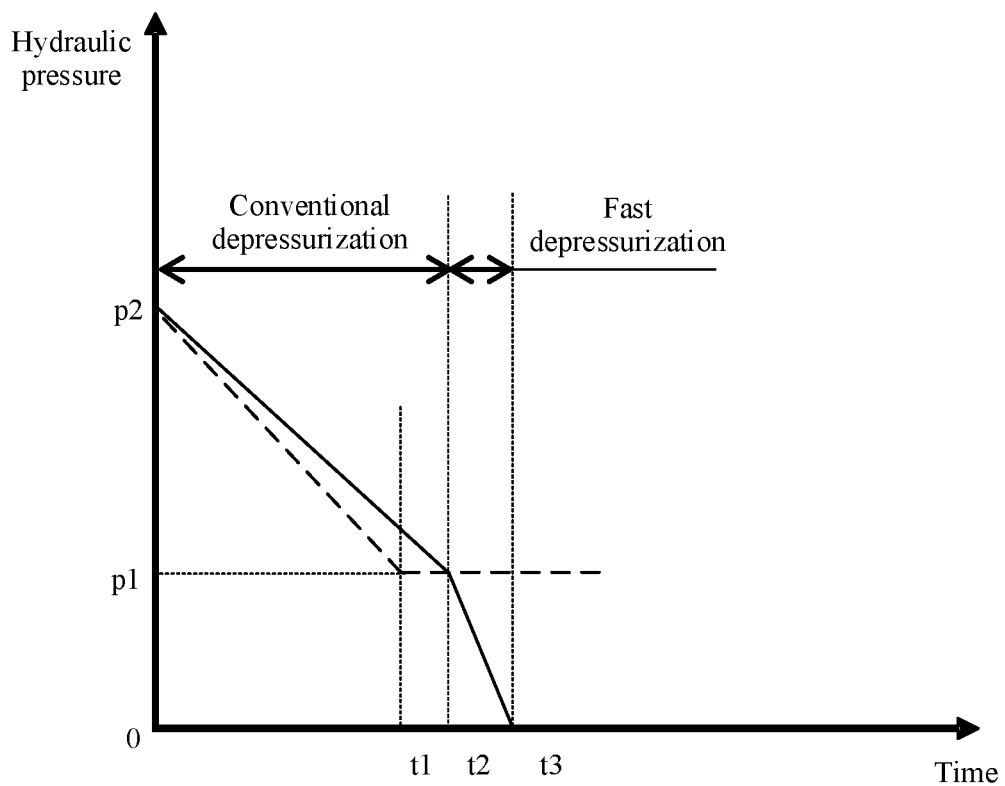
FIG. 13 is a comparison diagram of pressure changes between a hydraulic adjustment apparatus according to an embodiment of this application and a conventional hydraulic adjustment apparatus in a depressurization process.

FIG. 13 is a comparison diagram of pressure changes between a hydraulic adjustment apparatus according to an embodiment of this application and a conventional hydraulic adjustment apparatus in a depressurization process. It should be noted that, to increase comparability of the two hydraulic adjustment apparatuses, in this case, the brake system does not rely on other apparatuses or pipes for depressurization. In FIG. 13, a vertical coordinate represents pressure in the brake pipe 20, and a horizontal coordinate represents a depressurization time.

As shown in FIG. 13, the conventional hydraulic adjustment apparatus can perform only conventional depressurization, the conventional depressurization is performed on the brake pipe 20 in a period of 0 to t1, and the pressure in the brake pipe 20 drops from p2 to p1. In this case, the piston 12 has moved to the position of the inner stop point, and a depressurization operation cannot continue to be performed on the brake pipe 20.

The hydraulic adjustment apparatus 10 provided in this embodiment of this application can perform conventional depressurization and fast depressurization. The conventional depressurization is performed on the brake pipe 20 in a period of 0 to t2, and the pressure in the brake pipe 20 drops from p2 to p1. In this case, the piston 12 has moved to the position of the inner stop point, and the fast depressurization may be performed on the brake pipe 20 immediately. That is, the fast depressurization is performed on the brake pipe 20 in a period of t2 to t3, and the pressure in the brake pipe 20 drops from p1 to 0.

Although the conventional hydraulic adjustment apparatus has higher initial depressurization pressure, a fast depressurization function cannot continue to be implemented when the piston 12 is located at the inner stop point. In other words, the pressure of the brake system is maintained at p1. At the same time, in the hydraulic adjustment apparatus 10 provided in this application, when the piston 12 is located at the inner stop point, because pressure in the fluid storage apparatus 30 is 0, the brake system has a very high depressurization rate in this case, making it more suitable for emergency working conditions such as AEB or an ABS/ESP/TCS working process requiring fast depressurization.

As described above, the brake circuit 20 may be a brake circuit of a dual-circuit brake system. The following describes, with reference to FIG. 14 to FIG. 21, a brake pipe connection manner and a working principle of the hydraulic adjustment apparatus 10 according to the embodiments of this application in a hydraulic adjustment unit by using braking of the dual-circuit brake system as an example.

Figure 14:
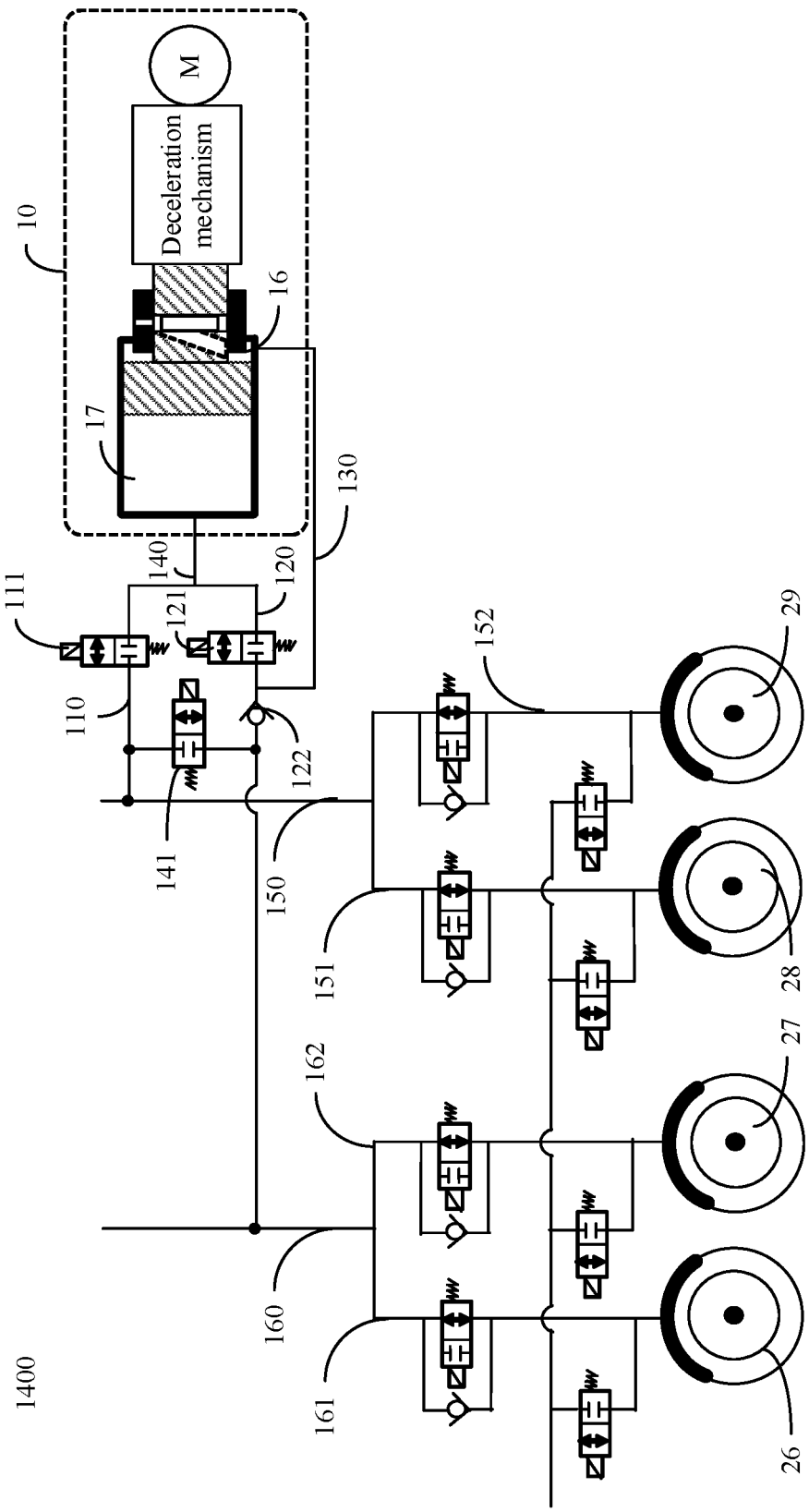
FIG. 14 is a schematic diagram of a dual-circuit hydraulic adjustment unit according to an embodiment of the application.

FIG. 14 is a schematic diagram of a dual-circuit hydraulic adjustment unit according to an embodiment of the application. The hydraulic adjustment unit 1400 shown in FIG. 14 includes a hydraulic adjustment apparatus 10, a first hydraulic chamber 16, a second hydraulic chamber 17, a first brake pipe 110, a second brake pipe 120, a third brake pipe 130, a first control valve 111, and a second control valve 121.

The hydraulic adjustment apparatus 10 has a bidirectional pressurization/depression function, and the hydraulic adjustment apparatus 10 includes the first hydraulic chamber 16 and the second hydraulic chamber 17.

The second hydraulic chamber 17 is separately connected to the first brake pipe 110 and the second brake pipe 120. The first brake pipe 110 is configured to provide braking force to a first set of brake wheel cylinders 28 and 29 in a brake system. The second brake pipe 120 is configured to provide braking force to a second set of brake wheel cylinders 26 and 27 in the brake system. The first control valve 111 is disposed on the first brake pipe 110, and an open/closed state of the first control valve 111 controls an open/closed state of the first brake pipe 110. The second control valve 121 is disposed on the second brake pipe 120, and an open/closed state of the second control valve 121 controls an open/closed state of the second brake pipe 120.

That the open/closed state of the first control valve 111 controls the open/closed state of the first brake pipe 110 may be understood as that when the first control valve 111 is in a closed state, the first brake pipe 110 is closed, and brake fluid cannot flow to the first set of brake wheel cylinders 28 and 29 through the first brake pipe 110.

That the open/closed state of the second control valve 121 controls the open/closed state of the second brake pipe 120 may be understood as that when the second control valve 121 is in a closed state, the second brake pipe 120 is closed, and brake fluid cannot flow to the second set of brake wheel cylinders 26 and 27 through the second brake pipe 120.

Optionally, the first set of brake wheel cylinders 28 and 29 may include a brake wheel cylinder of a right front wheel and a brake wheel cylinder of a left front wheel of an automobile, and the second set of brake wheel cylinders 26 and 27 may include a brake wheel cylinder of a right rear wheel and a brake wheel cylinder of a left rear wheel of the automobile. In this case, the hydraulic brake unit may be understood as being arranged in an H-shaped manner in the automobile. Alternatively, the first set of brake wheel cylinders 28 and 29 may include a brake wheel cylinder of a right front wheel and a brake wheel cylinder of a left rear wheel of an automobile, and the second set of brake wheel cylinders 26 and 27 may include a brake wheel cylinder of a right rear wheel and a brake wheel cylinder of a left front wheel of the automobile. In this case, the hydraulic brake unit may be understood as being arranged in an X-shaped manner in the automobile.

That the second hydraulic chamber 17 is separately connected to the first brake pipe 110 and the second brake pipe 120 may be understood as that the second hydraulic chamber 17 is directly connected to the first brake pipe 110 and the second brake pipe 120. That is, a fourth hydraulic adjustment port 11b of the second hydraulic chamber 17 is a pressure inlet port of the first brake pipe 110, and the fourth hydraulic adjustment port 11b of the second hydraulic chamber 17 is a pressure inlet port of the second brake pipe 120. In other words, the first brake pipe 110 communicates with the second brake pipe 120.

That the second hydraulic chamber 17 is separately connected to the first brake pipe 110 and the second brake pipe 120 may alternatively be understood as that the second hydraulic chamber 17 is connected to the first brake pipe 110 and the second brake pipe 120 through a pipe. That is, the second hydraulic chamber 17 is connected to the first brake pipe 110 and the second brake pipe 120 through a fourth brake pipe 140. As shown in FIG. 1, the second hydraulic chamber 17 is connected to a first end of the fourth brake pipe 140, a second end of the fourth brake pipe 140 is connected to a first end of the first control valve 111 in the first brake pipe 110, and the second end of the fourth brake pipe 140 is connected to a first end of the second control valve 121 in the second brake pipe 120. In other words, the first brake pipe 110 communicates with the second brake pipe 120.

The first hydraulic chamber 16 is connected to the second brake pipe 120 through the third brake pipe 130 in the brake system, and the first hydraulic chamber 16 provides braking force to the second set of brake wheel cylinders 26 and 27 through the second brake pipe 120. When the first control valve 111 and the second control valve 121 are in an open state, the third brake pipe 130 communicates with the first brake pipe 110 through the second brake pipe 120, and the first hydraulic chamber 16 provides braking force to the first set of brake wheel cylinders 28 and 29 through the first brake pipe 110.

The first end of the second control valve 121 is a port connected to the fourth control pipe 140, and the first end of the second control valve 121 is an end other than the first end in two ends of the second control valve 121 that are connected to the second control pipe 120.

As shown in FIG. 14, an interface between the third brake pipe 130 and the second brake pipe 120 is connected to a second end of the second control valve 121, and the second brake pipe 120 communicates with the third brake pipe 130. The open/closed states of the first control valve 111 and the second control valve 121 do not affect a status of communication between the second brake pipe 120 and the third brake pipe 130. However, when the first control valve 111 and the second control valve 121 are both in an open state, the second brake pipe 120 communicates with the first brake pipe 110. In other words, the third brake pipe 130 may communicate with the first brake pipe 110 through the second brake pipe 120. In this case, the first hydraulic chamber 17 may provide braking force to the first set of brake wheel cylinders 28 and 29 through the third brake pipe 130, the second brake pipe 120, and the first brake pipe 110.

Correspondingly, when the first control valve 111 and the second control valve 121 are both in a closed state, the second brake pipe 120 is disconnected from the first brake pipe 110. In other words, the third brake pipe 130 cannot communicate with the first brake pipe 110 through the second brake pipe 120. In this case, the first hydraulic chamber 17 can provide braking force to the second set of brake wheel cylinders 26 and 27 only through the third brake pipe 130 and the second brake pipe 120.

In this embodiment of this application, the second hydraulic chamber 17 provides braking force to the first set of brake wheel cylinders 28 and 29 through the first brake pipe 110 provided with the first control valve 111, and provides braking force to the second set of brake wheel cylinders 26 and 27 through the second brake pipe 120 provided with the second control valve 121, thereby implementing separate pressurization of the first brake pipe 110 and the second brake pipe 120, and avoiding failure to control the open/closed states of the first brake pipe 110 and the second brake pipe 120 when braking force is provided to the first set of brake wheel cylinders 28 and 29 and the second set of brake wheel cylinders 26 and 27 through the first and second brake pipes 110 and 120 with one-way valves in the conventional technology.

In addition, the second hydraulic chamber 16 may reuse the first brake pipe 110 provided with the first control valve 111 and the second brake pipe 120 provided with the second control valve 121 to determine whether to provide braking force to the second set of brake wheel cylinders 26 and 27, thereby reducing a quantity of control valves in the brake system and reducing costs of the brake system.

When braking force is provided to the first set of brake wheel cylinders 28 and 29 and the second set of brake wheel cylinders 26 and 27 through the first brake pipe 110 and the second brake pipe 120 respectively, to implement pressure balancing of brake fluid between the two brake pipes, a third control valve 141 may be disposed between a second end of the first control valve 111 and the second end of the second control valve 121. The third control valve 141 controls communication between the second end of the second control valve 121 and the second end of the first control valve 111. In this way, when the third control valve 141 is in an open state, the second end of the first control valve 111 and the second end of the second control valve 121 are connected, and pressure is balanced between the two brake pipes. Certainly, if the problem of pressure balancing between the two brake pipes is not considered, the third control valve 141 may not be disposed. This is not limited in this embodiment of this application.

It should be noted that, because the third control valve 141 is configured to balance the pressure of the brake fluid between the first brake pipe 110 and the second brake pipe 120, the third control valve 141 may alternatively be referred to as a "pressure balancing valve 141".

After the third control valve 141 is in an open state, a part of brake fluid in the first brake pipe 110 flows to the second brake pipe 120 through the third control valve 141, and flows to the second hydraulic chamber 17 through the second control valve 121. Consequently, this part of brake fluid cannot reach the brake wheel cylinders. This reduces braking efficiency. To avoid this problem, as shown in FIG. 14, a first one-way valve 122 may be disposed between a first interface and a second interface. The first interface is an interface between the third brake pipe 130 and the second brake pipe 120, and the second interface is an interface between the third control valve 141 and the second brake pipe 120. The first one-way valve 122 allows brake fluid to flow from the first interface to the second interface, and the first one-way valve 122 blocks brake fluid from flowing from the second interface to the first interface. Certainly, if the braking efficiency problem is not considered, the first one-way valve 122 may not be disposed. This is not limited in this embodiment of this application.

When the first control valve 111 and the second control valve 121 are in an open state, the first hydraulic chamber 16 may provide braking force to the first set of brake wheel cylinders 27 and 28 through the second brake pipe 120 and the first brake pipe 110. However, when brake fluid flows from the second brake pipe 120 to the first control valve 111 through the second control valve 121, a part of brake fluid may flow into the second hydraulic chamber 17 through the fourth brake pipe 140. This reduces, to some extent, efficiency of the first hydraulic chamber 16 in providing braking force to the first set of brake wheel cylinders 27 and 28.

To avoid the foregoing problem, a fourth control valve 142 may be disposed on the fourth brake pipe 140 to control the fourth brake pipe 140 to be open or closed by opening or closing the fourth control valve 142. In this way, when the first control valve 111 and the second control valve 121 are in an open state, the fourth control valve 142 is in a closed state. In this case, when brake fluid flows from the second brake pipe 120 to the first control valve 111 through the second control valve 121, brake fluid entering the fourth brake pipe 140 is blocked by the fourth control valve 142, and cannot flow into the second hydraulic chamber 17. For an arrangement manner of the control valves on the brake pipes, refer to FIG. 15.

As described above, the first control valve 111 and the second control valve 121 can be open or closed only to control the first hydraulic chamber 16 whether to provide braking force to the first set of brake wheel cylinders 28 and 29, but cannot control the first hydraulic chamber 16 whether to provide braking force to the second set of brake wheel cylinders 26 and 27. Therefore, a fifth control valve 131 may be further disposed on the third brake pipe 130, to control the third brake pipe 130 to be open or closed by an open/closed state of the fifth control valve 131.

Figure 16:
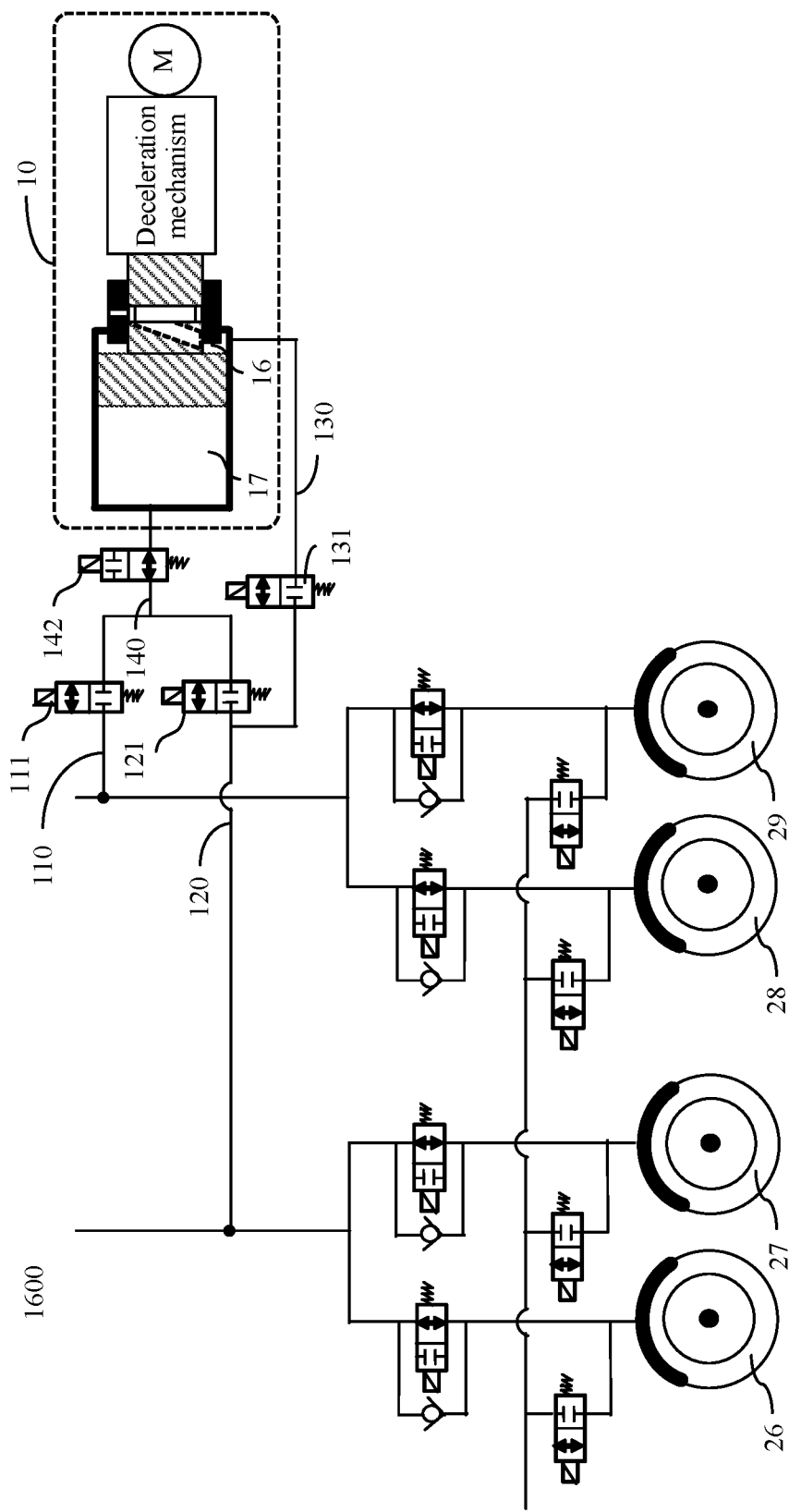
FIG. 16 is a schematic diagram of a dual-circuit hydraulic adjustment unit according to another embodiment of the application.

As shown in FIG. 16, when the fifth control valve 131 is in an open state, the third brake pipe 130 is open, and the first hydraulic chamber 16 may provide braking force to the second set of brake wheel cylinders 26 and 27 through the third brake pipe 130 and the second brake pipe 120. When the fifth control valve 131 is in a closed state, the third brake pipe 130 is closed, and the first hydraulic chamber 16 cannot provide braking force to the second set of brake wheel cylinders 26 and 27 through the third brake pipe 130 and the second brake pipe 120.

Figure 15:
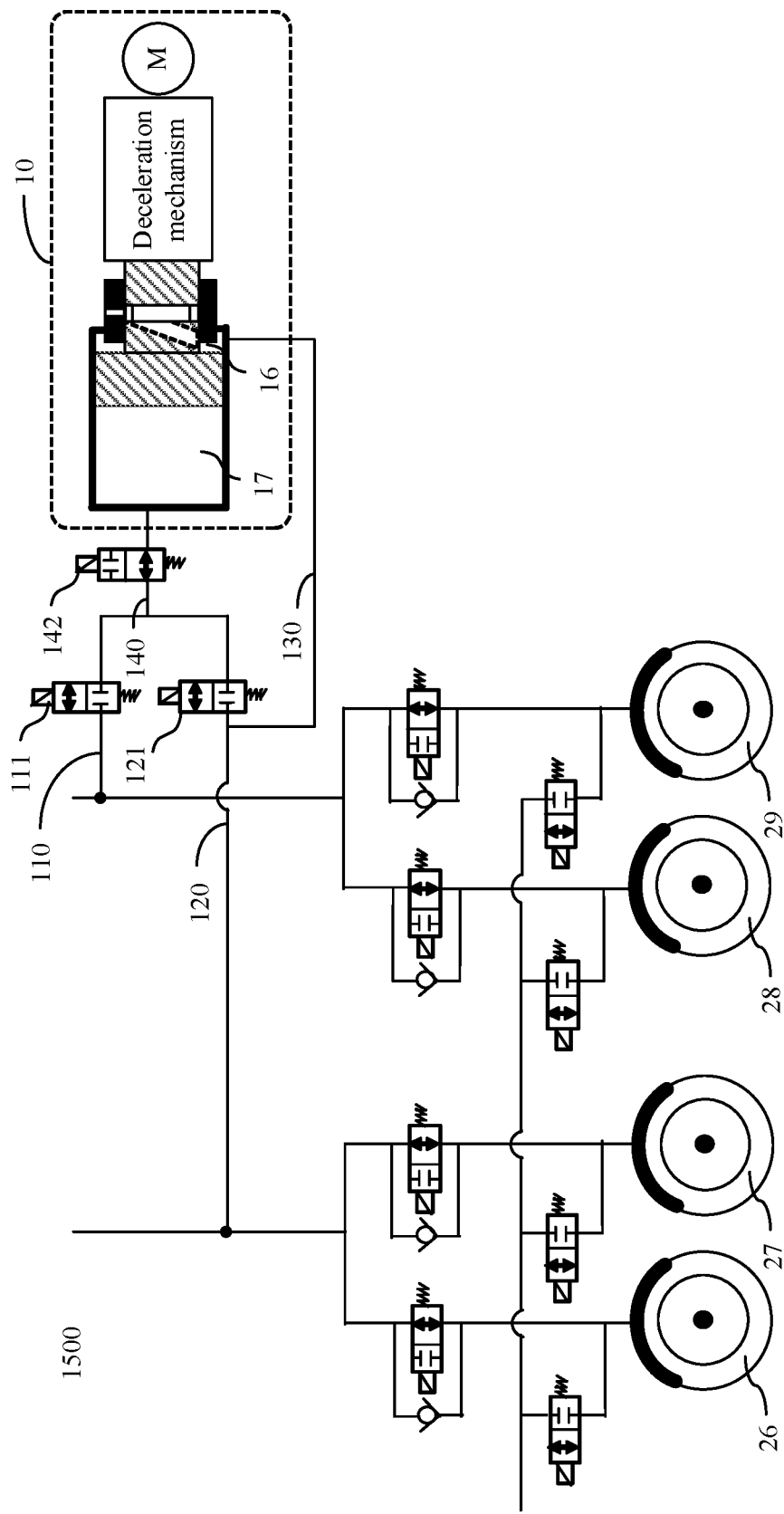
FIG. 15 is a schematic diagram of a dual-circuit hydraulic adjustment unit according to another embodiment of the application.
Figure 17:
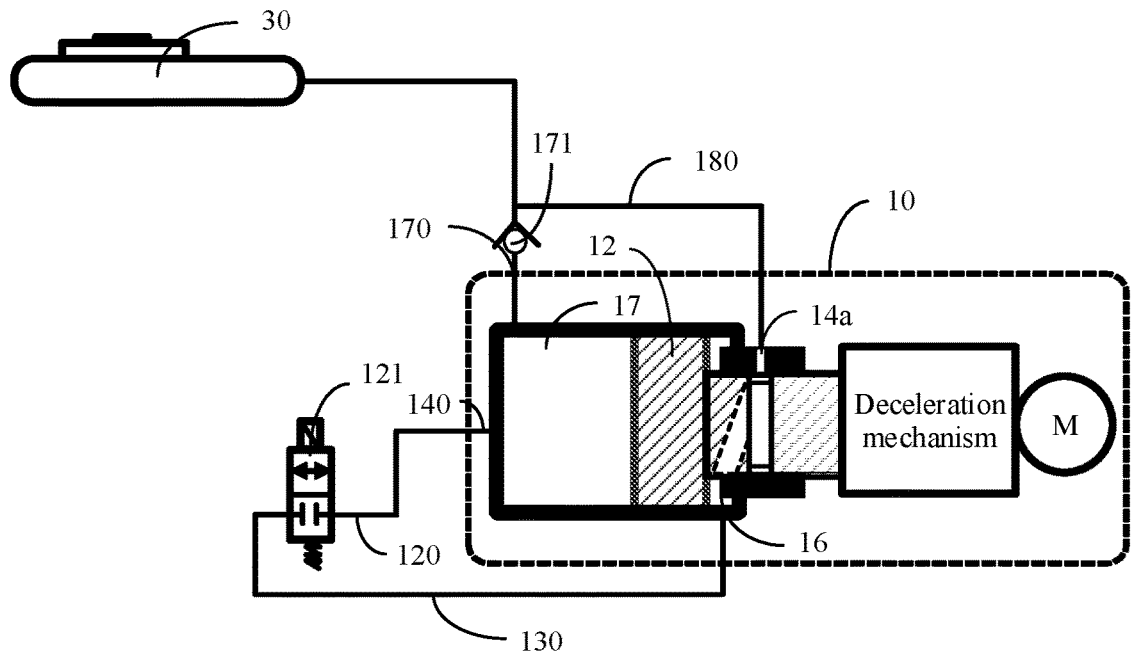
FIG. 17 is a schematic diagram of a connection manner 1 between a fluid storage apparatus and a hydraulic adjustment apparatus 10 according to an embodiment of this application.
Figure 18:
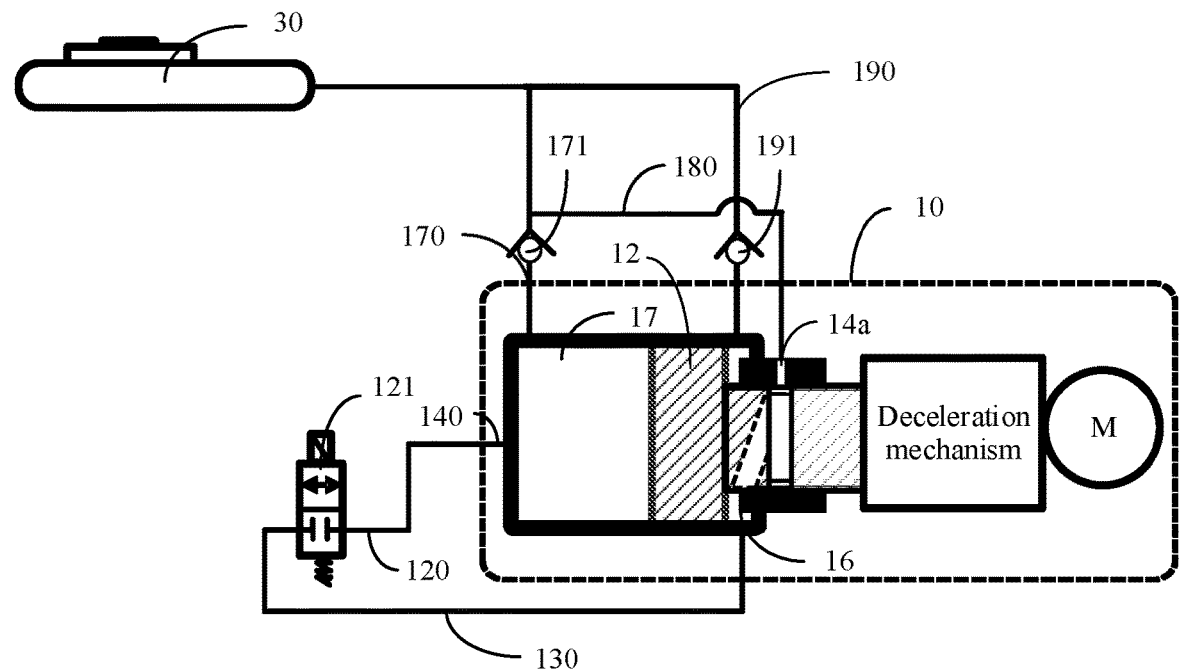
FIG. 18 is a schematic diagram of a connection manner 2 between the fluid storage apparatus and the hydraulic adjustment apparatus 10 according to an embodiment of this application.

The foregoing describes the connection manner between the hydraulic adjustment apparatus and the dual-circuit brake system in the embodiments of this application with reference to FIG. 14 to FIG. 16, and the following describes a connection manner between the hydraulic adjustment apparatus and the fluid storage apparatus 30 with reference to FIG. 17 and FIG. 18. It should be understood that, for ease of understanding, the following describes a connection manner between the hydraulic adjustment apparatus 10 and the fluid storage apparatus 30 by using the hydraulic adjustment apparatus 10 as an example.

Connection manner 1: The second hydraulic chamber 17 is provided with a fluid inlet pipe 1 170 connected to the fluid storage apparatus 30, and the first hydraulic chamber 16 is not provided with a fluid inlet pipe connected to the fluid storage apparatus 30.

FIG. 17 is a schematic diagram of the connection manner 1 between the fluid storage apparatus and the hydraulic adjustment apparatus 10 according to an embodiment of this application. In a hydraulic adjustment unit 1700 shown in FIG. 17, a one-way valve 171 is disposed on a fluid inlet pipe 1, and the one-way valve 171 allows brake fluid in the fluid inlet pipe 1 to flow from a fluid storage apparatus 30 to a second hydraulic chamber 17. A first hydraulic adjustment port (also referred to as a "fluid outlet port") 14a on a first hydraulic chamber 16 is connected to a first fluid outlet pipe 180.

Correspondingly, when a second control valve 121 is in an open state, in a forward pressurization mode of a hydraulic adjustment apparatus 10, a part of brake fluid in the second hydraulic chamber 17 flows into a dual-circuit brake system, and a part flows into a third brake pipe 130 through the second control valve 121 and flows into the first hydraulic chamber 16 through the third brake pipe 130. In other words, in a forward pressurization process, a fluid inlet pipe of the first hydraulic chamber 16 is the third brake pipe 130.

In a forward depressurization process, as a piston 12 moves forward, brake fluid in the dual-circuit brake system is drawn into the second hydraulic chamber 17, and after the piston 12 moves to an inner stop point, remaining brake fluid in the dual-circuit brake system flows to the fluid storage apparatus 30 through the first fluid outlet pipe 180.

Connection manner 2: The first hydraulic chamber 16 is provided with a fluid inlet pipe 2 190 connected to the fluid storage apparatus 30, and the second hydraulic chamber 17 is provided with a fluid inlet pipe 1 170 connected to the fluid storage apparatus 30.

FIG. 18 is a schematic diagram of the connection manner 2 between the fluid storage apparatus and the hydraulic adjustment apparatus 10 according to an embodiment of this application. In a hydraulic adjustment unit 1800 shown in FIG. 18, a one-way valve 171 is disposed on a fluid inlet pipe 1, and the one-way valve 171 allows brake fluid in the fluid inlet pipe 1 to flow from a fluid storage apparatus 30 to a second hydraulic chamber 17. A first hydraulic adjustment port (also referred to as a "fluid outlet port") 14a on a first hydraulic chamber 16 is connected to a first fluid outlet pipe 180.

A one-way valve 191 is disposed on a fluid inlet pipe 2 190, and the one-way valve 191 allows brake fluid in the fluid inlet pipe 2 to flow from the fluid storage apparatus 30 to the first hydraulic chamber 16, and blocks the brake fluid in the fluid inlet pipe 2 from flowing from the first hydraulic chamber 16 to the fluid storage apparatus 30.

Correspondingly, when a second control valve 121 is in an open state, in a forward pressurization mode of a hydraulic adjustment apparatus 10, a part of brake fluid in the second hydraulic chamber 17 flows into a dual-circuit brake system, and a part flows into a third brake pipe 130 through the second control valve 121 and flows into the first hydraulic chamber 16 through the third brake pipe 130. In other words, in a forward pressurization process, a fluid inlet pipe of the first hydraulic chamber 16 is the third brake pipe 130.

In a forward depressurization process, as a piston 12 moves forward, brake fluid in the dual-circuit brake system is drawn into the second hydraulic chamber 17, and after the piston 12 moves to an inner stop point, remaining brake fluid in the dual-circuit brake system flows to the fluid storage apparatus 30 through the first fluid outlet pipe 180.

The foregoing describes the connection manner between the hydraulic adjustment apparatus 10 and the dual-circuit brake pipe and the connection manner between the hydraulic adjustment apparatus 10 and the fluid storage apparatus 30 with reference to FIG. 2 to FIG. 18. The hydraulic adjustment units 1400 to 1600 shown above may be arbitrarily combined with the hydraulic adjustment units 1700 and 1800. The following describes, by using a combination of the hydraulic adjustment unit 1400 and the hydraulic adjustment unit 1800, a combination of the hydraulic adjustment unit 1500 and the hydraulic adjustment unit 1800, and a combination of the hydraulic adjustment unit 1600 and the hydraulic adjustment unit 1800 as examples, a mechanism in which braking force is provided by the hydraulic adjustment mechanism 10 in a brake system.

It should be noted that, in the brake system shown below, a manual braking mode triggered by a driver by depressing a brake pedal, a wire control braking mode triggered by a driver by depressing a brake pedal, and a driverless braking mode in an automated driving scenario may be implemented. A braking process and principle in the manual braking mode are similar to a braking process in a manual braking mode of an existing brake system, and details are not described for brevity. The following mainly describes bidirectional pressurization and bidirectional depressurization processes of the hydraulic adjustment apparatus 10 in the wire control mode and the driverless braking mode.

Figure 19:
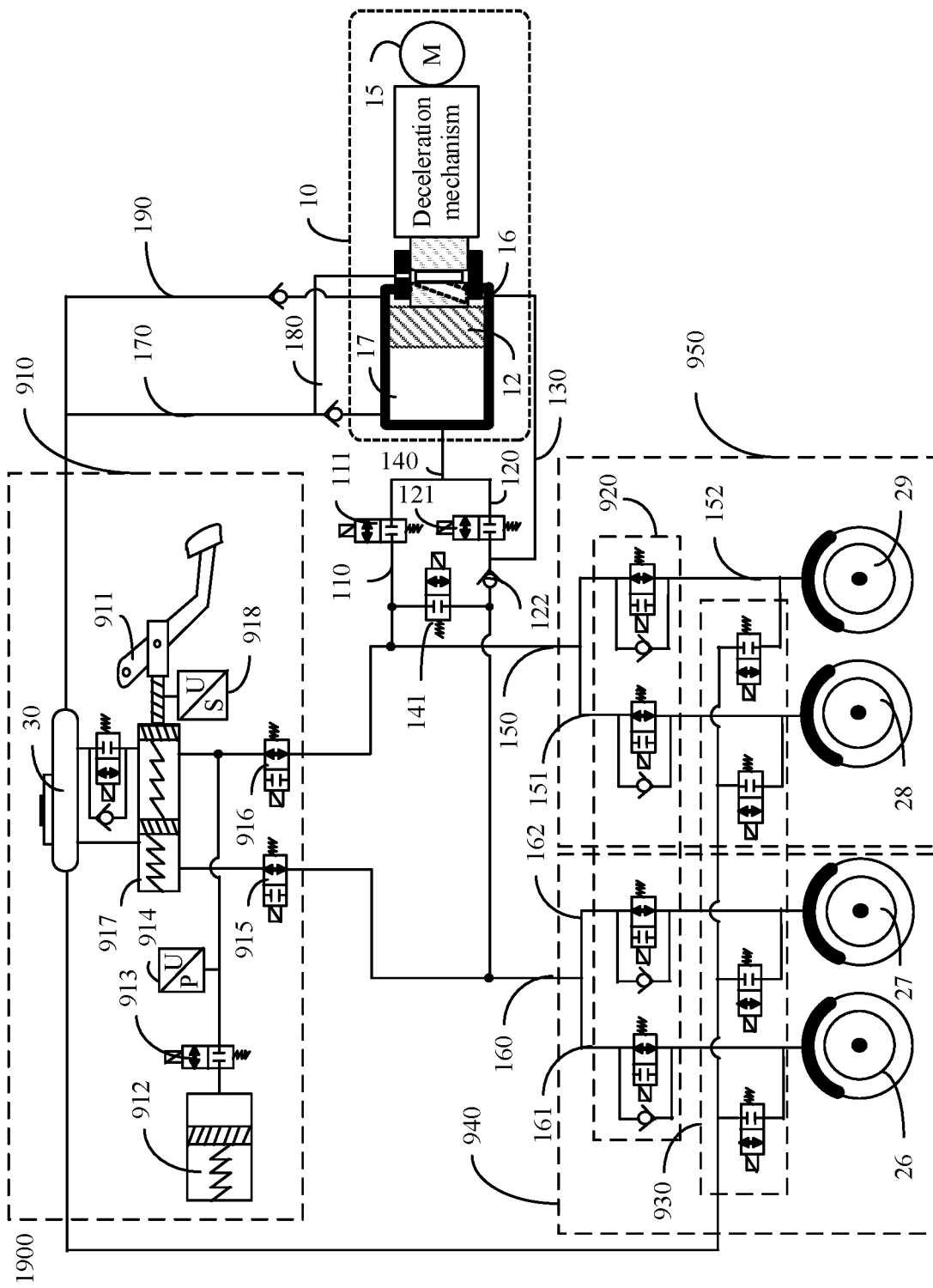
FIG. 19 is a schematic diagram of a hydraulic adjustment unit according to an embodiment of this application.

The following describes, with reference to FIG. 19, a hydraulic adjustment unit 1900 formed by combining the hydraulic adjustment unit 1400 and the hydraulic adjustment unit 1800. FIG. 19 is a schematic diagram of a hydraulic adjustment unit according to an embodiment of this application. Functions implemented by a primary cylinder pressurization adjustment unit 910 in the hydraulic adjustment unit 1900 shown in FIG. 19 are a manual braking mode and a wire control braking mode that require participation of a driver.

With the primary cylinder pressurization adjustment unit 910, the driver depresses a brake pedal 911, so that brake fluid in a primary brake cylinder 917 flows into a pedal feel simulator 912 through a brake pipe in which a control valve 913 is located. In the wire control braking mode, a control valve 915 and a control valve 916 are in a closed state. Correspondingly, a hydraulic adjustment apparatus 10 provides braking force to a dual-circuit brake system based on a pedal stroke detected by a pedal stroke sensor 918 or pressure of the brake fluid detected by a pressure sensor 914. In the manual braking mode, the control valve 915 and the control valve 916 are in an open state, and the brake fluid provides braking force to brake wheel cylinders 26, 27, 28, and 29 through a brake pipe 160 and a brake pipe 150.

In a bidirectional pressurization mode of the pressure adjustment apparatus 10, a first control valve 111, a second control valve 121, a third control valve 141, and fluid inlet valves 920 corresponding to the brake wheel cylinders 26, 27, 28, and 29 are in an open state, and the control valve 915, the control valve 916, and fluid outlet valves 930 corresponding to the brake wheel cylinders 26, 27, 28, and 29 are in a closed state.

In a forward pressurization process, a driving apparatus 15 drives a piston 12 to compress a volume of a second hydraulic chamber 17, to squeeze brake fluid in the second hydraulic chamber 17 into the brake pipe 150 and the brake pipe 160 through a first brake pipe 110 and a second brake pipe 120 respectively, and squeeze the brake fluid into the brake wheel cylinders 28 and 29 through the brake pipe 150 and into the brake wheel cylinders 26 and 27 through the brake pipe 160.

When the piston 12 compresses the volume of the second hydraulic chamber 17, a part of brake fluid may further enter a first hydraulic chamber 16 through a third brake pipe 130, to replenish the first hydraulic chamber 16, to reduce driving force of the driving apparatus 15 to drive the piston 12. In addition, brake fluid in a fluid storage apparatus 30 may further enter the first hydraulic chamber 16 through a fluid inlet pipe 2 190, to replenish the first hydraulic chamber 16, to reduce the driving force of the driving apparatus 15 to drive the piston 12.

In a reverse pressurization process, when the driving apparatus 15 drives the piston 12 to compress a volume of the first hydraulic chamber 16, to squeeze a part of brake fluid in the first hydraulic chamber 16 into the brake pipe 160 through the third brake pipe 130 and the second brake pipe 120 that communicate with each other, to provide braking force to the second set of brake wheel cylinders 26 and 27.

Another part of brake fluid in the first hydraulic chamber 16 enters the second brake pipe 120 through the third brake pipe 130 and the second brake pipe 120 that communicate with each other, enters the first brake pipe 110 through the second control valve 121 and the first control valve 111, and provides braking force to the first set of brake wheel cylinders 28 and 29 through the brake pipe 150.

After the brake fluid flows through the second control valve 121, a part flows into the second hydraulic chamber 17 through a fourth brake pipe 140, to replenish the second hydraulic chamber 17, to reduce the driving force of the driving apparatus 15 to drive the piston 12. In addition, brake fluid in the fluid storage apparatus 30 may further enter the second hydraulic chamber 17 through a first fluid inlet pipe 2 170, to replenish the second hydraulic chamber 17, to reduce the driving force of the driving apparatus 15 to drive the piston 12.

In a forward depressurization mode of the hydraulic adjustment apparatus 10, the control valve 915, the control valve 916, and the fluid outlet valves 930 corresponding to the brake wheel cylinders 26, 27, 28 and 29 are in a closed state, and the fluid inlet valves 920 corresponding to the brake wheel cylinders 26, 27, 28 and 29, the first control valve 111, the second control valve 121, and the third control valve 141 are in an open state.

In a forward depressurization process, when the driving apparatus 15 drives the piston 12 to compress the volume of the first hydraulic chamber 16, to draw brake fluid in the brake wheel cylinders 26, 27, 28 and 29 into the second hydraulic chamber 17 through the first brake pipe 110. Because a first one-way valve 122 is disposed on the second brake pipe 120, the brake fluid in the brake wheel cylinders 26, 27, 28 and 29 is blocked by the first one-way valve 122 after being drawn into the second brake pipe 120, and can only flow to the first brake pipe 110 through a brake pipe in which the third control valve 141 is located and flow into the second hydraulic chamber 17.

After the piston 12 moves to an inner stop point, the volume of the second hydraulic chamber 17 is maximized. In this case, the second hydraulic chamber 17 cannot receive more brake fluid, and remaining brake fluid in the brake wheel cylinders 26, 27, 28 and 29 may continue to flow to the second control valve 121 through the first brake pipe 110, and flow to the third brake pipe 130 through the second control valve 121, and then flow into the second hydraulic chamber 16 through the third brake pipe 130, and flow into the fluid storage apparatus 30 through a first fluid outlet pipe 180.

In a bidirectional pressurization mode of the pressure adjustment apparatus 10 for single-circuit braking, it is assumed that a brake circuit 940 fails, and the pressure adjustment apparatus 10 needs to provide braking force to a brake circuit 950.

In this case, the third control valve 141, the second control valve 121, the control valve 915, and the control valve 916 are in a closed state, and the first control valve 111 is in an open state.

In a forward pressurization process, when the driving apparatus 15 drives the piston 12 to compress the volume of the second hydraulic chamber 17, to squeeze brake fluid in the second hydraulic chamber 17 into the brake pipe 150 through the first brake pipe 110, and squeeze the brake fluid into the brake wheel cylinders 28 and 29 through the brake pipe 150. For the second brake pipe 120, because the second control valve 121 and the third control valve 141 are in a closed state, the brake fluid in the second hydraulic chamber 17 cannot flow through the second brake pipe 120.

In addition, brake fluid in the fluid storage apparatus 30 may further enter the first hydraulic chamber 16 through the fluid inlet pipe 2 190, to replenish the first hydraulic chamber 16, to reduce the driving force of the driving apparatus 15 to drive the piston 12.

In the bidirectional pressurization mode of the pressure adjustment apparatus 10 for single-circuit braking, it is assumed that the brake circuit 950 fails, and the pressure adjustment apparatus 10 needs to provide braking force to the brake circuit 940. In this case, the third control valve 141, the first control valve 111, and the control valve 915, the control valve 916 are in a closed state, and the second control valve 121 is in an open state.

In a forward pressurization process, the driving apparatus 15 drives the piston 12 to compress the volume of the second hydraulic chamber 17, to squeeze brake fluid in the second hydraulic chamber 17 into the brake pipe 160 through the second brake pipe 120, and squeeze the brake fluid into the brake wheel cylinders 26 and 27 through the brake pipe 160. For the first brake pipe 110, because the first control valve 111 and the third control valve 141 are in a closed state, the brake fluid in the second hydraulic chamber 17 cannot flow through the first brake pipe 110.

When the piston 12 compresses the volume of the second hydraulic chamber 17, the volume of the first hydraulic chamber 16 is increased, and brake fluid in the fluid storage apparatus 30 may enter the first hydraulic chamber 16 through the fluid inlet pipe 2 190, to replenish the first hydraulic chamber 16, to reduce the driving force of the driving apparatus 15 to drive the piston 12.

Figure 20:
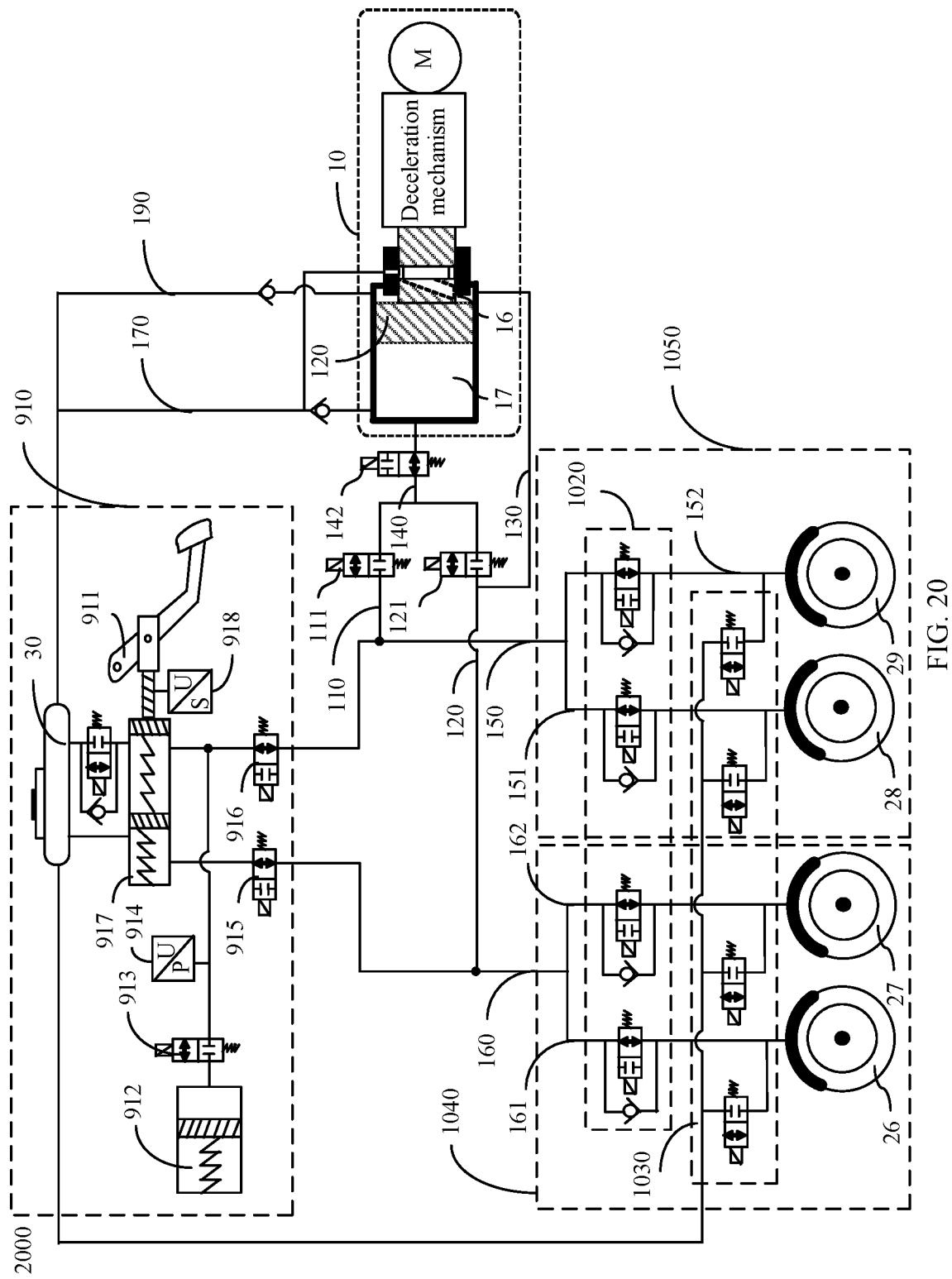
FIG. 20 is a schematic diagram of a hydraulic adjustment unit according to another embodiment of this application.

The following describes, with reference to FIG. 20, a hydraulic adjustment unit 2000 formed by combining the hydraulic adjustment unit 1500 and the hydraulic adjustment unit 1800. FIG. 20 is a schematic diagram of a hydraulic adjustment unit according to another embodiment of this application. Functions implemented by a primary cylinder pressurization adjustment unit 910 in the hydraulic adjustment unit 2000 shown in FIG. 20 are the same as the functions implemented by that in the hydraulic adjustment unit 1900 shown in FIG. 19. For brevity, details are not described below again.

In a bidirectional pressurization mode, the pressure adjustment apparatus 10 may perform a forward pressurization process and a reverse pressurization process.

In the forward pressurization process, a first control valve 111, a second control valve 121, a fourth control valve 142, and fluid inlet valves 1020 corresponding to brake wheel cylinders 26, 27, 28 and 29 are in an open state, and a control valve 915, a control valve 916, and fluid outlet valves 1030 corresponding to the brake wheel cylinders 26, 27, 28 and 29 are in a closed state.

A driving apparatus 15 drives a piston 12 to compress a volume of a second hydraulic chamber 17, to squeeze brake fluid in the second hydraulic chamber 17 into a brake pipe 150 and a brake pipe 160 through a first brake pipe 110 and a second brake pipe 120 respectively, and squeeze the brake fluid into the brake wheel cylinders 28 and 29 through the brake pipe 150 and into the brake wheel cylinders 26 and 27 through the brake pipe 160.

When the piston 12 compresses the volume of the second hydraulic chamber 17, a part of brake fluid may further enter a first hydraulic chamber 16 through a third brake pipe 130, to replenish the first hydraulic chamber 16, to reduce driving force of the driving apparatus 15 to drive the piston 12. In addition, brake fluid in a fluid storage apparatus 30 may further enter the first hydraulic chamber 16 through a fluid inlet pipe 2 190, to replenish the first hydraulic chamber 16, to reduce the driving force of the driving apparatus 15 to drive the piston 12.

In the reverse pressurization process, the first control valve 111, the second control valve 121, and the fluid inlet valves 1020 corresponding to the brake wheel cylinders 26, 27, 28 and 29 are in an open state, and the control valve 915, the control valve 916, the fluid outlet valves 1030 corresponding to the brake wheel cylinders 26, 27, 28 and 29, and the fourth control valve 142 are in a closed state.

The driving apparatus 15 drives the piston 12 to compress a volume of the first hydraulic chamber 16, to squeeze a part of brake fluid in the first hydraulic chamber 16 into the brake pipe 160 through the third brake pipe 130 and the second brake pipe 120 that communicate with each other, to provide braking force to the second set of brake wheel cylinders 26 and 27.

Another part of brake fluid in the first hydraulic chamber 16 enters the second brake pipe 120 through the third brake pipe 130 and the second brake pipe 120 that communicate with each other, enters the first brake pipe 110 through the second control valve 121 and the first control valve 111, and provides braking force to the first set of brake wheel cylinders 28 and 29 through the brake pipe 150. After the brake fluid flows through the second control valve 121, because the fourth control valve 142 is in a closed state, the brake fluid is blocked from flowing into the second hydraulic chamber 17 through a fourth brake pipe 140.

In addition, brake fluid in the fluid storage apparatus 30 may further enter the second hydraulic chamber 17 through a first fluid inlet pipe 2 170, to replenish the second hydraulic chamber 17, to reduce the driving force of the driving apparatus 15 to drive the piston 12.

In a bidirectional depressurization mode, the pressure adjustment apparatus 10 may perform a forward depressurization process and a reverse depressurization process.

In the forward depressurization process, the fourth control valve 142, the control valve 915, the control valve 916, and the fluid outlet valves 1030 corresponding to the brake wheel cylinders 26, 27, 28, and 29 are in a closed state, and the fluid inlet valves 1020 corresponding to the brake wheel cylinders 26, 27, 28 and 29, the first control valve 111, and the second control valve 121 are in an open state.

The driving apparatus 15 drives the piston 12 to compress the volume of the first hydraulic chamber 16, to draw brake fluid in the brake wheel cylinders 26, 27, 28 and 29 into the second hydraulic chamber 17 through the first brake pipe 110 and the second brake pipe 120 respectively.

After the piston 12 moves to an inner stop point, the volume of the second hydraulic chamber 17 is maximized. In this case, the second hydraulic chamber 17 cannot receive more brake fluid, and remaining brake fluid in the first set of brake wheel cylinders 28 and 29 may continue to flow to the second control valve 121 through the first brake pipe 110, and flow to the third brake pipe 130 through the second control valve 121, and then flow into the second hydraulic chamber 16 through the third brake pipe 130, and flow into the fluid storage apparatus 30 through a first fluid outlet pipe 180. Remaining brake fluid in the second set of brake wheel cylinders 26 and 27 may continue to flow to the third brake pipe 130 through the second brake pipe 120, flow into the second hydraulic chamber 16 through the third brake pipe 130, and flow into the fluid storage apparatus 30 through the first fluid outlet pipe 180.

In the reverse depressurization process, when the driving apparatus 15 drives the piston 12 to compress the volume of the second hydraulic chamber 17, so that brake fluid in the second set of brake wheel cylinders 26 and 27 is drawn into the third brake pipe 130 through the second brake pipe 120, and drawn into the first hydraulic chamber 16 through the third brake pipe 130. Brake fluid in the first set of brake wheel cylinders 28 and 29 is drawn into the first brake pipe 110, flows into the third brake pipe 130 through the first control valve 111 and the second control valve 121, and finally flows into the first hydraulic chamber 16 through the third control pipe 130. After the piston 12 moves to an outer stop point, the first hydraulic chamber 16 has a maximum volume and cannot receive more brake fluid. In this case, the fluid outlet valves 1030 corresponding to the brake wheel cylinders 26, 27, 28 and 29 may be controlled to be in an open state, and remaining brake fluid in the brake system may flow to the fluid storage apparatus 30 through the fluid outlet valves 1030 corresponding to the brake wheel cylinders 26, 27, 28 and 29 and a depressurization pipe.

In a bidirectional pressurization mode of the pressure adjustment apparatus 10 for single-circuit braking, it is assumed that a brake circuit 1040 fails, and the pressure adjustment apparatus 10 needs to provide braking force to a brake circuit 1050.

In this case, the second control valve 121, the control valve 915, and the control valve 916 are in a closed state, and the third control valve 141 and the first control valve 111 are in an open state.

In a forward pressurization process, when the driving apparatus 15 drives the piston 12 to compress the volume of the second hydraulic chamber 17, to squeeze brake fluid in the second hydraulic chamber 17 into the brake pipe 150 through the first brake pipe 110, and squeeze the brake fluid into the brake wheel cylinders 28 and 29 through the brake pipe 150. Because the second control valve 121 in the second brake pipe 120 is in a closed state, the brake fluid in the second hydraulic chamber 17 cannot flow through the second brake pipe 120.

When the piston 12 compresses the volume of the second hydraulic chamber 17, the volume of the first hydraulic chamber 16 is increased, and brake fluid in the fluid storage apparatus 30 may enter the first hydraulic chamber 16 through the fluid inlet pipe 2 190, to replenish the first hydraulic chamber 16, to reduce the driving force of the driving apparatus 15 to drive the piston 12.

In the bidirectional pressurization mode of the pressure adjustment apparatus 10 for single-circuit braking, it is assumed that the brake circuit 1050 fails, and the pressure adjustment apparatus 10 needs to provide braking force to the brake circuit 1040. In this case, the first control valve 111, the control valve 915, and the control valve 916 are in a closed state, and the fourth control valve 142 and the second control valve 121 are in an open state.

The driving apparatus 15 drives the piston 12 to compress the volume of the second hydraulic chamber 17, to squeeze brake fluid in the second hydraulic chamber 17 into the brake pipe 160 through the second brake pipe 120, and squeeze the brake fluid into the brake wheel cylinders 26 and 27 through the brake pipe 160. Because the first control valve 111 in the first brake pipe 110 is in a closed state, the brake fluid in the second hydraulic chamber 17 cannot flow through the first brake pipe 110.

When the piston 12 compresses the volume of the second hydraulic chamber 17, the volume of the first hydraulic chamber 16 is increased, and brake fluid in the fluid storage apparatus 30 may enter the first hydraulic chamber 16 through the fluid inlet pipe 2 190, to replenish the first hydraulic chamber 16, to reduce the driving force of the driving apparatus 15 to drive the piston 12. In addition, as the volume of the first hydraulic chamber 16 is increased, a part of brake fluid in the second brake pipe 120 may further enter the first hydraulic chamber 16 through the third brake pipe 130, to replenish the first hydraulic chamber 16, to reduce the driving force of the driving apparatus 15 to drive the piston 12.

Figure 21:
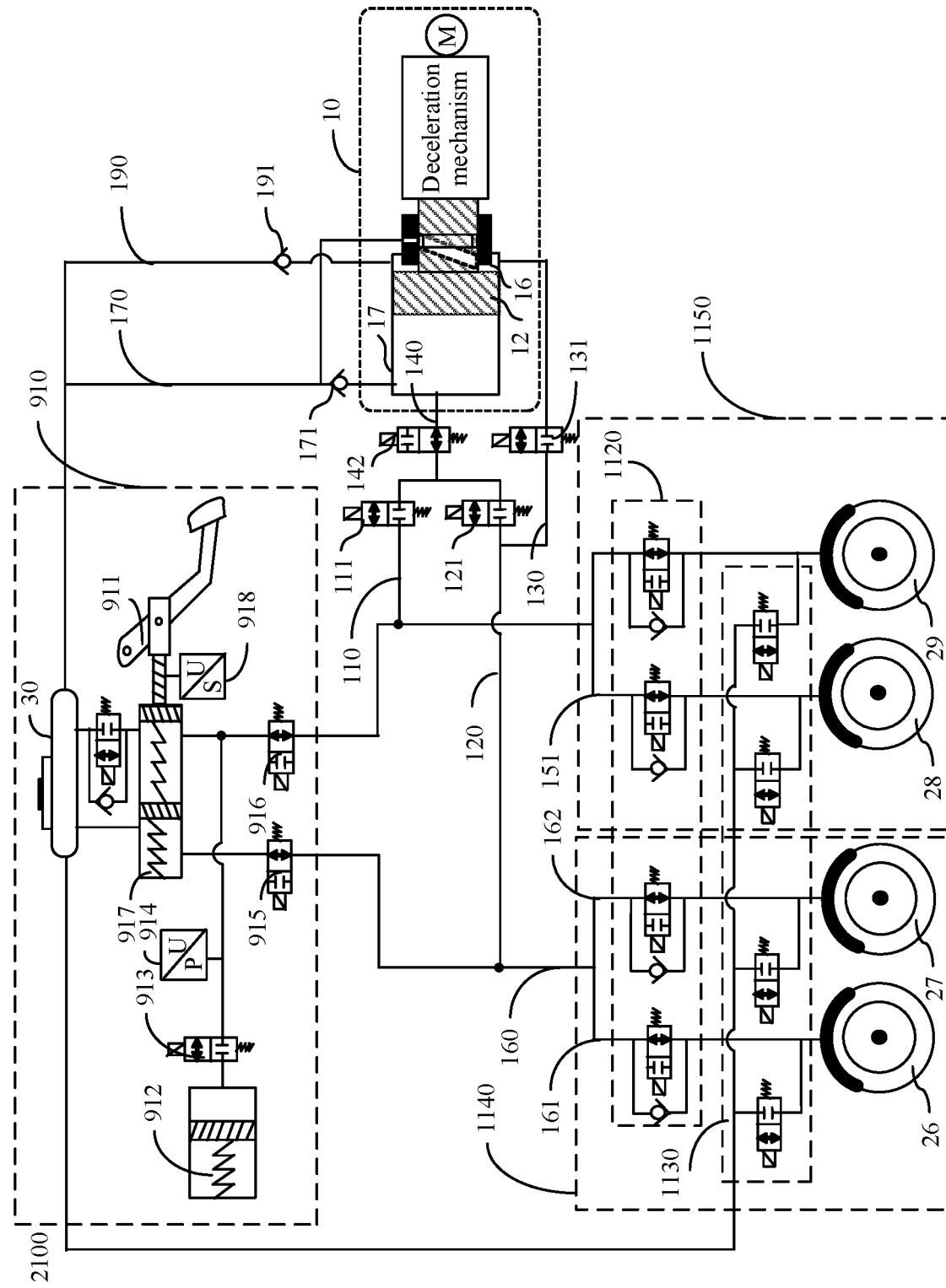
FIG. 21 is a schematic diagram of a hydraulic adjustment unit according to another embodiment of this application.

The following describes, with reference to FIG. 21, a hydraulic adjustment unit 2100 formed by combining the hydraulic adjustment unit 1600 and the hydraulic adjustment unit 1800. FIG. 21 is a schematic diagram of a hydraulic adjustment unit according to an embodiment of this application. Functions implemented by a primary cylinder pressurization adjustment unit 1900 in the hydraulic adjustment unit 2100 shown in FIG. 21 are the same as the functions implemented by that in the hydraulic adjustment unit 1900 shown in FIG. 19. For brevity, details are not described below again.

In a bidirectional pressurization mode, the pressure adjustment apparatus 10 may perform a forward pressurization process and a reverse pressurization process.

In the forward pressurization process, a first control valve 111, a second control valve 121, a fourth control valve 142, and fluid inlet valves 1120 corresponding to brake wheel cylinders 26, 27, 28 and 29 are in an open state, and a fifth control valve 131, a control valve 915, a control valve 916, and fluid outlet valves 1130 corresponding to the brake wheel cylinders 26, 27, 28 and 29 are in a closed state.

A driving apparatus 15 drives a piston 12 to compress a volume of a second hydraulic chamber 17, to squeeze brake fluid in the second hydraulic chamber 17 into a brake pipe 150 and a brake pipe 160 through a first brake pipe 110 and a second brake pipe 120 respectively, and squeeze the brake fluid into the brake wheel cylinders 28 and 29 through the brake pipe 150 and into the brake wheel cylinders 26 and 27 through the brake pipe 160.

When the piston 12 compresses the volume of the second hydraulic chamber 17, brake fluid in a fluid storage apparatus 30 may enter the first hydraulic chamber 16 through a fluid inlet pipe 2 190, to replenish the first hydraulic chamber 16, to reduce driving force of the driving apparatus 15 to drive the piston 12. In addition, because the fifth control valve 131 is in a closed state, brake fluid in the second brake pipe 120 cannot enter the first hydraulic chamber 16 through the third brake pipe 130.

In the reverse pressurization process, the first control valve 111, the second control valve 121, the fifth control valve 131, and the fluid inlet valves 1120 corresponding to the brake wheel cylinders 26, 27, 28 and 29 are in an open state, and the control valve 915, the control valve 916, the fluid outlet valves 1130 corresponding to the brake wheel cylinders 26, 27, 28 and 29, and the fourth control valve 142 are in a closed state.

When the driving apparatus 15 drives the piston 12 to compress a volume of the first hydraulic chamber 16, to squeeze a part of brake fluid in the first hydraulic chamber 16 into the brake pipe 160 through the third brake pipe 130 and the second brake pipe 120 that communicate with each other, to provide braking force to the second set of brake wheel cylinders 26 and 27.

Another part of brake fluid in the first hydraulic chamber 16 enters the second brake pipe 120 through the third brake pipe 130 and the second brake pipe 120 that communicate with each other, enters the first brake pipe 110 through the second control valve 121 and the first control valve 111, and provides braking force to the first set of brake wheel cylinders 28 and 29 through the brake pipe 150. After the brake fluid flows through the second control valve 121, because the fourth control valve 142 is in a closed state, the brake fluid is blocked from flowing into the second hydraulic chamber 17 through a fourth brake pipe 140.

In addition, brake fluid in the fluid storage apparatus 30 may further enter the second hydraulic chamber 17 through a first fluid inlet pipe 2 170, to replenish the second hydraulic chamber 17, to reduce the driving force of the driving apparatus 15 to drive the piston 12.

In a bidirectional depressurization mode, the pressure adjustment apparatus 10 may perform a forward depressurization process and a reverse depressurization process.

In the forward depressurization process, the fourth control valve 142, the control valve 915, the control valve 916, and the fluid outlet valves 1130 corresponding to the brake wheel cylinders 26, 27, 28, and 29 are in a closed state, and the fluid inlet valves 1120 corresponding to the brake wheel cylinders 26, 27, 28 and 29, the fifth control valve 131, the first control valve 111, and the second control valve 121 are in an open state.

The driving apparatus 15 drives the piston 12 to compress the volume of the first hydraulic chamber 16, to draw brake fluid in the brake wheel cylinders 26, 27, 28 and 29 into the second hydraulic chamber 17 through the first brake pipe 110 and the second brake pipe 120 respectively.

After the piston 12 moves to an inner stop point, the volume of the second hydraulic chamber 17 is maximized. In this case, the second hydraulic chamber 17 cannot receive more brake fluid, and remaining brake fluid in the first set of brake wheel cylinders 28 and 29 may continue to flow to the second control valve 121 through the first brake pipe 110, and flow to the third brake pipe 130 through the second control valve 121. Because the fifth control valve 131 is in an open state, the brake fluid may flow into the second hydraulic chamber 16 through the third brake pipe 130, and flow into the fluid storage apparatus 30 through a first fluid outlet pipe 180. Remaining brake fluid in the second set of brake wheel cylinders 26 and 27 may continue to flow to the third brake pipe 130 through the second brake pipe 120, flow into the second hydraulic chamber 16 through the third brake pipe 130, and flow into the fluid storage apparatus 30 through the first fluid outlet pipe 180.

In the reverse depressurization process, when the driving apparatus 15 drives the piston 12 to compress the volume of the second hydraulic chamber 17, so that brake fluid in the second set of brake wheel cylinders 26 and 27 is drawn into the third brake pipe 130 through the second brake pipe 120, and drawn into the first hydraulic chamber 16 through the third brake pipe 130. Brake fluid in the first set of brake wheel cylinders 28 and 29 is drawn into the first brake pipe 110, flows into the third brake pipe 130 through the first control valve 111 and the second control valve 121, and finally flows into the first hydraulic chamber 16 through the third control pipe 130. After the piston 12 moves to an outer stop point, the first hydraulic chamber 16 has a maximum volume and cannot receive more brake fluid. In this case, the fluid outlet valves 1130 corresponding to the brake wheel cylinders 26, 27, 28 and 29 may be controlled to be in an open state, and remaining brake fluid in the brake system may flow to the fluid storage apparatus 30 through the fluid outlet valves 1130 corresponding to the brake wheel cylinders 26, 27, 28 and 29 and a depressurization pipe.

In a bidirectional pressurization mode of the pressure adjustment apparatus 10 for single-circuit braking, it is assumed that a brake circuit 1140 fails, and the pressure adjustment apparatus 10 needs to provide braking force to a brake circuit 1150.

In this case, the second control valve 121, the control valve 915, the control valve 916, and the fifth control valve 131 are in a closed state, and the third control valve 141 and the first control valve 111 are in an open state.

In a forward pressurization process, when the driving apparatus 15 drives the piston 12 to compress the volume of the second hydraulic chamber 17, to squeeze brake fluid in the second hydraulic chamber 17 into the brake pipe 150 through the first brake pipe 110, and squeeze the brake fluid into the brake wheel cylinders 28 and 29 through the brake pipe 150. Because the second control valve 121 in the second brake pipe 120 is in a closed state, the brake fluid in the second hydraulic chamber 17 cannot flow through the second brake pipe 120.

When the piston 12 compresses the volume of the second hydraulic chamber 17, the volume of the first hydraulic chamber 16 is increased, and brake fluid in the fluid storage apparatus 30 may enter the first hydraulic chamber 16 through the fluid inlet pipe 2 190, to replenish the first hydraulic chamber 16, to reduce the driving force of the driving apparatus 15 to drive the piston 12.

In the bidirectional pressurization mode of the pressure adjustment apparatus 10 for single-circuit braking, it is assumed that the brake circuit 1150 fails, and the pressure adjustment apparatus 10 needs to provide braking force to the brake circuit 1140.

In this case, the first control valve 111, the control valve 915, the control valve 916, and the fifth control valve 131 are in a closed state, and the fourth control valve 142 and the second control valve 121 are in an open state.

The driving apparatus 15 drives the piston 12 to compress the volume of the second hydraulic chamber 17, to squeeze brake fluid in the second hydraulic chamber 17 into the brake pipe 160 through the second brake pipe 120, and squeeze the brake fluid into the brake wheel cylinders 26 and 27 through the brake pipe 160. Because the first control valve 111 in the first brake pipe 110 is in a closed state, the brake fluid in the second hydraulic chamber 17 cannot flow through the first brake pipe 110.

When the piston 12 compresses the volume of the second hydraulic chamber 17, the volume of the first hydraulic chamber 16 is increased, and brake fluid in the fluid storage apparatus 30 may enter the first hydraulic chamber 16 through the fluid inlet pipe 2 190, to replenish the first hydraulic chamber 16, to reduce the driving force of the driving apparatus 15 to drive the piston 12. In addition, because the fifth control valve 131 is in a closed state, the brake fluid in the second brake pipe 120 cannot enter the first hydraulic chamber 16 through the third brake pipe 130, thereby improving efficiency of the pressure adjustment apparatus 10 in providing braking force to the brake circuit 1140.

The foregoing describes, with reference to FIG. 2 to FIG. 21, the hydraulic adjustment apparatus, the hydraulic adjustment unit, and the brake system provided in the embodiments of this application. The following describes a control method in the embodiments of this application with reference to FIG. 22 and FIG. 23A and FIG. 23B. It should be noted that the control method in the embodiments of this application may be applied to any apparatus described above. This is not limited in the embodiments of this application.

Figure 22:
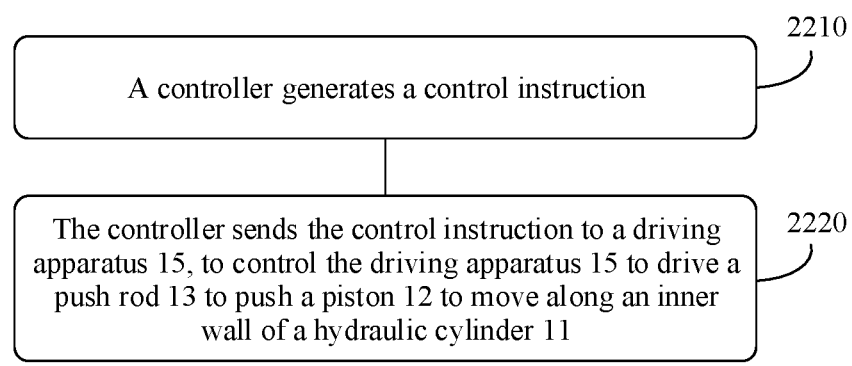
FIG. 22 is a flowchart of a control method according to an embodiment of this application.

FIG. 22 is a flowchart of a control method according to an embodiment of this application. The method shown in FIG. 22 may be performed by a controller in an automobile. The method shown in FIG. 22 includes step 2210 and step 2220.

2210. The controller generates a control instruction, where the control instruction is used to control a driving apparatus 15.

The control instruction may include a working parameter such as torque to be provided by the driving apparatus.

2220. The controller sends the control instruction to the driving apparatus 15, to control the driving apparatus 15 to drive a push rod 13 to push a piston 12 to move along an inner wall of a hydraulic cylinder 11.

In this embodiment of this application, a fluid outlet pipe of a first hydraulic chamber 16 is configured in segments on a push rod support portion 14 corresponding to a first hydraulic adjustment port 14a and the push rod 13 corresponding to a second hydraulic adjustment port 13a. In this way, when the piston 12 is located at an inner stop point of a piston stroke, the first hydraulic adjustment port 14a communicates with a second end of the second hydraulic adjustment port 13a, and when the piston 12 is located at a position other than the inner stop point in the piston stroke, the first hydraulic adjustment port 14a does not communicate with the second end of the second hydraulic adjustment port 13a. In other words, a status of communication between the first hydraulic adjustment port 14a and the second hydraulic adjustment port 13a is controlled by using a position of the piston 12 in the piston stroke. This avoids a need in a conventional hydraulic adjustment apparatus to specially configure a control valve for the first hydraulic chamber 16 to control the fluid outlet pipe of the first hydraulic chamber 16 to be open or closed, thereby reducing a quantity of control valves in a hydraulic adjustment unit and reducing costs of the hydraulic adjustment unit.

Optionally, in an embodiment, step 2220 includes: sending, by the controller, the control instruction to the driving apparatus 15 when a brake system is depressurized, to control the driving apparatus 15 to drive the push rod 13 to push the piston 12 to move to the inner stop point.

In this embodiment of this application, when the brake system is depressurized, the piston 12 is controlled to move to the inner stop point of the piston stroke, so that the first hydraulic adjustment port 14a communicates with the second hydraulic adjustment port 13a, and brake fluid can still be discharged from the first hydraulic chamber 16 through the first hydraulic adjustment port 14a and the second hydraulic adjustment port 13a that communicate with each other, thereby improving depressurization performance of the brake system.

Optionally, in an embodiment, step 2220 includes: sending, by the controller, the control instruction to the driving apparatus 15 when the brake system is pressurized, to control the driving apparatus 15 to drive the push rod 13 to push the piston 12 to compress a volume of a second hydraulic chamber 17, to squeeze a first part of brake fluid in the second hydraulic chamber 17 into brake wheel cylinders in the brake system through a first pipe 60 in the brake system, where the first pipe 60 communicates with the second hydraulic chamber 17 and the brake wheel cylinders, and the first part of brake fluid is a part or all of the brake fluid in the second hydraulic chamber 17.

In this embodiment of this application, the piston 12 is controlled to compress the volume of the second hydraulic chamber 17 to squeeze the first part of brake fluid in the second hydraulic chamber 17 into the brake wheel cylinders in the brake system through the first pipe 60 in the brake system. That is, a forward pressurization process is implemented.

Optionally, in an embodiment, when the brake system is pressurized, the piston 12 is located at a position other than the inner stop point in the piston stroke, and the first hydraulic adjustment port 14a does not communicate with the second end of the second hydraulic adjustment port 13a.

In this embodiment of this application, when the brake system is pressurized, the first hydraulic adjustment port 14a does not communicate with the second end of the second hydraulic adjustment port 13a. In this case, the first hydraulic chamber 16 may be configured to store brake fluid.

Optionally, in an embodiment, if the first part of brake fluid is a part of the brake fluid in the second hydraulic chamber 17, the second hydraulic chamber 17 further includes a second part of brake fluid, and step 2220 includes: sending, by the controller, the control instruction to the driving apparatus 15 when the brake system is pressurized, to control the driving apparatus 15 to drive the push rod 13 to push the piston 12 to compress the volume of the second hydraulic chamber 17, to squeeze the second part of brake fluid into the first hydraulic chamber 16 through a third brake pipe 130 and store the second part of brake fluid in the first hydraulic chamber 16, where the third brake pipe 130 connects the first hydraulic chamber 16 and the second hydraulic chamber 17.

In this embodiment of this application, the second part of brake fluid in the second hydraulic chamber 17 may flow into the first hydraulic chamber 16 through the third brake pipe 130, to reduce a pressure difference between the first hydraulic chamber 16 and the second hydraulic chamber 17, thereby reducing power required by the driving apparatus to drive the piston to move.

Optionally, in an embodiment, step 2220 includes: sending, by the controller, the control instruction to the driving apparatus 15 when the brake system is pressurized, to control the driving apparatus 15 to drive the push rod 13 to push the piston 12 to compress a volume of the first hydraulic chamber 16, to squeeze the second part of brake fluid into the brake wheel cylinders in the brake system through the third brake pipe 130, where the third brake pipe 130 is further configured to connect the first hydraulic chamber 16 and the brake wheel cylinders.

Figure 23A:
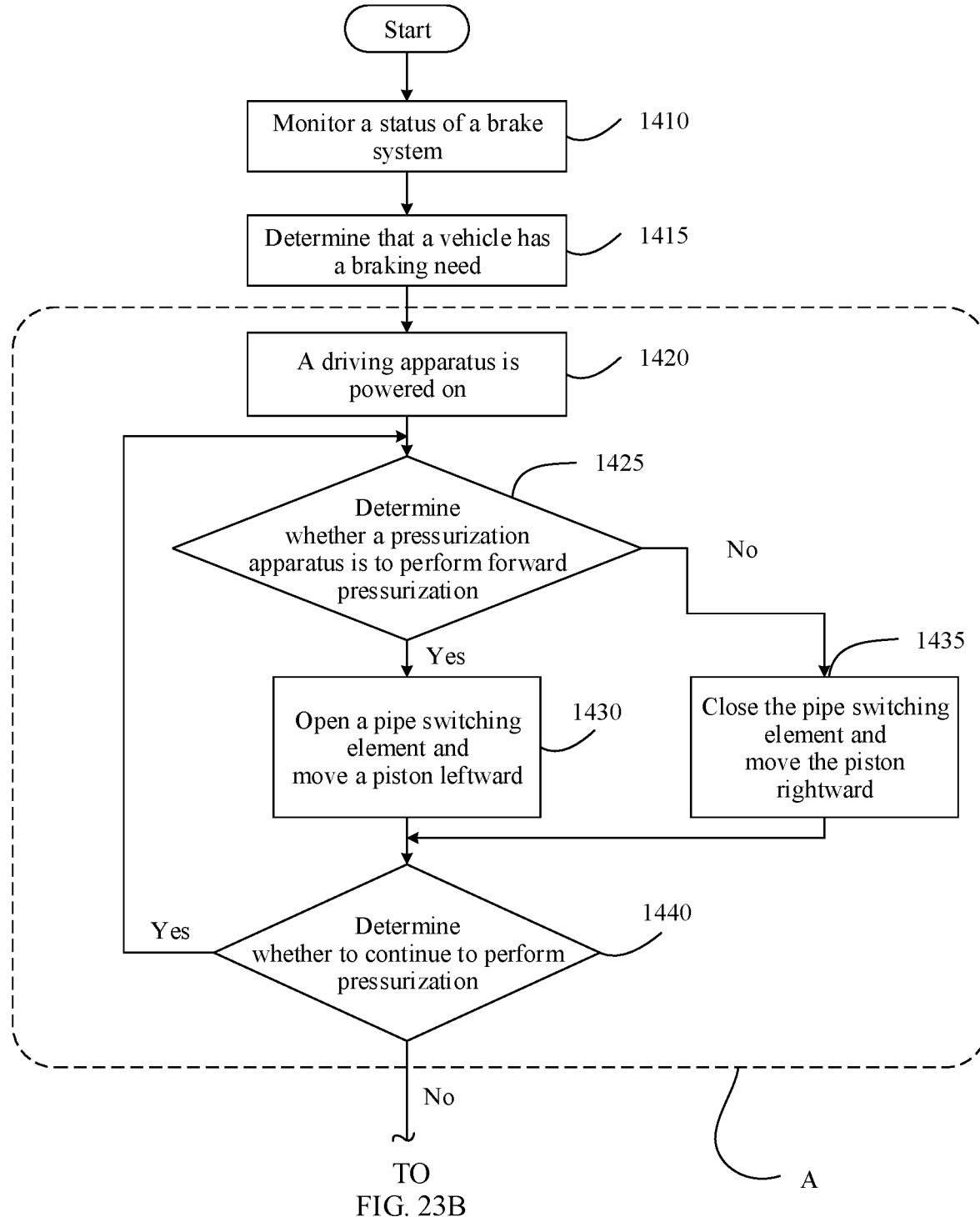
FIG. 23A and FIG. 23B are a flowchart of a control method according to another embodiment of this application.
Figure 23B:
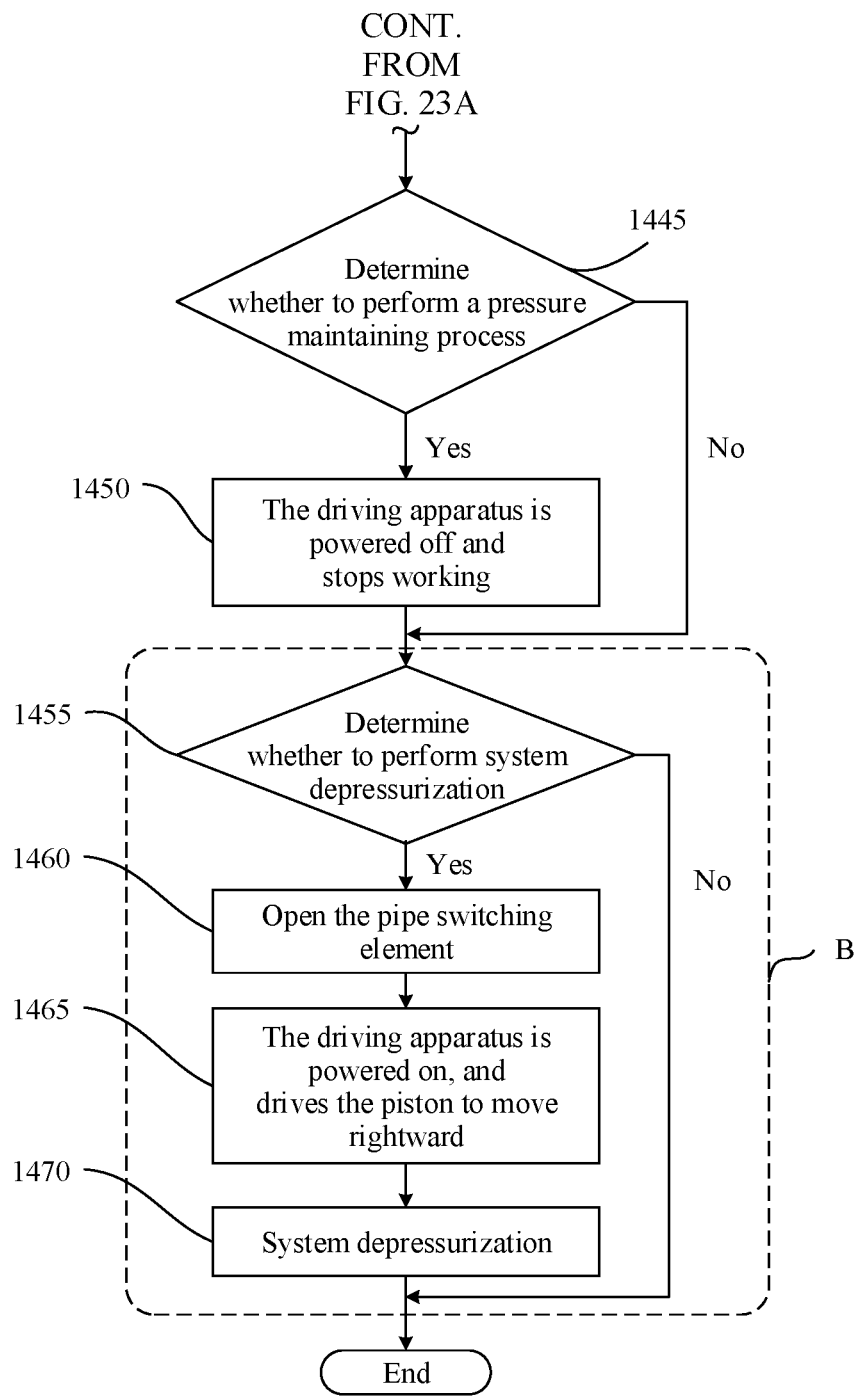

FIG. 23A and FIG. 23B are a flowchart of a control method according to another embodiment of this application. The method shown in FIG. 23A and FIG. 23B may be performed by a controller in an automobile. The method shown in FIG. 23A and FIG. 23B includes step 1410 to step 1470.

Step 1410. The controller detects a status of a brake system.

The controller detects the status of the brake system and determines that the brake system does not have faults or failures and can work normally.

It should be understood that a specific manner in which the controller detects the status of the brake system is not limited in this embodiment of this application. The controller may determine the status of the brake system based on a pressure sensor (not shown in the figure) disposed in the brake system. For example, pressure sensors may be disposed on a third brake pipe 130 and a first pipe 60 in the brake system to detect pressure of brake fluid in the pipes, and the status of the brake system is determined based on the pressure of the brake fluid in the pipes. For another example, the controller may alternatively determine the status of the brake system based on a current pressure building time of the brake system and an average pressure building time of the brake system.

Step 1415. The controller determines that the automobile has a braking need.

It should be understood that the controller may determine, based on input of a driver (that is, by using a pedal stroke sensor), that the brake system has a braking need, or the controller may determine, based on road condition information of the automobile, that the brake system has a braking need. This is not limited in this embodiment of this application. After it is determined that the automobile has a braking need, step 1420 is performed.

Step 1420. The controller controls a driving apparatus 15 to be powered on to prepare for pressurization work.

Step 1425. The controller determines whether a hydraulic adjustment apparatus 10 is to perform forward pressurization. If yes, step 1430 is performed. If no, step 1435 is performed.

Step 1430. The controller opens a pipe switching element 61 and controls a piston 12 to move leftward.

Step 1435. The controller closes the pipe switching element 61 and controls the piston 12 to move rightward.

Specifically, after determining that the automobile has a braking need, the controller may control the driving apparatus 15 to be powered on, and determine whether to perform forward pressurization based on a current position of the piston 12. If the piston 12 is currently located at an inner stop point, the controller may determine that the hydraulic adjustment apparatus 10 is to perform forward pressurization. In this case, step 1430 is performed, in which the controller opens the pipe switching element 61 and controls the piston 12 to move leftward, so that the hydraulic adjustment apparatus 10 performs forward pressurization on a brake pipe 20 through a second hydraulic chamber 17 and the first pipe 60.

If the piston 12 is currently located at an outer stop point, the controller may determine that the hydraulic adjustment apparatus 10 is to perform reverse pressurization. In this case, step 1435 is performed, in which the controller closes the pipe switching element 61 and controls the piston 12 to move rightward, so that the hydraulic adjustment apparatus 10 performs reverse pressurization on the brake pipe 20 through a first hydraulic chamber 17 and a third brake pipe 130.

After the hydraulic adjustment apparatus 10 completes the forward pressurization or the reverse pressurization, that is, after step 1430 or step 1435 is completed, step 1440 is performed.

Step 1440. The controller determines whether the hydraulic adjustment apparatus 10 continues to perform a pressurization operation on the brake pipe 20. If yes, step 1425 is performed again. If no, step 1445 is performed.

Specifically, the controller determines, based on the braking need, whether braking force applied to wheels needs to be increased, and if yes, determines that the hydraulic adjustment apparatus 10 needs to continue to pressurize the brake pipe 20. In this case, step 1425 may be performed again, in which the controller determines to continue to perform forward or reverse pressurization on the brake pipe 20.

If determining, based on the braking need, that the braking force applied to the wheels does not need to be increased, the controller determines that the hydraulic adjustment apparatus 10 does not need to continue to perform pressurization. In this case, step 1445 may be performed.

Steps 1420 to 1440 in a dashed-line box A in FIG. 23A and FIG. 23B can implement bidirectional continuous and stable pressurization (pressure building) on the brake system. This can achieve stable pressurization, ensure continuity of a pressurization process, and improve comfort during braking.

Step 1445. The controller determines whether to perform a pressure maintaining process. If yes, step 1450 is performed. If no, step 1455 is performed.

Step 1450. The controller controls the driving apparatus 15 to be powered off and stop working.

Step 1455. The controller determines whether to perform system depressurization.

Specifically, in step 1445, the controller determines, based on a specific braking need, whether to perform a pressure maintaining process. If the controller determines that current braking force needs to be maintained unchanged, the pressure maintaining process may be performed. In this case, a corresponding valve may be closed, and step 1450 is performed, in which the controller may control the driving apparatus 15 to be powered off and stop working. If the controller determines that the pressure maintaining process does not need to be performed, step 1455 may be performed.

In step 1455, the controller determines whether a depressurization operation needs to be performed on the brake system.

The controller may determine, based on the specific braking need, whether to reduce or cancel the braking force applied to the wheels. If yes, a depressurization operation may be performed on the brake system. In this case, steps 1460 to 1470 are performed. If no, the operation ends.

Step 1460. The controller opens the pipe switching element 61.

Step 1465. The controller controls the driving apparatus 15 to be powered up and start working, and drives the piston 12 to move rightward.

Step 1470. The controller performs system depressurization on the brake system through the hydraulic adjustment apparatus 10.

Specifically, the controller may open the pipe switching element 61 so that the first pipe 60 is open. In this case, the controller controls the driving apparatus 15 to drive the piston to move rightward, so that high-pressure brake fluid in the brake pipe 20 enters the second hydraulic chamber 17 through the first pipe 60 to perform conventional depressurization on the brake system. Then, the piston 12 continues to move to a position of an inner stop point and stays at the inner stop point. In this case, a second depressurization hole 13a and a first depressurization hole 14a are connected, the high-pressure brake fluid in the brake pipe 20 is discharged into a fluid storage apparatus 30 through the third brake pipe 130, the first hydraulic chamber 16, and a depressurization pipe 50, to perform fast depressurization on the brake system.

It should be noted that, for the forward pressurization, the reverse pressurization, the conventional depressurization, and the fast depressurization in the foregoing steps, refer to the foregoing descriptions. For brevity, details are not described again.

Figure 24:
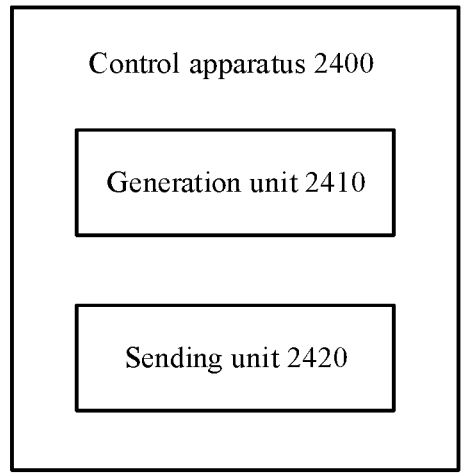
FIG. 24 is a schematic diagram of a control apparatus according to an embodiment of this application.
Figure 25:
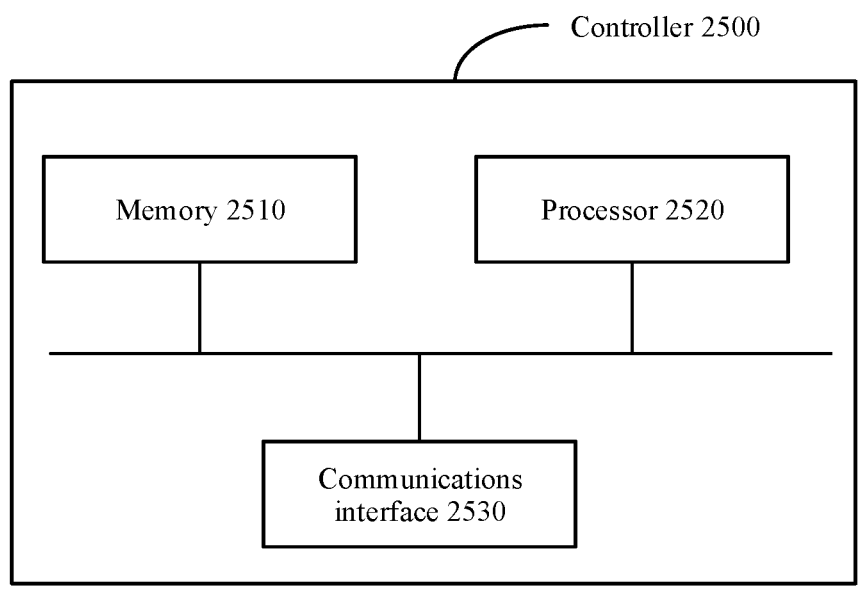
FIG. 25 is a schematic block diagram of a controller according to another embodiment of this application.

The foregoing describes the control method in the embodiments of this application with reference to FIG. 22 and FIG. 23A and FIG. 23B, and the following describes, with reference to FIG. 24 and FIG. 25, a control apparatus for performing the control method. It should be noted that, the apparatus in the embodiments of this application may be applied to any hydraulic adjustment unit or brake system described above, to implement any control method described above. For brevity, details are not described herein again.

FIG. 24 is a schematic diagram of a control apparatus according to an embodiment of this application. The control apparatus 2400 shown in FIG. 24 includes a generation unit 2410 and a sending unit 2420.

The generation unit 2410 is configured to generate a control instruction, where the control instruction is used to control a driving apparatus 15.

The sending unit 2420 is configured to send the control instruction to the driving apparatus 15, to control the driving apparatus 15 to drive a push rod 13 to push a piston 12 to move along an inner wall of a hydraulic cylinder 11.

In an optional embodiment, the generation unit 2410 may be a processor 2520, the sending unit 2420 may be a communications interface 2530, and a specific structure of the controller is shown in FIG. 25.

FIG. 25 is a schematic block diagram of a controller according to another embodiment of this application. The controller 2500 shown in FIG. 25 may include a memory 2510, a processor 2520, and a communications interface 2530. The memory 2510, the processor 2520, and the communications interface 2530 are connected by using an internal connection path. The memory 2510 is configured to store instructions. The processor 2520 is configured to execute the instructions stored in the memory 2510, to control the communications interface 2530 to receive/send information. Optionally, the memory 2510 may be coupled to the processor 2520 by using an interface, or may be integrated with the processor 2520.

It should be noted that the communications interface 2530 uses an apparatus such as but not limited to an input/output interface (input/output interface), to implement communication between the controller 2500 and another device or a communications network.

In an implementation process, steps in the foregoing methods can be implemented by using a hardware integrated logical circuit in the processor 2520, or by using instructions in a form of software. The method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 2510, and the processor 2520 reads information in the memory 2510 and completes the steps in the foregoing methods in combination with hardware of the processor. To avoid repetition, details are not described herein again.

It should be understood that, the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should also be understood that in the embodiments of this application, the memory may include a read-only memory and a random access memory, and provide an instruction and data for the processor. A part of the processor may further include a non-volatile random access memory. For example, the processor may further store information of a device type.

In the embodiments of this application, "first", "second", and various numbers are merely for distinguishing for ease of description and are not intended to limit the scope of the embodiments of this application. For example, different pipes or ports are distinguished.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, the "fluid outlet pipe" and the "fluid inlet pipe" may correspond to different brake pipes, or may correspond to a same brake pipe. The "fluid outlet pipe" and the "fluid inlet pipe" are distinguished based only on functions of the brake pipes in the brake system. For example, when the "fluid outlet pipe" and the "fluid inlet pipe" correspond to a same brake pipe 1, it may be understood that in a process of depressurizing wheels of an automobile, the brake pipe 1 in the brake system is configured to convey brake fluid in brake wheel cylinders to the fluid storage apparatus. In this case, the brake pipe 1 may be referred to as a "fluid outlet pipe". In a process of pressurizing the wheels of the automobile, the brake pipe 1 is configured to provide brake fluid to the wheels of the automobile, to provide braking force to the wheels of the automobile. In this case, the brake pipe 1 may be referred to as a "fluid inlet pipe".

In addition, in the embodiments of this application, the "fluid inlet valve", the "fluid outlet valve", and the "pressure balancing valve" are distinguished based only on functions of control valves in the brake system. A control valve configured to control the fluid inlet pipe to be open or closed may be referred to as a "fluid inlet valve" or a "pressurization valve". A controller configured to control a fluid outlet pipe may be referred to as a "fluid outlet valve" or a "depressurization valve". A control valve configured to isolate two stages of brake subsystems may be referred to as an "isolation valve". The control valve may be a valve commonly used in an existing brake system, for example, a solenoid valve. This is not specifically limited in the embodiments of this application.

In addition, after the control valve is connected to a brake pipe, connection ports between the control valve and the brake pipe may be indicated by a first end and a second end, and a flow direction of brake fluid between the first end and the second end is not limited in this application. For example, when the control valve is in an open state, the brake fluid may flow from the first end of the control valve to the second end of the control valve, or, the brake fluid may flow from the second end of the control valve to the first end of the control valve.

In addition, in the embodiments of this application, the "first brake pipe 110", the "second brake pipe 120", the "third brake pipe 130", the "fourth brake pipe 140", and other brake pipes may each be understood as one or more brake pipes for implementing a specific function. For example, the first fluid inlet pipe 150 is a plurality of brake pipes for connecting the primary brake cylinder 917 and the brake wheel cylinders 151 of the first set of wheels.

In addition, in the embodiments of this application, when an architecture such as a brake system or an automobile is described with reference to accompanying drawings, the accompanying drawings schematically show two working states (closed or open) that may be implemented by each control valve, and a current working state of the control valve is not limited to those shown in the figures.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hydraulic adjustment apparatus, comprising:
a hydraulic cylinder;
a piston; and
a push rod, wherein:
the push rod is configured to push the piston to move along an inner wall of the hydraulic cylinder to form a piston stroke;
the piston divides the hydraulic cylinder into a first hydraulic chamber and a second hydraulic chamber;
an end portion of the first hydraulic chamber has a push rod support portion, the push rod support portion is configured to support the push rod, and the push rod support portion has a first hydraulic adjustment port;
the push rod has a second hydraulic adjustment port, and a first end of the second hydraulic adjustment port is operable to communicate with the first hydraulic chamber;
a circular ring-shaped or semi-circular ring-shaped first flow guide groove is disposed along an outer periphery of the push rod, the first flow guide groove is operable to communicate with a second end of the second hydraulic adjustment port, and the hydraulic adjustment apparatus is operable such that when the piston is located at an inner stop point of the piston stroke, the first flow guide groove communicates with the first hydraulic adjustment port; and
wherein the hydraulic adjustment apparatus is operable such that:
when the piston is located at the inner stop point of the piston stroke, the first hydraulic adjustment port communicates with the second end of the second hydraulic adjustment port; or
when the piston is located at a position other than the inner stop point in the piston stroke, the first hydraulic adjustment port does not communicate with the second end of the second hydraulic adjustment port.

2. The hydraulic adjustment apparatus according to claim 1, wherein the hydraulic adjustment apparatus is operable such that when the piston is located at the inner stop point of the piston stroke, brake fluid in the first hydraulic chamber is discharged from the first hydraulic chamber through the first hydraulic adjustment port and the second hydraulic adjustment port that communicate with each other.

3. The hydraulic adjustment apparatus according to claim 1, wherein the second hydraulic adjustment port is disposed obliquely on the push rod and runs through the push rod, and a distance between the first end of the second hydraulic adjustment port and the piston is shorter than a distance between the second end of the second hydraulic adjustment port and the piston.

4. The hydraulic adjustment apparatus according to claim 1, wherein the hydraulic adjustment apparatus is operable such that when the piston is located at the inner stop point, the push rod support portion is spaced from the second hydraulic adjustment port.

5. A hydraulic adjustment unit, comprising:
a hydraulic adjustment apparatus, wherein the hydraulic adjustment apparatus comprises a hydraulic cylinder, a piston, and a push rod, and the piston divides the hydraulic cylinder into a first hydraulic chamber and a second hydraulic chamber; and
a driving apparatus, wherein the driving apparatus is configured to drive the push rod to push the piston to move along an inner wall of the hydraulic cylinder to form a piston stroke, wherein:
an end portion of the first hydraulic chamber has a push rod support portion, the push rod support portion is configured to support the push rod, the push rod support portion has a first hydraulic adjustment port, and the first hydraulic adjustment port is connected to a first fluid outlet pipe of the hydraulic adjustment unit;
the push rod has a second hydraulic adjustment port, and a first end of the second hydraulic adjustment port is operable to communicate with the first hydraulic chamber;
a circular ring-shaped or semi-circular ring-shaped first flow guide groove is disposed along an outer periphery of the push rod, the first flow guide groove is operable to communicate with a second end of the second hydraulic adjustment port, and the hydraulic adjustment apparatus is operable such that when the piston is located at an inner stop point of the piston stroke, the first flow guide groove communicates with the first hydraulic adjustment port; and
wherein the hydraulic adjustment unit is operable such that:
when the piston is located at the inner stop point of the piston stroke, the first hydraulic adjustment port communicates with the second end of the second hydraulic adjustment port, and brake fluid in the first hydraulic chamber is discharged from the first hydraulic chamber through the first fluid outlet pipe; or
when the piston is located at a position other than the inner stop point in the piston stroke, the first hydraulic adjustment port does not communicate with the second end of the second hydraulic adjustment port.

6. The hydraulic adjustment unit according to claim 5, wherein the first hydraulic chamber has a third hydraulic adjustment port, and the first hydraulic chamber is operable to adjust pressure of brake fluid in a brake pipe in the hydraulic adjustment unit through the third hydraulic adjustment port; and
wherein the hydraulic adjustment unit is operable such that when the piston is located at the inner stop point of the piston stroke, the first hydraulic adjustment port communicates with the second end of the second hydraulic adjustment port, and the third hydraulic adjustment port communicates with the first end of the second hydraulic adjustment port.

7. The hydraulic adjustment unit according to claim 5, wherein the second hydraulic adjustment port is disposed obliquely on the push rod and runs through the push rod, and a distance between the first end of the second hydraulic adjustment port and the piston is shorter than a distance between the second end of the second hydraulic adjustment port and the piston.

8. A brake system, comprising:
a hydraulic adjustment apparatus, wherein the hydraulic adjustment apparatus comprises a hydraulic cylinder, a piston, and a push rod, and the piston divides the hydraulic cylinder into a first hydraulic chamber and a second hydraulic chamber; and
a driving apparatus, wherein the driving apparatus is configured to drive the push rod to push the piston to move along an inner wall of the hydraulic cylinder to form a piston stroke, wherein:
an end portion of the first hydraulic chamber has a push rod support portion, the push rod support portion is configured to support the push rod, the push rod support portion is provided with a first hydraulic adjustment port, and the first hydraulic adjustment port is connected to a first fluid outlet pipe of the brake system;

the push rod has a second hydraulic adjustment port, and a first end of the second hydraulic adjustment port is operable to communicate with the first hydraulic chamber;

a circular ring-shaped or semi-circular ring-shaped first flow guide groove is disposed along an outer periphery of the push rod, the first flow guide groove is operable to communicate with a second end of the second hydraulic adjustment port, and the hydraulic adjustment apparatus is operable such that when the piston is located at an inner stop point of the piston stroke, the first flow guide groove communicates with the first hydraulic adjustment port; and wherein the brake system is operable such that:

when the piston is located at the inner stop point of the piston stroke, the first hydraulic adjustment port communicates with the second end of the second hydraulic adjustment port, and brake fluid in the first hydraulic chamber flows from the first hydraulic chamber to a fluid storage apparatus through the first fluid outlet pipe; or when the piston is located at a position other than the inner stop point in the piston stroke, the first hydraulic adjustment port does not communicate with the second end of the second hydraulic adjustment port.

9. The brake system according to claim 8, wherein the brake system further comprises a third brake pipe, and the first hydraulic chamber is connected to brake wheel cylinders in the brake system through the third brake pipe; and wherein the brake system is operable such that when the piston is located at the inner stop point of the piston stroke, brake fluid in the brake wheel cylinders flows to the first hydraulic chamber through the third brake pipe, and flows to the fluid storage apparatus through the second end of the second hydraulic adjustment port and the first hydraulic adjustment port.

10. The brake system according to claim 8, wherein the brake system further comprises a first pipe, and the first hydraulic chamber is operable to communicate with the second hydraulic chamber through the first pipe; and wherein the brake system is operable such that when the piston compresses a volume of the second hydraulic chamber to pressurize brake wheel cylinders in the brake system, the first hydraulic adjustment port does not communicate with the second end of the second hydraulic adjustment port, and a part of brake fluid in the second hydraulic chamber flows to the first hydraulic chamber through the first pipe and is stored in the second hydraulic chamber.

11. The brake system according to claim 8, wherein the second hydraulic adjustment port is disposed obliquely on the push rod and runs through the push rod, and a distance between the first end of the second hydraulic adjustment port and the piston is shorter than a distance between the second end of the second hydraulic adjustment port and the piston.

12. A control method of a brake system, wherein the brake system comprises:

a hydraulic adjustment apparatus, wherein the hydraulic adjustment apparatus comprises a hydraulic cylinder, a piston, and a push rod, and the piston divides the hydraulic cylinder into a first hydraulic chamber and a second hydraulic chamber; and a driving apparatus, wherein the driving apparatus is configured to drive the push rod to push the piston to move along an inner wall of the hydraulic cylinder to form a piston stroke, wherein:

an end portion of the first hydraulic chamber has a push rod support portion, the push rod support portion is configured to support the push rod, the push rod support portion has a first hydraulic adjustment port, and the first hydraulic adjustment port is connected to a first fluid outlet pipe of the brake system;

the push rod has a second hydraulic adjustment port, and a first end of the second hydraulic adjustment port is operable to communicate with the first hydraulic chamber;

a circular ring-shaped or semi-circular ring-shaped first flow guide groove is disposed along an outer periphery of the push rod, the first flow guide groove is operable to communicate with a second end of the second hydraulic adjustment port, and the hydraulic adjustment apparatus is operable such that when the piston is located at an inner stop point of the piston stroke, the first flow guide groove communicates with the first hydraulic adjustment port;

wherein the brake system is operable such that:

when the piston is located at the inner stop point of the piston stroke, the first hydraulic adjustment port communicates with the second end of the second hydraulic adjustment port, and brake fluid in the first hydraulic chamber flows from the first hydraulic chamber to a fluid storage apparatus through the first fluid outlet pipe; or when the piston is located at a position other than the inner stop point in the piston stroke, the first hydraulic adjustment port does not communicate with the second end of the second hydraulic adjustment port; and wherein the method comprises:

generating, by a controller, a control instruction, wherein the control instruction is used to control the driving apparatus; and sending, by the controller, the control instruction to the driving apparatus, to control the driving apparatus to drive the push rod to push the piston to move along the inner wall of the hydraulic cylinder.

13. The method according to claim 12, wherein the sending, by the controller, the control instruction to the driving apparatus, to control the driving apparatus to drive the push rod to push the piston to move along the inner wall of the hydraulic cylinder comprises:

sending, by the controller, the control instruction to the driving apparatus when the brake system is depressurized, to control the driving apparatus to drive the push rod to push the piston to move to the inner stop point.

14. The method according to claim 12, wherein the sending, by the controller, the control instruction to the driving apparatus, to control the driving apparatus to drive the push rod to push the piston to move along the inner wall of the hydraulic cylinder comprises:

sending, by the controller, the control instruction to the driving apparatus when the brake system is pressurized, to control the driving apparatus to drive the push rod to push the piston to compress a volume of the second hydraulic chamber, to squeeze a first part of brake fluid in the second hydraulic chamber into brake wheel cylinders in the brake system through a first pipe in the brake system, wherein the first pipe communicates with the second hydraulic chamber and the brake wheel cylinders, and the first part of brake fluid is a part or all of brake fluid in the second hydraulic chamber.

* * * * *